US012795211B2

(12) United States Patent
Zhang

(10) Patent No.: US 12,795,211 B2

(45) Date of Patent: Nov. 10, 2026

(54) SCREEN PROJECTION METHOD, DEVICE, AND STORAGE MEDIUM

(71) Applicant: HONOR DEVICE CO., LTD., Shenzhen (CN)

(72) Inventor: Lan Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 678 days.

(21) Appl. No.: 18/023,304

(22) PCT Filed: Aug. 16, 2022

(86) PCT No.: PCT/CN2022/112847

§ 371 (c)(1),
(2) Date: Feb. 24, 2023

(87) PCT Pub. No.: WO2023/109156

PCT Pub. Date: Jun. 22, 2023

(65) Prior Publication Data

US 2024/0223867 A1 Jul. 4, 2024

(30) Foreign Application Priority Data

Dec. 14, 2021 (CN) ........................ 202111523895.3

(51) Int. Cl.
*H04N 21/81* (2011.01)
*G06F 3/16* (2006.01)
(Continued)

(52) U.S. Cl.
CPC ......... *H04N 21/8106* (2013.01); *G06F 3/165* (2013.01); *H04N 21/4122* (2013.01);
(Continued)

(58) Field of Classification Search
CPC ................ G06F 3/165; H04N 21/8106; H04N 21/4122; H04N 21/4143; H04N 21/4396; H04N 21/43637
(Continued)

(56) References Cited

U.S. PATENT DOCUMENTS 10,091,765 B2 10/2018 Fu et al.
12,277,362 B2 * 4/2025 Zhang et al. ........... G06F 3/165
(Continued)

FOREIGN PATENT DOCUMENTS

CN 106878920 A 6/2017
CN 109032555 A 12/2018
(Continued)

OTHER PUBLICATIONS

Helpful Stuff, "How to setup multiple Audio Outputs on Windows 10", May 3, 2021, Youtube.com, 0:02-3:41, https://www.youtube.com/watch?v=q_qCMav60Qg ; PDF containing link attached (Year: 2021).*
(Continued)

*Primary Examiner* — Vivian C Chin

(74) *Attorney, Agent, or Firm* — WOMBLE BOND DICKINSON (US) LLP

(57) ABSTRACT

This application provides a screen projection method, a device, and a storage medium. The method is applied to a screen projection transmit end on which a screen projection application is installed. In a screen projection scenario, an audio device currently used by the screen projection transmit end is obtained, and an identification number corresponding to the audio device is recorded in an audio device table. In this way, when it is determined that a sound output device selected by a user is a screen projection receive end, audio data is obtained from the audio device identified by the identification number and is sent to the screen projection
(Continued)

receive end for play, to ensure that when the screen projection receive end is a sound output device, the screen projection receive end can always obtain the audio data and then play the audio data to output a sound.

20 Claims, 32 Drawing Sheets

(51) Int. Cl.

| | |
|---|---|
| ***H04N 21/41*** | (2011.01) |
| ***H04N 21/4143*** | (2011.01) |
| ***H04N 21/4363*** | (2011.01) |
| ***H04N 21/439*** | (2011.01) |

(52) U.S. Cl.
CPC ..... *H04N 21/4143* (2013.01); *H04N 21/4396* (2013.01); *H04N 21/43637* (2013.01)

(58) Field of Classification Search
USPC ............................................................ 700/94
See application file for complete search history.

(56) References Cited

U.S. PATENT DOCUMENTS

| | | | |
|---|---|---|---|
| 2014/0018016 | A1 | 1/2014 | Chang et al. |
| 2015/0296247 | A1 | 10/2015 | Glasser |

FOREIGN PATENT DOCUMENTS

| | | | |
|---|---|---|---|
| CN | 109558105 | A | 4/2019 |
| CN | 111628847 | A | 9/2020 |
| CN | 111770415 | A | 10/2020 |
| CN | 111954028 | A | 11/2020 |
| CN | 112835549 | A | 5/2021 |
| CN | 113050916 | A | 6/2021 |
| CN | 113225592 | A | 8/2021 |
| CN | 214281369 | U | 9/2021 |
| CN | 114125515 | A | 3/2022 |

OTHER PUBLICATIONS

Xu Jia-hui;“A Design of AC97 Audio System Based on Vivado HLS”;Research and Exploration in Laboratory;Dec. 5, 2014;4 pages.

* cited by examiner

SCREEN PROJECTION METHOD, DEVICE, AND STORAGE MEDIUM

CROSS-REFERENCE TO RELATED APPLICATIONS

This application is a national stage of International Application No. PCT/CN2022/112847, filed on Aug. 16, 2022, which claims priority to Chinese Patent Application No. 202111523895.3, filed on Dec. 14, 2021. Both of the aforementioned applications are hereby incorporated by reference in their entireties.

TECHNICAL FIELD

This application relates to the field of screen projection technologies, and in particular, to a screen projection method, a device, and a storage medium.

BACKGROUND

With development of terminal technologies, more terminals have a screen projection function. For example, in a home, work, teaching, or game scenario, a terminal projects a currently displayed picture onto a large screen, so that people can conveniently view content of the picture.

In a screen projection scenario in which a screen projection transmit end, that is, a terminal that sends screen projection information, is a personal computer (personal computer, PC) device, currently, a screen projection application installed on the PC device needs to be used to project audio and video content played on the PC device onto a screen projection receive end, for example, a large-screen device (subsequently referred to as a large-screen device) such as a television.

Although the PC device can implement a screen projection function by using the screen projection application, there are some problems that cannot be ignored. For example, when the PC device is connected to another audio device such as a headset, if a large-screen device is selected as a sound output device, the large-screen device usually cannot output a sound.

SUMMARY

To resolve the foregoing technical problem, this application provides a screen projection method, a device, and a storage medium, so that in a screen projection scenario, regardless of whether a PC device is connected to another audio device, a large-screen device can normally output a sound when the large-screen device is selected as a sound output device.

According to a first aspect, this application provides a screen projection method, applied to a screen projection transmit end. A screen projection application is installed on the screen projection transmit end, and the method includes: When the screen projection transmit end plays audio data through a built-in speaker, after receiving a screen projection connection request, the screen projection transmit end establishes a screen projection connection to a screen projection receive end in response to the screen projection connection request, obtains the audio data from a sound channel corresponding to the speaker, and sends the audio data to the screen projection receive end, so that the screen projection receive end plays the audio data: and after a headset is connected to the screen projection transmit end, the screen projection transmit end obtains the audio data from a sound channel corresponding to the headset, and sends the audio data to the screen projection receive end, so that the screen projection receive end plays the audio data. Therefore, an identification number of an audio device currently used by the screen projection transmit end is recorded, and when a sound output device is the screen projection receive end, the screen projection transmit end can obtain, from a sound channel corresponding to the audio device identified by the recorded identification number, audio data that needs to be played, and send the audio data to the screen projection receive end, so that in a screen projection scenario, regardless of whether the screen projection transmit end switches the audio device, the screen projection receive end can receive the audio data that can be played, that is, a sound can be output normally.

According to the first aspect, a first audio status switching control and a first volume bar control that are corresponding to the speaker are displayed in a display interface of the screen projection transmit end: and the method further includes: When the screen projection transmit end plays the audio data through the built-in speaker by using a volume value corresponding to the first volume bar control, after receiving a tap operation on the first audio status switching control, the screen projection transmit end controls, in response to the tap operation, the speaker to stop outputting a sound. It can be learned that, before the screen projection connection is established between the screen projection transmit end and the screen projection receive end, whether the speaker of the screen projection transmit end outputs a sound is closely related to the tap operation performed by the user on the first audio status switching control. An audio status of the speaker can be modified by tapping the first audio status switching control.

According to the first aspect or any one of the foregoing implementations of the first aspect, after the obtaining the audio data from a sound channel corresponding to the speaker, and sending the audio data to the screen projection receive end, so that the screen projection receive end plays the audio data, the method further includes: After receiving a tap operation for switching a sound output device from the screen projection receive end to the screen projection transmit end, in response to the tap operation, the screen projection transmit end stops obtaining the audio data from the sound channel corresponding to the speaker, and keeps the speaker mute. Therefore, in a screen projection process, when the sound output device is switched to the screen projection transmit end, and the audio device currently used by the screen projection transmit end is the built-in speaker, whether the speaker of the screen projection transmit end outputs a sound depends on a current status of the first audio status switching control corresponding to the speaker. This ensures that in a screen projection scenario, whether the speaker of the screen projection transmit end outputs a sound can be consistent with an expectation of the user.

According to the first aspect or any one of the foregoing implementations of the first aspect, after the stopping obtaining the audio data from the sound channel corresponding to the speaker, and keeping the speaker mute, the method further includes: After receiving a tap operation on the first audio status switching control, the screen projection transmit end controls, in response to the tap operation, the speaker to play the audio data by using the volume value corresponding to the first volume bar control.

According to the first aspect or any one of the foregoing implementations of the first aspect, after the obtaining the audio data from a sound channel corresponding to the speaker, and sending the audio data to the screen projection receive end, so that the screen projection receive end plays the audio data, the method further includes: After receiving a tap operation for disconnecting the screen projection connection between the screen projection transmit end and the screen projection receive end, in response to the tap operation, the screen projection transmit end stops obtaining the audio data from the sound channel corresponding to the speaker, and keeps the speaker mute.

According to the first aspect or any one of the foregoing implementations of the first aspect, a second audio status switching control and a second volume bar control that are corresponding to the headset are displayed in the display interface of the screen projection transmit end: and after the obtaining the audio data from a sound channel corresponding to the headset, and sending the audio data to the screen projection receive end, so that the screen projection receive end plays the audio data, the method further includes: After receiving a tap operation on the second audio status switching control, the screen projection transmit end sets the headset to a mute state in response to the tap operation.

According to the first aspect or any one of the foregoing implementations of the first aspect, after the setting the headset to a mute state, the method further includes: After receiving a tap operation for switching a sound output device from the screen projection receive end to the screen projection transmit end, in response to the tap operation, the screen projection transmit end stops obtaining the audio data from the sound channel corresponding to the headset, and controls the headset to stop outputting a sound. Therefore, in a screen projection process, when the sound output device is switched to the screen projection transmit end, and the audio device currently used by the screen projection transmit end is the external headset, whether the headset of the screen projection transmit end outputs a sound depends on a current status of the second audio status switching control corresponding to the headset. This ensures that in a screen projection scenario, whether the headset of the screen projection transmit end outputs a sound can be consistent with an expectation of the user.

According to the first aspect or any one of the foregoing implementations of the first aspect, after the stopping obtaining the audio data from the sound channel corresponding to the headset, and controlling the headset to stop outputting a sound, the method further includes: After receiving a tap operation on the second audio status switching control, the screen projection transmit end controls, in response to the tap operation, the headset to output a sound.

According to the first aspect or any one of the foregoing implementations of the first aspect, after the setting the headset to a mute state, the method further includes: After receiving a tap operation for disconnecting the screen projection connection between the screen projection transmit end and the screen projection receive end, in response to the tap operation, the screen projection transmit end stops obtaining the audio data from the sound channel corresponding to the headset, and controls the headset to stop outputting a sound.

According to the first aspect or any one of the foregoing implementations of the first aspect, an audio device selection list is further displayed in the display interface of the screen projection transmit end, the audio device selection list includes a first audio device option and a second audio device option, the first audio device option corresponds to the speaker, and the second audio device option corresponds to the headset: and after the obtaining, after a headset is connected to the screen projection transmit end, the audio data from a sound channel corresponding to the headset, and sending the audio data to the screen projection receive end, so that the screen projection receive end plays the audio data, the method further includes: After receiving a tap operation on the first audio device option, in response to the tap operation, the screen projection transmit end obtains the audio data from the sound channel corresponding to the speaker, and sends the audio data to the screen projection receive end, so that the screen projection receive end plays the audio data.

According to a second aspect, this application provides a screen projection method, applied to a screen projection transmit end. A screen projection application is installed on the screen projection transmit end, and the method includes: after receiving a screen projection connection request, obtaining, as a target identification number, an identification number of an audio device currently used by the screen projection transmit end, and recording the target identification number in an audio device table: determining a sound output device selected by a user: and when the sound output device is the screen projection transmit end, playing audio data by using the audio device identified by the target identification number recorded in the audio device table: or when the sound output device is a screen projection receive end, setting, to a mute state, the audio device identified by the target identification number recorded in the audio device table, obtaining the audio data from a sound channel corresponding to the audio device identified by the target identification number recorded in the audio device table, and sending the audio data to the screen projection receive end for play.

For example, the screen projection transmit end is a PC device, and the screen projection receive end is a large-screen device such as a television.

Therefore, according to the screen projection solution provided in this application, in a screen projection scenario, the audio device currently used by the screen projection transmit end is obtained, and the identification number corresponding to the audio device is recorded in the audio device table. In this way, when it is determined that the sound output device selected by the user is the screen projection receive end, the audio data is obtained from the audio device identified by the identification number and is sent to the screen projection receive end for play, instead of a default audio device such as a speaker, to ensure that in a screen projection process, when the screen projection receive end is a sound output device, the screen projection receive end can always obtain the audio data and then play the audio data to output a sound.

According to the second aspect, after the obtaining, as a target identification number, an identification number of an audio device currently used by the screen projection transmit end, and recording the target identification number in an audio device table, the method further includes: invoking an audio device monitoring module to monitor whether the audio device currently used by the screen projection transmit end changes: obtaining an identification number corresponding to a changed audio device when monitoring that the audio device currently used by the screen projection transmit end changes: and updating, based on the identification number corresponding to the changed audio device, the target identification number recorded in the audio device table.

Therefore, according to the screen projection solution provided in this application, in a screen projection process, the audio device monitoring module is enabled to continuously monitor the audio device selected at the screen projection transmit end, and the target identification number recorded in the audio device table is updated when the audio device changes, so that the target identification number recorded in the audio device table can be changed with the audio device actually selected at the screen projection transmit end. This ensures that in a screen projection process, when the screen projection transmit end is a sound output device, the audio data can be played by a changed audio device, or when the screen projection receive end is a sound output device, the screen projection transmit end can obtain the audio data from a sound channel corresponding to the changed audio device and send the audio data to the screen projection receive end for play. In this way, a problem in an existing solution can be resolved, and both the screen projection transmit end and the screen projection receive end can normally output a sound in a screen projection process regardless of whether the screen projection transmit end is connected to another audio device.

According to the second aspect or any one of the foregoing implementations of the second aspect, after the sending the audio data to the screen projection receive end for play, the method further includes: after the user changes the sound output device from the screen projection receive end to the screen projection transmit end, playing the audio data by using the audio device identified by the target identification number recorded in the audio device table.

Therefore, according to the screen projection solution provided in this application, the audio device is played by using the audio device identified by the target identification number recorded in the audio device table, so that after the sound output device changes from the screen projection receive end to the screen projection transmit end, the audio device that plays the audio data at the screen projection transmit end can be consistent with that selected by the user, thereby further improving user experience.

According to the second aspect or any one of the foregoing implementations of the second aspect, after the sending the audio data to the screen projection receive end for play; the method further includes: after receiving a screen projection disconnection request, playing the audio data by using the audio device identified by the target identification number recorded in the audio device table.

Therefore, according to the screen projection solution provided in this application, the audio device is played by using the audio device identified by the target identification number recorded in the audio device table, so that after the screen projection connection is disconnected, the audio device that plays the audio data at the screen projection transmit end can be consistent with that selected by the user, thereby further improving user experience.

According to the second aspect or any one of the foregoing implementations of the second aspect, after a connection to the screen projection receive end is disconnected, the method further includes: disabling the audio device monitoring module.

Therefore, according to the screen projection solution provided in this application, monitoring for the change of the audio device is stopped after screen projection ends, so that resource occupation and waste at the screen projection transmit end can be effectively avoided.

According to the second aspect or any one of the foregoing implementations of the second aspect, after the screen projection connection request is received, the method further includes: obtaining a current audio status of the screen projection transmit end as a target audio status, and recording the target audio status in an audio status table, where the target audio status is a mute state or a non-mute state: and correspondingly, the playing audio data by using the audio device identified by the target identification number recorded in the audio device table when the sound output device is the screen projection transmit end includes: when the sound output device is the screen projection transmit end, playing the audio data by using the audio device identified by the target identification number recorded in the audio device table, and setting an audio status of the audio device identified by the target identification number to the target audio status.

Therefore, according to the screen projection solution provided in this application, in a screen projection scenario, the audio status of the screen projection transmit end before the screen projection connection is established is obtained, and the obtained audio status is recorded in the audio status table as the target audio status of the screen projection transmit end. In this way, when it is determined that the sound output device selected by the user is the screen projection transmit end, the audio status of the screen projection transmit end is directly set to the target audio status recorded in the audio status table, so that in the screen projection scenario, when a sound is switched back to the screen projection transmit end, an audio status of the screen projection transmit end can be consistent with an audio status expected by the user, thereby greatly improving user experience.

According to the second aspect or any one of the foregoing implementations of the second aspect, after the obtaining a current audio status of the screen projection transmit end as a target audio status, and recording the target audio status in an audio status table, the method further includes: invoking an audio status monitoring module to monitor a tap operation performed by the user on an audio status switching control corresponding to the audio device identified by the target identification number, where when an audio status corresponding to the audio status switching control is the mute state, after the audio status switching control is tapped, the audio status is switched from the mute state to the non-mute state, or when an audio status corresponding to the audio status switching control is the non-mute state, after the audio status switching control is tapped, the audio status is switched from the non-mute state to the mute state: and after monitoring the tap operation performed by the user on the audio status switching control corresponding to the audio device identified by the target identification number, updating, based on the switched audio status, the target audio status recorded in the audio status table.

Therefore, according to the screen projection solution provided in this application, in a screen projection process, the audio status monitoring module is enabled to continuously monitor the audio status of the screen projection transmit end, and the target audio status recorded in the audio status table is updated when the audio status changes, so that the target audio status recorded in the audio status table can be changed based on an actual operation of the user, to ensure that when the screen projection connection is disconnected or the sound output device is changed to the screen projection transmit end, an audio status that is set based on the target audio status recorded in the audio status table is consistent with an audio status actually expected by the user. In this way, a problem in an existing solution can be resolved. Before screen projection or during screen projection, after the user manually modifies the screen projection transmit end to the mute state, disconnects the screen projection connection, or switches from outputting a sound by using a large-screen device to outputting a sound by using the screen projection transmit end, the audio status of the screen projection transmit end can be consistent with that set by the user, and the screen projection transmit end is in the mute state, instead of directly outputting a sound.

According to the second aspect or any one of the foregoing implementations of the second aspect, after the sending the audio data to the screen projection receive end, the method further includes: after the user changes the sound output device from the screen projection receive end to the screen projection transmit end, reading the target audio status recorded in the audio status table: and setting the audio status of the audio device identified by the target identification number in the screen projection transmit end to the target audio status.

Therefore, according to the screen projection solution provided in this application, the audio status of the screen projection transmit end is set based on the target audio status recorded in the audio status table, so that after the sound output device changes from the screen projection receive end to the screen projection transmit end, the audio status of the screen projection transmit end can be consistent with a status set by the user, thereby further improving user experience.

According to the second aspect or any one of the foregoing implementations of the second aspect, the method further includes: after receiving a screen projection disconnection request, reading the target audio status recorded in the audio status table: and setting the audio status of the audio device identified by the target identification number in the screen projection transmit end to the target audio status.

Therefore, according to the screen projection solution provided in this application, the audio status of the screen projection transmit end is set based on the target audio status recorded in the audio status table, so that after the screen projection connection is disconnected, the audio status of the screen projection transmit end can be consistent with a status set by the user, thereby further improving user experience.

According to the second aspect or any one of the foregoing implementations of the second aspect, after a connection to the screen projection receive end is disconnected, the method further includes: disabling the audio status monitoring module.

Therefore, according to the screen projection solution provided in this application, monitoring for the change of the audio status is stopped after screen projection ends, so that resource occupation and waste at the screen projection transmit end can be effectively avoided.

According to a third aspect, this application provides an electronic device. The electronic device is a screen projection sending terminal, and includes a processor and a memory. The memory is coupled to the processor, and the memory stores program instructions. When the program instructions are executed by the processor, the electronic device is enabled to execute instructions of the method in the first aspect or any one of the implementations of the first aspect, or execute instructions of the method in the second aspect or any one of the implementations of the second aspect.

According to a fourth aspect, this application provides a computer-readable medium, configured to store a computer program. When the computer program is run on an electronic device, the electronic device is enabled to execute instructions of the method in the first aspect or any one of the implementations of the first aspect, or execute instructions of the method in the second aspect or any one of the implementations of the second aspect.

According to a fifth aspect, this application provides a computer program product. The computer program product includes a computer program, and when the computer program product runs on an electronic device, the electronic device is enabled to execute instructions of the method in the first aspect or any one of the implementations of the first aspect, or execute instructions of the method in the second aspect or any one of the implementations of the second aspect.

According to a sixth aspect, this application provides a chip. The chip includes a processing circuit and a transceiver pin. The transceiver pin and the processing circuit communicate with each other by using an internal connection path, and the processing circuit executes instructions of the method in the first aspect or any one of the implementations of the first aspect, or executes instructions of the method in the second aspect or any one of the implementations of the second aspect, to control a receiving pin to receive a signal, and control a sending pin to send a signal.

According to a seventh aspect, this application provides a screen projection system. The system includes a screen projection transmit end and a screen projection receive end.

For example, the screen projection transmit end is the electronic device according to the third aspect.

For example, the screen projection receive end is a television, or another device that can receive and play screen projection information sent by the screen projection transmit end.

DESCRIPTION OF EMBODIMENTS

The following clearly describes the technical solutions in embodiments of this application with reference to the accompanying drawings in embodiments of this application. It is clear that the described embodiments are some rather than all of embodiments of this application. Based on embodiments of this application, all other embodiments obtained by a person of ordinary skill in the art without creative efforts fall within the protection scope of this application.

The term "and/or" in this specification is merely an association relationship of associated objects, and indicates that three relationships may exist. For example, A and/or B may indicate the following three cases: Only A exists, both A and B exist, and only B exists.

The terms "first" and "second" in the specification and claims of embodiments of this application are used to distinguish between different objects, but are not used to describe a specific sequence of objects. For example, a first target object and a second target object are used to distinguish between different target objects, but are not used to describe a specific sequence of the target objects.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

In the descriptions of embodiments of this application, unless otherwise stated, "a plurality of" means two or more. For example, a plurality of processing units refer to two or more processing units, and a plurality of systems refer to two or more systems.

Before the technical solutions in embodiments of this application are described, an electronic device to which the technical solutions provided in embodiments of this application are applicable is first described.

Specifically, the technical solutions provided in the embodiments are applied to a screen projection transmit end, and the screen projection transmit end is a PC device (referred to as a PC below) on which a screen projection application is installed.

For example, in the embodiments, the PC may be a desktop computer or a notebook computer.

In addition, it should be noted that, in the embodiments, a screen projection receive end that receives screen projection content, such as video data, image data, and audio data, sent by the screen projection transmit end may be a large-screen device such as a television or a display.

The following describes implementation details of the technical solutions provided in embodiments of this application. The following content is merely implementation details provided for ease of understanding, but is not necessary for implementing the solutions.

Figure 1:
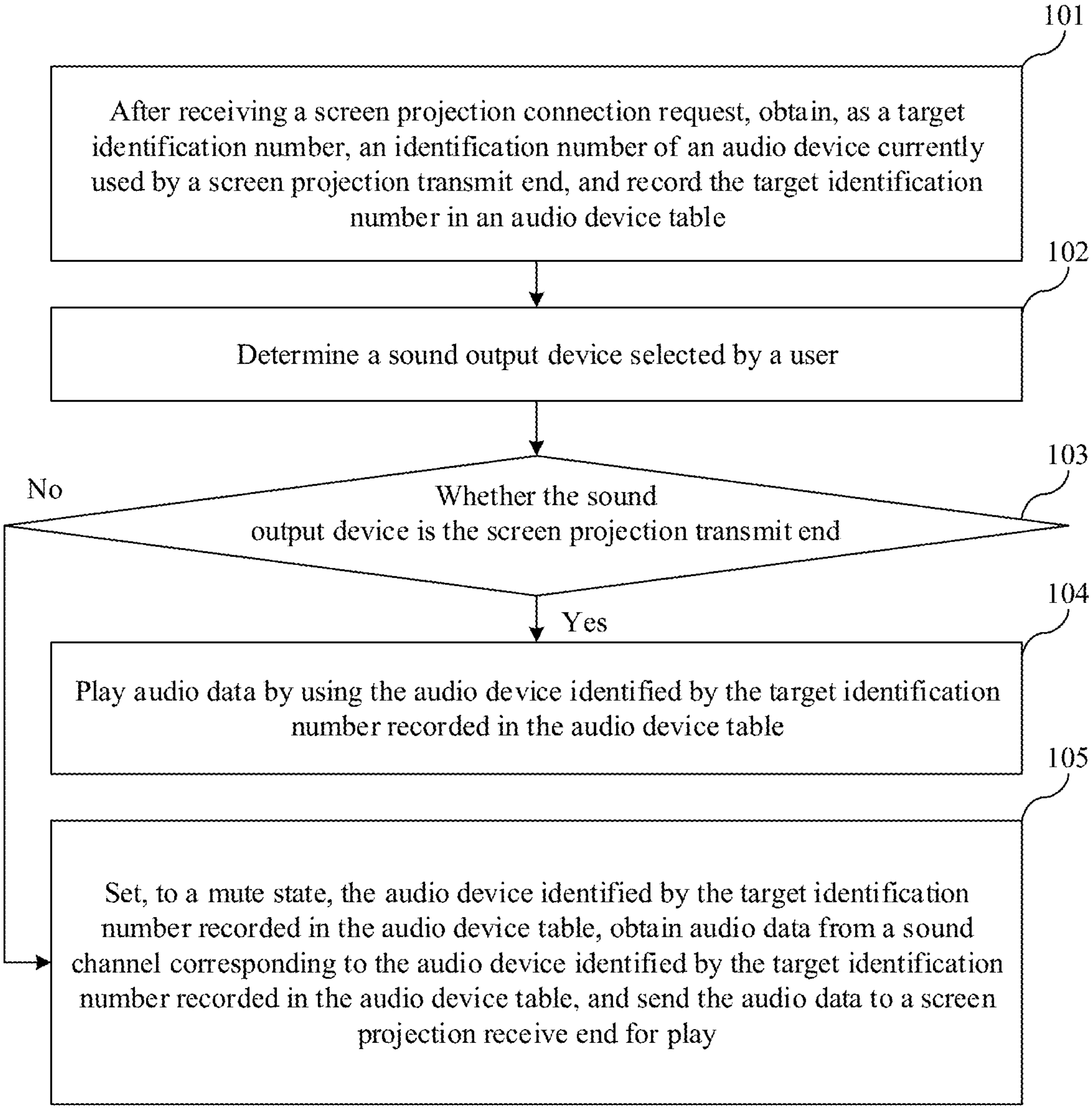
FIG. 1 is a schematic flowchart 1 of a screen projection method according to an embodiment of this application.

For example, referring to FIG. 1, an embodiment of this application has the following specific implementation steps.

- Step 101: After receiving a screen projection connection request, obtain, as a target identification number, an identification number of an audio device currently used by a screen projection transmit end, and record the target identification number in an audio device table.
- Step 102: Determine a sound output device selected by a user.
- Step 103: Determine whether the sound output device is the screen projection transmit end.
- Step 104: Play audio data by using the audio device identified by the target identification number recorded in the audio device table.
- Step 105: Set, to a mute state, the audio device identified by the target identification number recorded in the audio device table, obtain audio data from a sound channel corresponding to the audio device identified by the target identification number recorded in the audio device table, and send the audio data to a screen projection receive end for play.

Therefore, according to the screen projection method provided in this embodiment, in a screen projection scenario, the audio device currently used by the screen projection transmit end is obtained, and the identification number corresponding to the audio device is recorded in the audio device table. In this way, when it is determined that the sound output device selected by the user is the screen projection receive end, the audio data is obtained from the audio device identified by the identification number and is sent to the screen projection receive end for play, instead of a default audio device such as a speaker, to ensure that in a screen projection process, when the screen projection receive end is a sound output device, the screen projection receive end can always obtain the audio data and then play the audio data to output a sound.

Figure 2:
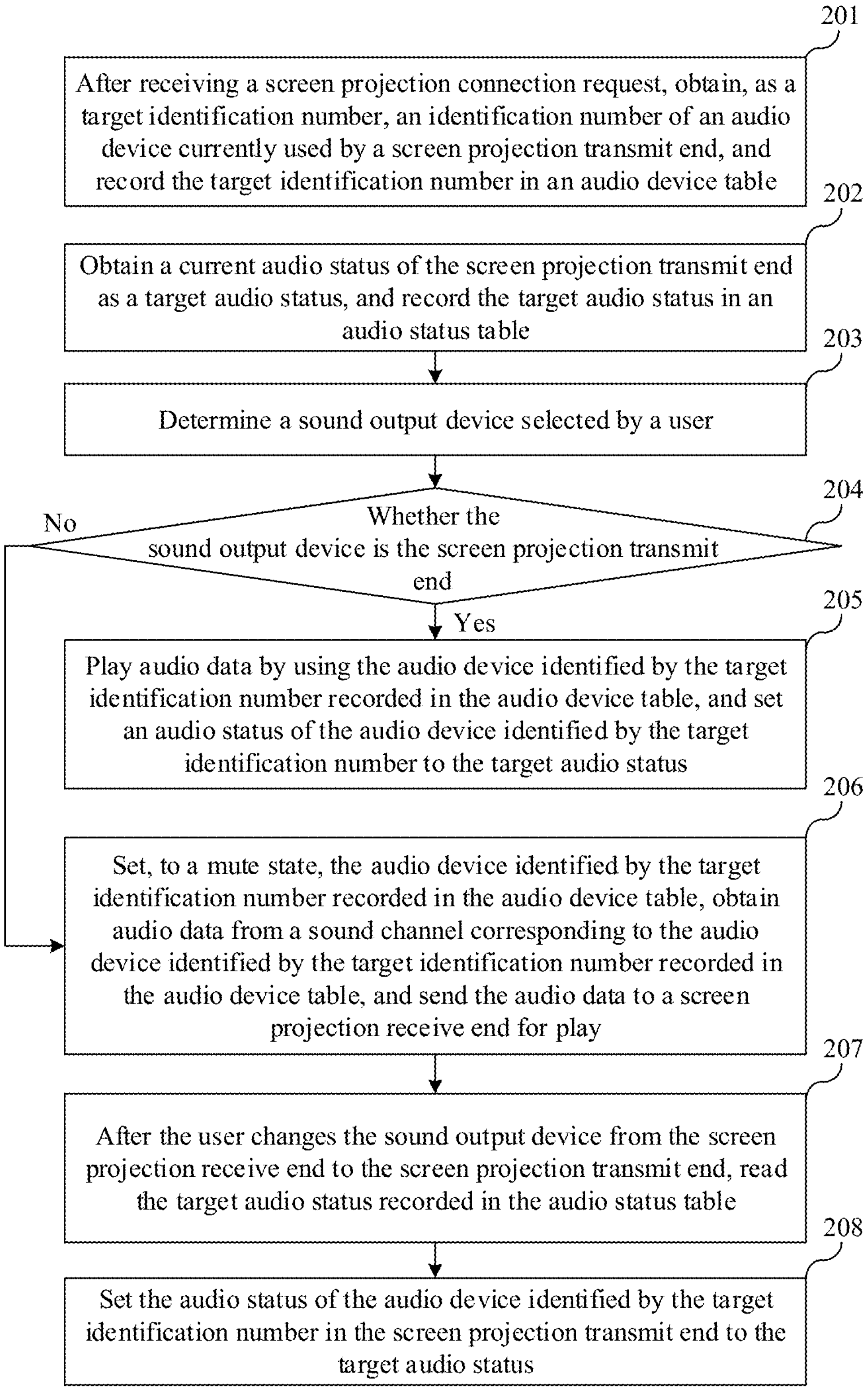
FIG. 2 is a schematic flowchart 2 of a screen projection method according to an embodiment of this application.

In addition, it should be noted that, in a screen projection scenario, in addition to a problem that the screen projection receive end cannot obtain the audio data for play, or the screen projection transmit end does not play the audio data by using an audio device expected by the user in the foregoing embodiment, there is a problem that an audio status of the screen projection transmit end is inconsistent with that expected by the user. To resolve this technical problem, referring to FIG. 2, the following implementation solutions are provided.

Step 201: After receiving a screen projection connection request, obtain, as a target identification number, an identification number of an audio device currently used by a screen projection transmit end, and record the target identification number in an audio device table.

For example, in actual application, a screen projection application may include, for example, a screen projection management module, an audio management module, and a transmission module.

For example, the screen projection management module performs data exchange with the audio management module, and the audio management module performs data exchange with the transmission module.

Specifically, in this embodiment, a screen projection connection request, a screen projection disconnection request, and a sound output device switching request in a screen projection scenario are all monitored by the screen projection management module.

For example, in some examples, an audio device that can be used by the screen projection transmit end is, for example, a built-in speaker in the screen projection transmit end, or may be a headset (such as a Bluetooth headset or a wired headset), a sound box device, or the like connected to the screen projection transmit end, which are not listed one by one herein. This is not limited in this embodiment.

Specifically, in this embodiment, the audio device currently used by the screen projection transmit end may be any one of the foregoing listed devices.

In addition, it may be understood that the foregoing identification number used to identify the audio device may be, for example, a serial number assigned by a manufacturer to the audio device, or an identification number assigned according to a preset rule.

For example, specifically, in this embodiment, for the screen projection transmit end including the screen projection management module, the audio management module, and the transmission module, the foregoing target identification number of the currently used audio device may be specifically obtained and managed by the audio management module.

It should be understood that, in actual application, to distinguish between different audio devices, each audio device has an identification number that can identify uniqueness of the audio device, and different audio devices may correspond to different sound channels. In other words, a mapping relationship shown in Table 1 exists among an audio device, an identification number, and a sound channel.

TABLE 1

Table of a mapping relationship among an audio device, an identification number, and a sound channel

| Audio device | Identification number | Sound channel |
|---|---|---|
| Speaker | 10001 | Sound channel 1 |
| Headset 1 | 10002 | Sound channel 2 |
| Headset 2 | 10003 | Sound channel 3 |
| Sound box 1 | 10004 | Sound channel 4 |

It should be understood that the foregoing description is merely an example enumerated for a better understanding of the technical solution of this embodiment, but is not used as the only limitation of this embodiment.

For ease of description, content recorded in Table 1 is still used as an example. After the screen projection connection request is received, if the audio management module learns that the audio device currently used by the screen projection transmit end is the speaker, the target identification number that needs to be recorded in the audio device table is 10001.

Correspondingly, if the audio management module learns that the audio device currently used by the screen projection transmit end is the headset 1, the target identification number that needs to be recorded in the audio device table is 10002.

To better understand the technical solutions provided in this embodiment, an implementation process of initiating the screen projection connection request is described with reference to FIG. 3 to FIG. 8 by using an example in which the screen projection transmit end is a PC device and a screen projection receive end is a large-screen device such as a television.

Figure 3:
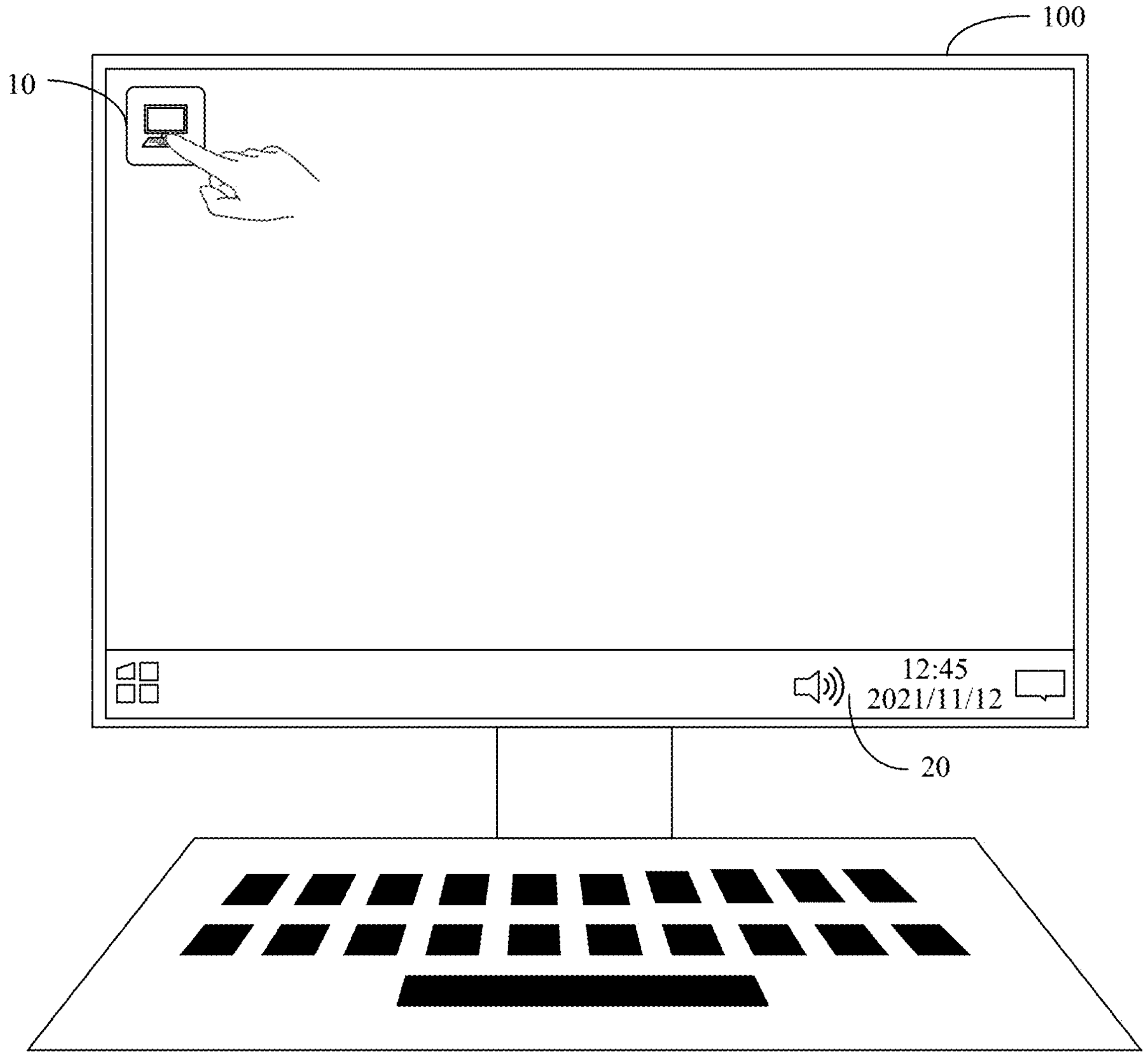
FIG. 3 is a schematic diagram of a home page of a screen projection transmit end.

Referring to FIG. 3, for example, a display interface of a PC device 100 displays a home page of the PC device 100.

It may be understood that, in actual application, the home page may include one or more controls, such as a video application control, a social application control, a browser control, and a computer management application control, which are not listed one by one herein. This is not limited in this embodiment.

Referring to FIG. 3, specifically, in the technical solution of this embodiment, the home page of the PC device 100 includes a screen projection application control 10.

In addition, a toolbar at the bottom of a home screen of the PC device 100 may include one or more controls, for example, a sound setting control 20 for setting an audio status of the PC device 100, for example, adjusting to a mute state or a non-mute state, and invoking a volume bar.

It should be noted that names and a quantity of controls displayed in a display interface of the PC device 100 in FIG. 3 and the following accompanying drawings and names and a quantity of controls in a pop-up interface are merely examples. This is not limited in this application.

Figure 4:
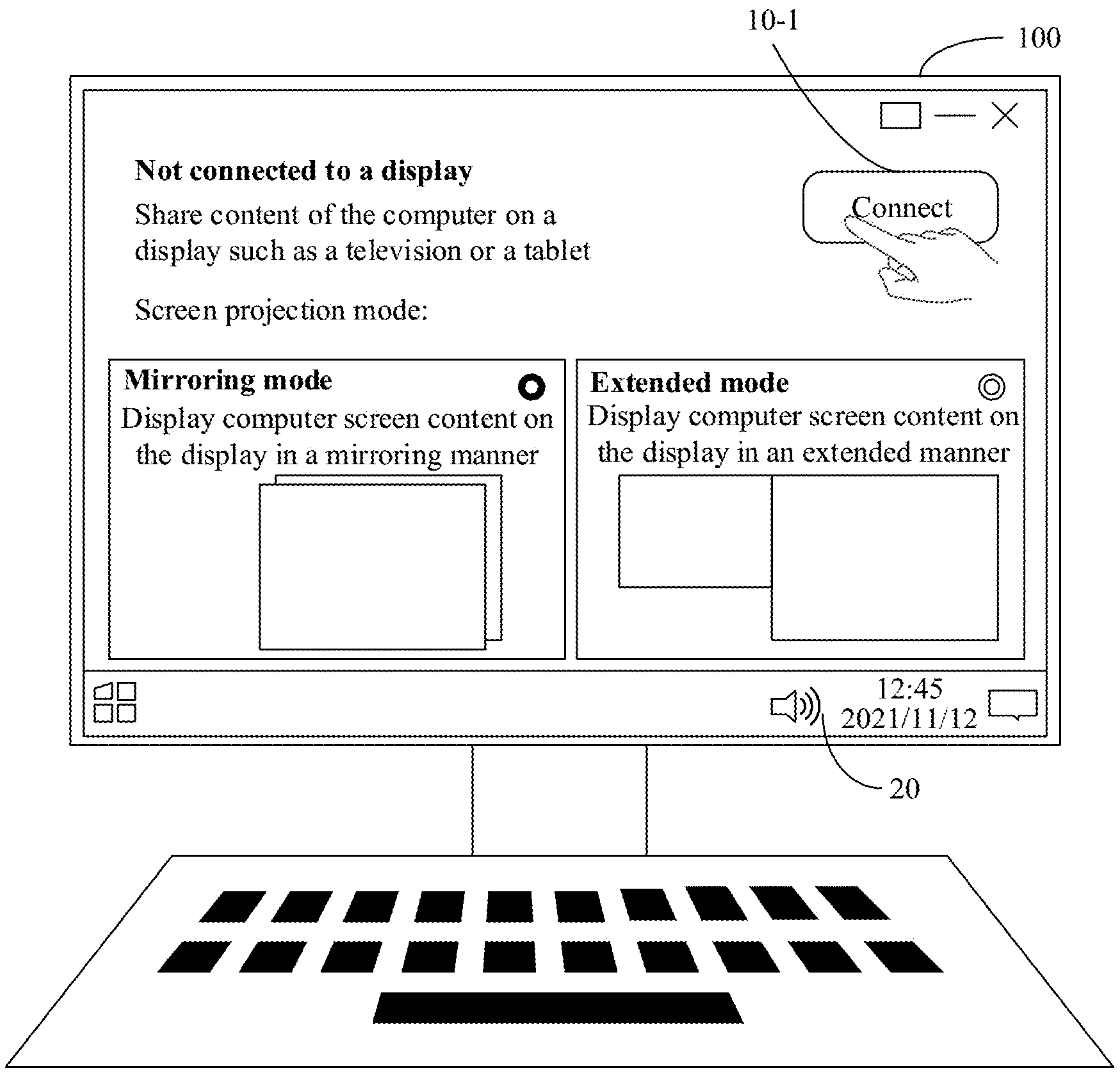
FIG. 4 is a schematic diagram 1 in which a screen projection application initiates a screen projection connection.

Referring to FIG. 3, when a user wants to project content of the PC device 100 onto a large-screen device such as a television, after the user taps the screen projection application control 10 in the home page, the PC device 100 displays, in the display interface in response to operation behavior of the user, a page for initiating a screen projection connection, as shown in FIG. 4.

Referring to FIG. 4, for example, one or more options may be included in the page for initiating a screen projection connection, for example, a "Connect" option 10-1 for initiating a screen projection connection request, and an option that allows the user to select a screen projection mode.

Referring to FIG. 4, for example, the option that allows the user to select a screen projection mode includes a "Mirroring mode" option and an "Extended mode" option.

The mirroring mode means that a computer screen, that is, content on a screen of the PC device 100, is displayed on a display of the screen projection receive end, for example, a large-screen device such as a television, in a mirroring manner. That is, after a screen projection connection between the PC device 100 and the large-screen device is established in the mirroring mode, content displayed on the display of the large-screen device is exactly the same as the content displayed on the screen of the PC device 100.

The extended mode means that a computer screen, that is, content on a screen of the PC device 100, is displayed on a display of the screen projection receive end, for example, a large-screen device such as a television, in an extended manner. That is, after a screen projection connection between the PC device 100 and the large-screen device is established in the extended mode, the display of the large-screen device displays not only the content displayed on the screen of the PC device 100 but also content on the large-screen device. This is similar to multi-screen collaboration.

In addition, it should be noted that, in actual application, a function to be implemented by the screen projection application may also be integrated into one application with another function. For example, a system management function such as drive management or power management is integrated into one application with a function for improving user experience, such as screen projection or multi-screen collaboration.

For example, the application may be referred to as "My computer" or "Computer manager". This is not limited in this embodiment.

Figure 5:
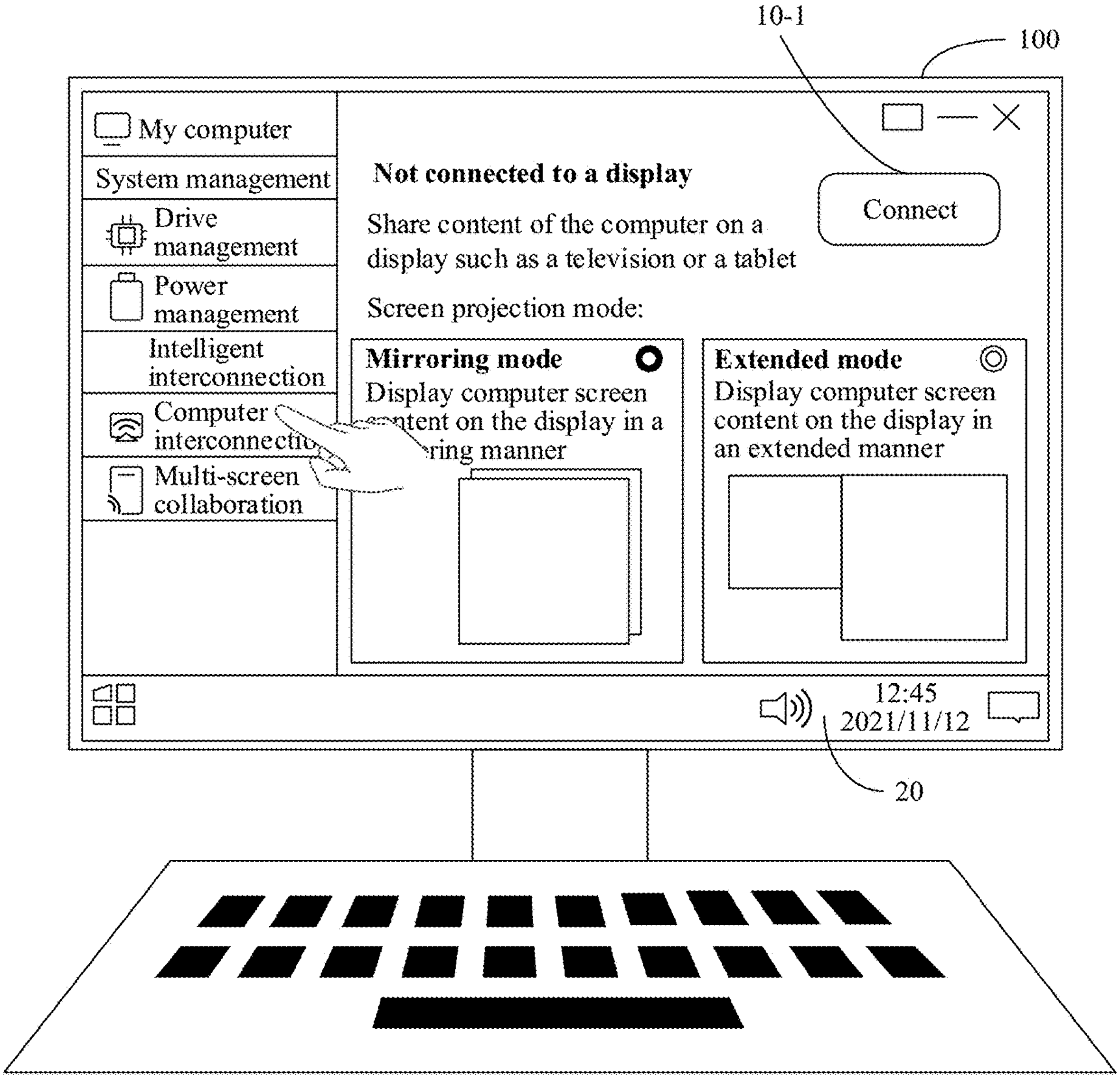
FIG. 5 is a schematic diagram 2 in which a screen projection application initiates a screen projection connection.

Referring to FIG. 5, for example, after the user taps a "Computer interconnection" option displayed in a function list, the PC device 100 responds to operation behavior of the user, and a display interface on the right side displays the page for initiating a screen projection connection in FIG. 4.

Figure 6:
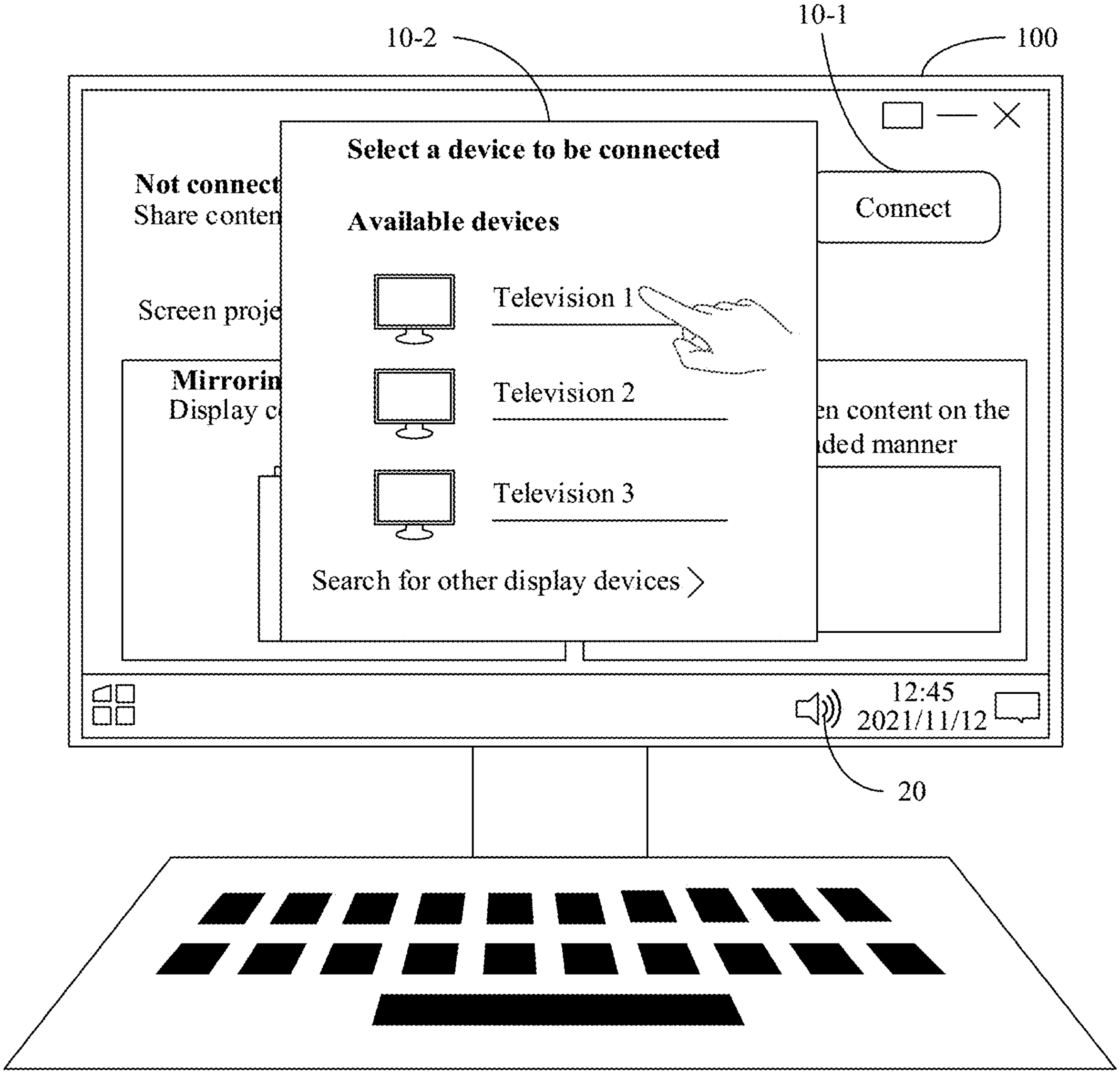
FIG. 6 is a schematic diagram of an interface for selecting a screen projection receive end.

Referring to FIG. 4 or FIG. 5, after the user selects the mirroring mode and taps the "Connect" option 10-1, the PC device 100 displays a device selection window 10-2 in the display interface in response to operation behavior of the user, as shown in FIG. 6.

Specifically, the device selection window 10-2 is used to display a currently available device, that is, a large-screen device that may be used as a screen projection receive end. For example, as shown in FIG. 5, currently available devices include a television 1, a television 2, and a television 3.

Referring to FIG. 6, the device selection window 10-2 may further include a "Search for other display devices" option. In this way, when none of the currently displayed available devices is a device to be selected by the user, the user may tap the "Search for other display devices" option to jump to a page for searching for another display device, and the PC device 100 enables a search function to search for a nearby available large-screen device.

It may be understood that, in an actual application scenario, a precondition for establishing the screen projection connection between the PC device 100 and the large-screen device may be, for example, establishing the connection in a wired connection manner or a wireless connection manner.

For example, the wireless connection manner may be that the PC device 100 and the large-screen device access a same WLAN, or successfully match through Bluetooth.

Therefore, in a screen projection scenario, in a case in which the PC device 100 and the large-screen device are connected in the wireless manner, after the user taps the "Connect" option 10-1, the PC device 100 further needs to determine whether the PC device enables Bluetooth or WLAN.

Correspondingly, if the PC device 100 does not enable Bluetooth or WLAN, in response to operation behavior of the user, the PC device 100 enables Bluetooth or WLAN before jumping to the device selection window 10-2, and then jumps to a device search interface.

Correspondingly, after a search operation ends, the PC device jumps to the device selection window 10-2, and the device selection window 10-2 displays a found available device.

In addition, it may be understood that, in actual application, an operation of enabling Bluetooth or WLAN may be completed by the PC device 100, or may be performed by the user after the PC device 100 jumps to an interface for enabling Bluetooth or WLAN. This is not limited in this embodiment.

Figure 7:
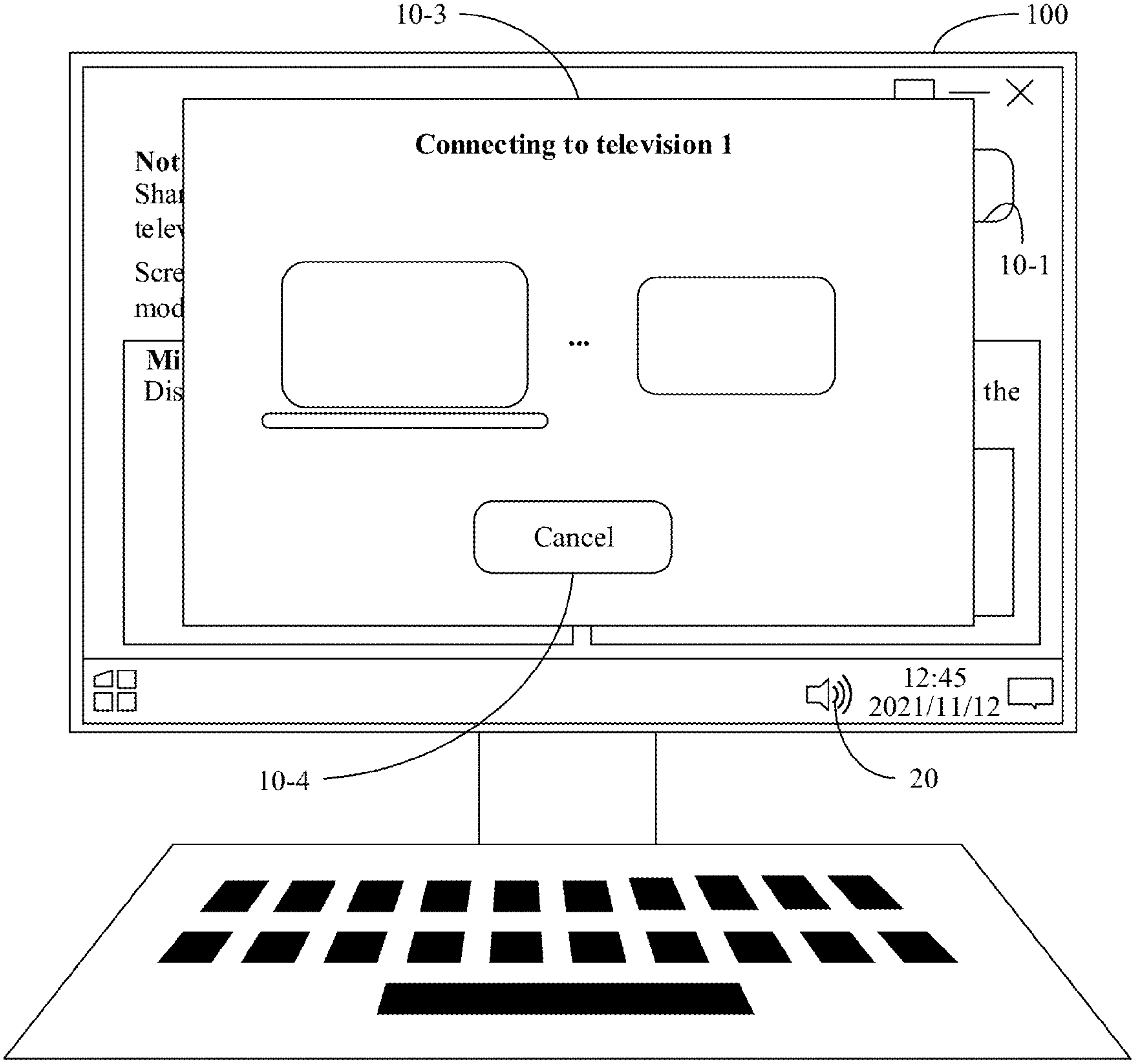
FIG. 7 is a schematic diagram of an interface for establishing a connection to a selected screen projection receive end.

Referring to FIG. 6, for example, after the user taps an option of the television 1, the PC device 100 displays a connection window 10-3 in the display interface in response to operation behavior of the user, as shown in FIG. 7.

Referring to FIG. 7, for example, the displayed connection window 10-3 may include a cancel option 10-4.

For example, when the user taps the cancel option 10-4, the PC device 100 returns to the interface in FIG. 6 in response to operation behavior of the user.

Figure 8:
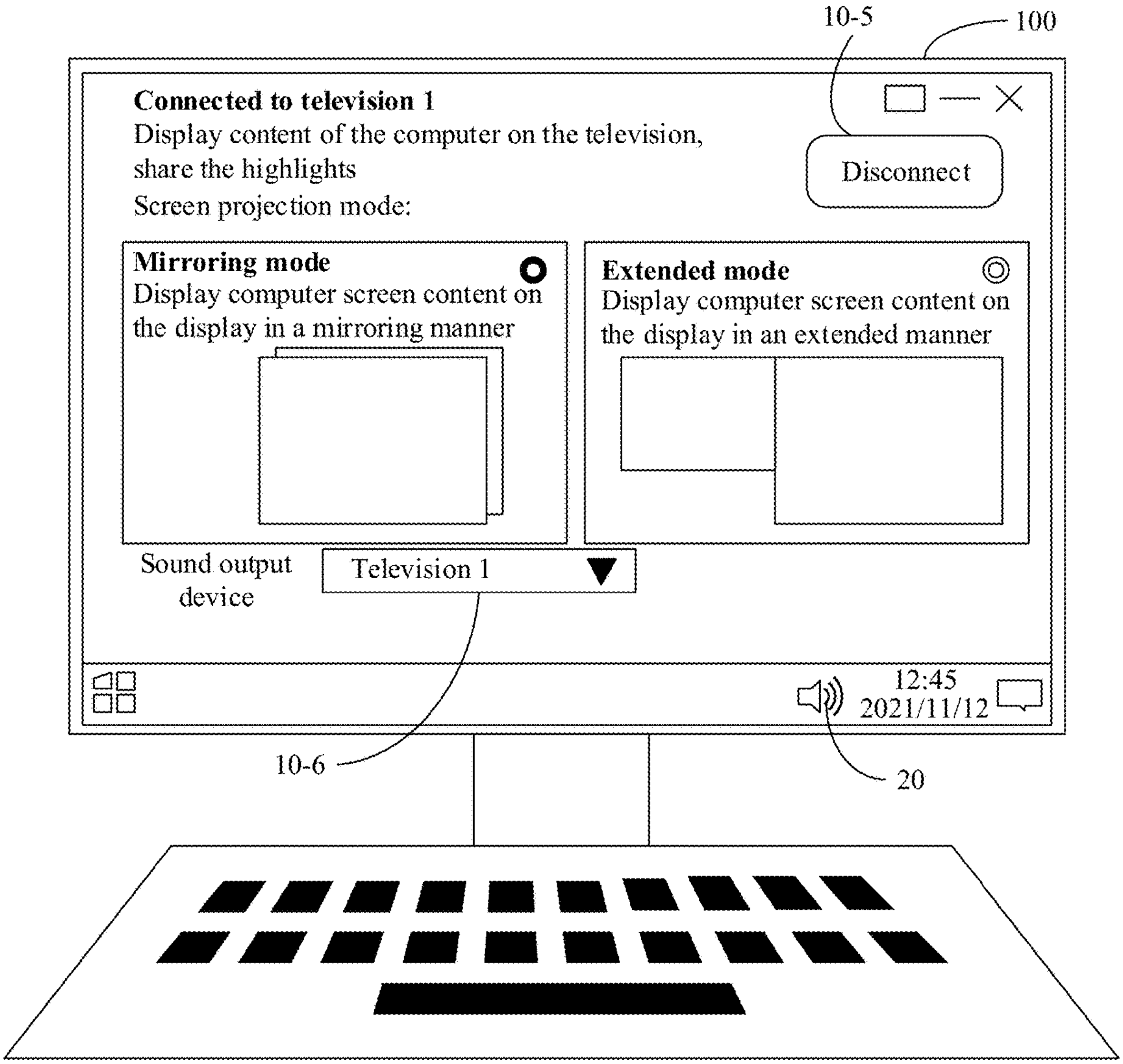
FIG. 8 is a schematic diagram of an interface of a screen projection application after screen projection connection succeeds.

For example, after the PC device 100 establishes a screen projection connection to the television 1, the display interface of the PC device 100 changes to a style shown in FIG. 8.

For example, one or more options may be included in a display interface in which screen projection connection succeeds, for example, a disconnection option 10-5, a sound output device selection option 10-6, and an option that allows the user to select a screen projection mode, such as a "Mirroring mode" option and an "Extended mode" option, that are shown in FIG. 8.

It should be understood that the foregoing description is merely an example enumerated for a better understanding of the technical solution of this embodiment, but is not used as the only limitation of this embodiment.

Step 202: Obtain a current audio status of the screen projection transmit end as a target audio status, and record the target audio status in an audio status table.

Specifically, the target audio status of the screen projection transmit end is obtained and managed by the audio management module.

It should be noted that in this embodiment, the audio status is divided into a mute state and a non-mute state. Therefore, the foregoing target audio status may be, for example, the mute state or the non-mute state.

Further, specifically, in actual application, to facilitate fast identification in a machine, the target audio status recorded in the audio status table may be represented by a pre-agreed state value (state code).

For example, in some examples, "0" may be used to represent the mute state, and "1" may be used to represent the non-mute state.

In addition, it may be understood that, specifically, in this embodiment, when there are a plurality of audio devices, for example, the speaker, the headset 1, the headset 2, and the sound box 1 shown in Table 1, that can be selected and used by the screen projection transmit end, to accurately learn of an audio status of each audio device, a mapping relationship shown in Table 2 may be established.

TABLE 2

Table of a mapping relationship between an audio device and an audio status

| Audio device | Identification number | Sound channel | Audio status | State value |
|---|---|---|---|---|
| Speaker | 10001 | Sound channel 1 | Mute state | 0 |
| Headset 1 | 10002 | Sound channel 2 | Non-mute state | 1 |
| Headset 2 | 10003 | Sound channel 3 | Mute state | 0 |
| Sound box 1 | 10004 | Sound channel 4 | Mute state | 0 |

It should be understood that the foregoing description is merely an example enumerated for a better understanding of the technical solution of this embodiment, but is not used as the only limitation of this embodiment.

Step 203: Determine a sound output device selected by a user.

Referring to FIG. 8, when the sound output device selected by the user is "television 1", it is determined that the sound output device is the screen projection receive end, that is, the screen projection receive end outputs a sound.

Correspondingly, when the sound output device selected by the user is "local device", it is determined that the sound output device is the screen projection transmit end. That is, the screen projection transmit end outputs a sound.

Step 204: Determine whether the sound output device is the screen projection transmit end.

Specifically, if the determined sound output device is the screen projection transmit end, an operation in step 205 is performed: or if the determined sound output device is not the screen projection transmit end, an operation in step 206 is performed.

Step 205: Play audio data by using the audio device identified by the target identification number recorded in the audio device table, and set an audio status of the audio device identified by the target identification number to the target audio status.

Referring to Table 1, for example, if the target identification number recorded in the audio device table is "10001", it can be learned from the mapping relationship recorded in Table 1 that the audio device identified by the target identification number is the speaker. In this case, when the sound output device is the screen projection transmit end, the speaker plays the audio data.

Referring to Table 2, for example, if a state value of the target audio status recorded in the audio status table is "0", it can be learned from the mapping relationship recorded in Table 2 that the target audio status of the speaker is the mute state. In this case, an audio status of the speaker is set to the mute state. In this way, the screen projection transmit end serving as the sound output device is mute, that is, does not output a sound. In this case, a screen of the screen projection receive end and a screen of the screen projection transmit end display a same picture, but neither of the two devices outputs a sound.

Referring to Table 2, for example, if a state value of the target audio status recorded in the audio status table is "1", it can be learned from the mapping relationship recorded in Table 2 that the target audio status of the speaker is the non-mute state. In this case, an audio status of the speaker is set to non-mute. In this way, the screen projection transmit end serving as the sound output device outputs a sound. In this case, a screen of the screen projection receive end and a screen of the screen projection transmit end display a same picture, and the screen projection receive end does not output a sound.

Step 206: Set, to a mute state, the audio device identified by the target identification number recorded in the audio device table, obtain audio data from a sound channel corresponding to the audio device identified by the target identification number recorded in the audio device table, and send the audio data to the screen projection receive end for play.

It should be noted that, when the sound output device is the screen projection receive end, regardless of whether the target audio status recorded in the audio status table is the mute state or the non-mute state, after the screen projection transmit end and the screen projection receive end establish screen projection, the screen projection transmit end cannot output a sound. Therefore, the screen projection application in the screen projection transmit end needs to invoke an interface for setting a sound of the screen projection transmit end, to set the screen projection transmit end to the mute state. Then, the audio data is sent to the screen projection receive end through the foregoing transmission module. In this way, the screen projection receive end can play the audio data after receiving the audio data, that is, the screen projection receive end can output a sound.

In addition, it should be understood that, according to the foregoing description, different audio devices may be corresponding to different sound channels, and the audio data is from a sound channel corresponding to the audio device currently used by the screen projection transmit end. Therefore, audio data to be sent to the screen projection receive end is obtained from the sound channel corresponding to the audio device identified by the target identification number recorded in the audio device table, and then the obtained audio data is sent to the screen projection receive end for play.

Referring to Table 1, for example, if the target identification number recorded in the audio device table is "10001", it can be learned, according to the mapping relationship recorded in Table 1, that the audio device identified by the target identification number is the speaker, and a sound channel corresponding to the speaker is the sound channel 1. In this case, when the audio data is sent to the screen projection receive end, specifically, the audio data is obtained from the sound channel 1, and then the obtained audio data is sent to the screen projection receive end for play:

Correspondingly, if the target identification number recorded in the audio device table is "10002", it can be learned, according to the mapping relationship recorded in Table 1, that the audio device identified by the target identification number is the headset 1, and a sound channel corresponding to the headset 1 is the sound channel 2. In this case, when the audio data is sent to the screen projection receive end, specifically, the audio data is obtained from the sound channel 2, and then the obtained audio data is sent to the screen projection receive end for play.

It should be understood that the foregoing description is merely an example enumerated for a better understanding of the technical solution of this embodiment, but is not used as the only limitation of this embodiment.

For ease of description, in this embodiment, after the screen projection connection is established between the screen projection transmit end and the screen projection receive end, it is considered by default that the screen projection receive end is the sound output device, that is, it is considered by default that the screen projection receive end outputs a sound. This scenario is shown in FIG. 9.

Figure 9:
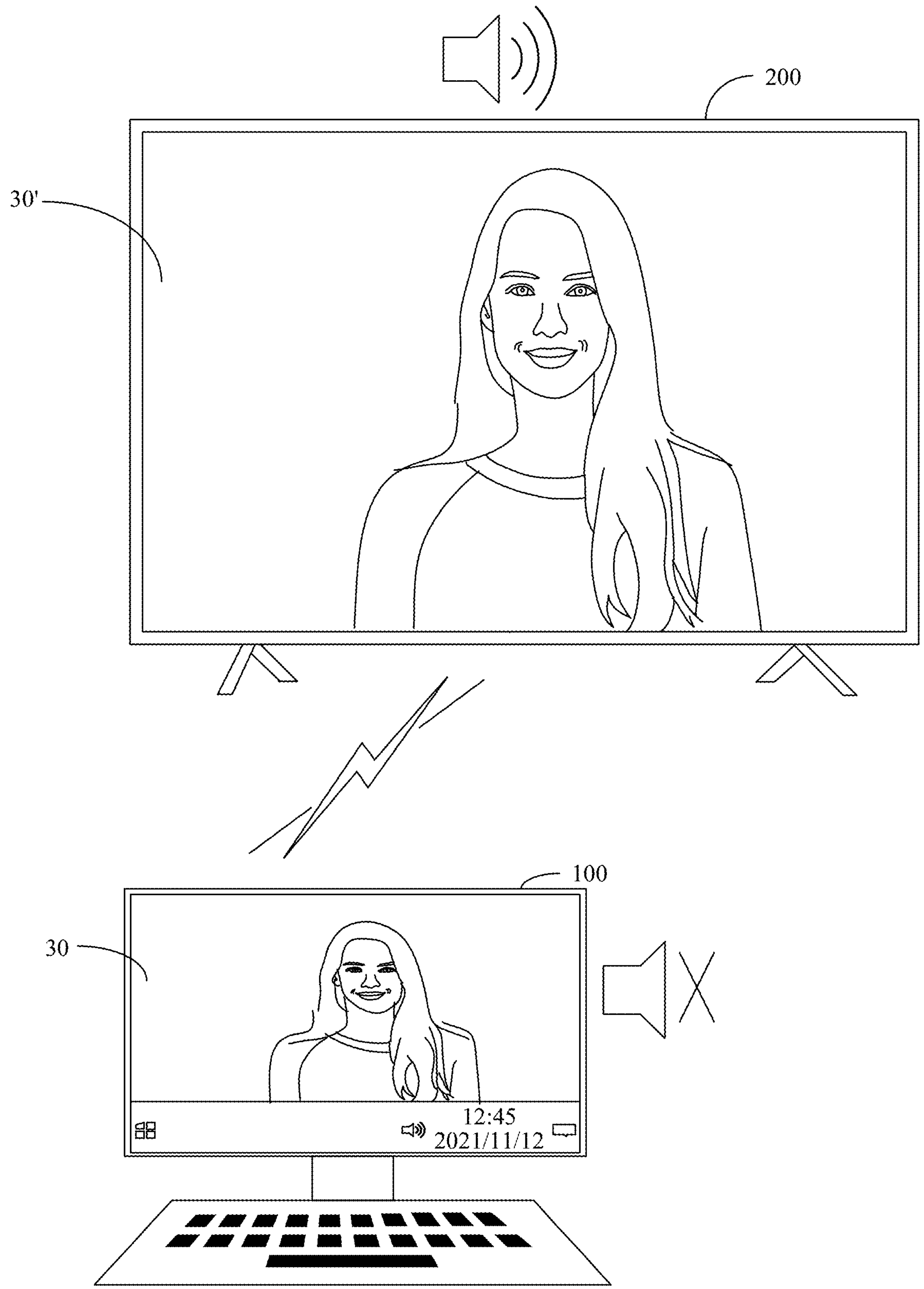
FIG. 9 is a schematic diagram of interfaces of a screen projection transmit end and a screen projection receive end after screen projection connection succeeds.

Referring to FIG. 9, for example, after the PC device 100 (a screen projection transmit end) establishes a screen projection connection to a television 200 (a screen projection receive end), if the television 200 is a sound output device, in the mirroring mode, a screen of the PC device 100 displays a picture 30, and a screen of the television 200 displays content that is the same as the picture 30, for example, a picture 30' displayed on the screen of the television 200 in FIG. 9. In addition, the PC device 100 does not output a sound and the television 200 outputs a sound.

It may be understood that for a process of obtaining audio data sent to the television 200, refer to the foregoing description of step 206. Details are not described herein again.

In addition, it should be noted that when the sound output device is the screen projection receive end, an operation for setting the screen projection receive end to the mute state is implemented by a system instead of being modified by the user. Therefore, the state is not recorded in the audio status table, and no interference is caused to an operation of the user.

In addition, it may be understood that, in actual application, the audio data sent by the transmission module to the television 200 is usually an audio data packet obtained after audio encoding is performed. In this way, a data frame loss caused by direct transmission of the audio data can be avoided, and direct exposure of user privacy caused by the audio data can be avoided.

In addition, in actual application, when the screen projection connection between the PC device 100 and the television 200 is established by using the screen projection application, protocols followed by the PC device 100 and the television 200 are different. Therefore, an encoding manner may be determined according to a protocol type corresponding to the audio data, and then the audio data is encoded in the determined encoding manner.

Specifically, when sending the audio data to the screen projection receive end, for example, the foregoing television 200, the transmission module needs to first determine a protocol type corresponding to the audio data: then determine a target encoding manner of the audio data according to the protocol type: then encode the audio data in the target encoding manner to obtain an audio data packet: and finally send the audio data packet to the screen projection receive end.

Correspondingly, when the audio data packet is sent to the screen projection receive end, the protocol type is sent to the screen projection receive end.

In this way, the screen projection receive end, such as the television 200, may know which decoding manner needs to be used to decode the audio data packet, thereby ensuring accuracy of a decoding result.

In addition, it should be noted that, for the foregoing determining the target encoding manner of the audio data according to the protocol type, for example, the target encoding manner may be determined by using an encoding and decoding mapping relationship table that is pre-negotiated by the screen projection transmit end and the screen projection receive end, that is, the encoding and decoding mapping relationship table is searched for an encoding manner corresponding to the protocol type, and then a found encoding manner is determined as the target encoding manner.

In this way, the encoding manner may not be directly transmitted between the screen projection transmit end and the screen projection receive end, so that content transmitted between the screen projection transmit end and the screen projection receive end is prevented from being intercepted, thereby ensuring that content of the audio data is not stolen by a wrongdoer. In particular, conference security is effectively ensured for an audio and video conference scenario.

In addition, it should be noted that, in an actual application scenario, after the PC device 100 establishes the screen projection connection to the large-screen device, that is, in a screen projection process, the user may manually modify an audio device used by the PC device 100, or an audio device with a high priority accesses the PC device 100. Therefore, to ensure that the target identification number recorded in the audio device table can be dynamically updated according to an actual change, whether the audio device currently used by the PC device 100 changes needs to be monitored.

Specifically, in this embodiment, to monitor whether the audio device changes, an audio device monitoring module provided by a system used by the PC device 100 is used.

Specifically, after step 201 is completed, the PC device 100 may invoke the foregoing audio device monitoring module, so that the audio device monitoring module monitors whether the audio device currently used by the PC device 100 changes.

Correspondingly, when monitoring that the audio device currently used by the screen projection transmit end changes, the audio device monitoring module obtains an identification number corresponding to a changed audio device: and then sends the obtained identification number to the audio management module. The audio management module updates, based on the identification number corresponding to the changed audio device, the target identification number recorded in the audio device table.

In addition, it should be noted that, in an actual application scenario, a priority of a headset is higher than priorities of a speaker and a sound box, that is, when the PC device 100 is connected to a headset, audio data is preferably output from a sound channel corresponding to the headset. Therefore, that the audio device with a high priority accesses the PC device 100 may be: When the audio device currently used by the PC device 100 is a speaker, a Bluetooth headset or a wired headset establishes a connection to the PC device 100.

For ease of description, monitoring performed by the audio device monitoring module on the change of the audio device and update performed by the audio management module on the target identification number are described below with reference to FIG. 10 to FIG. 13.

Figure 10:
FIG. 10 is a schematic diagram 1 in which a user switches an audio device of a screen projection transmit end.

Referring to FIG. 10, for example, in a screen projection process, if the user wants to switch the audio device currently used by the PC device 100 from the speaker to the headset 1, the user may first tap the sound setting control 20.

Figure 11:
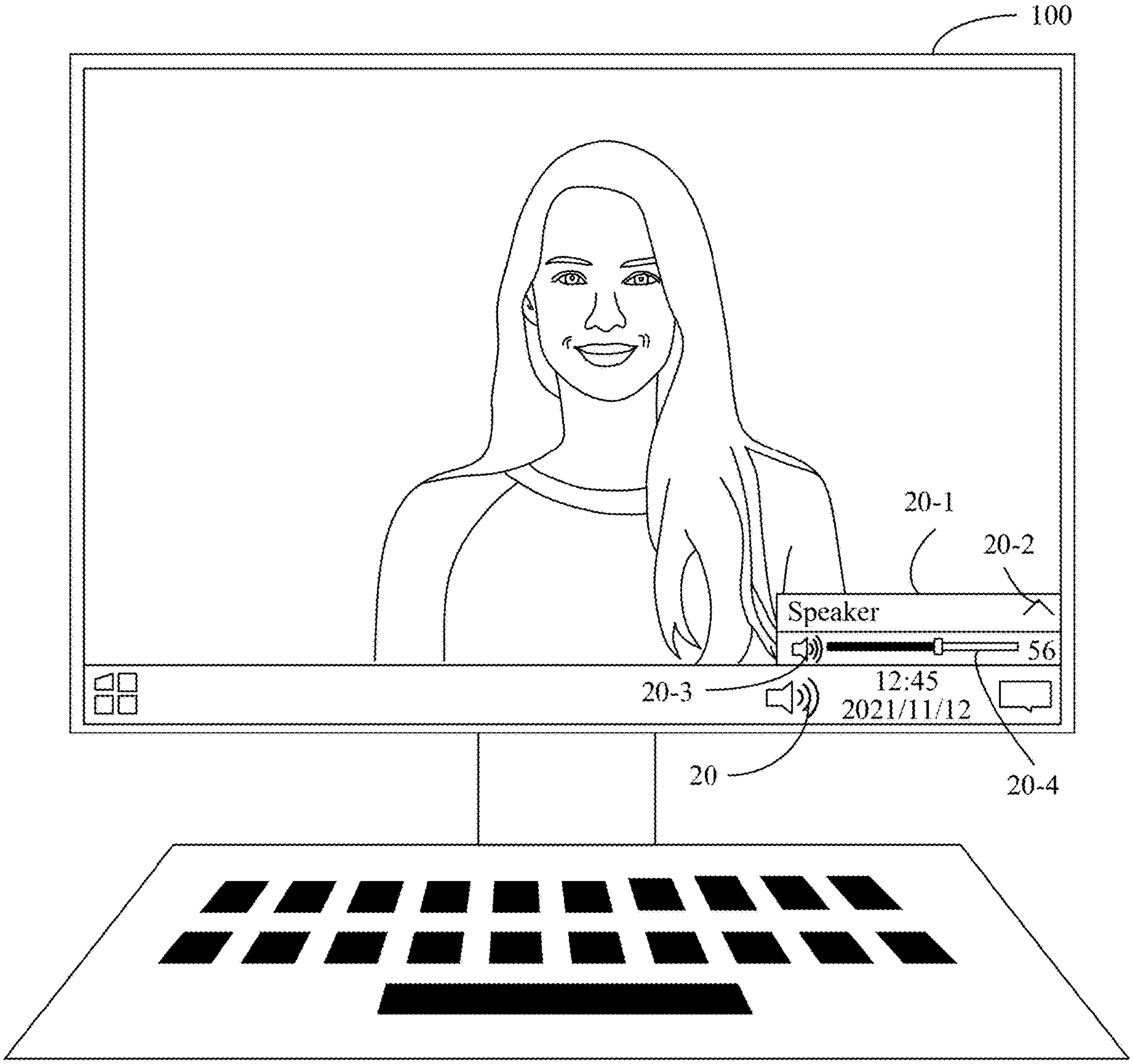
FIG. 11 is a schematic diagram 2 in which a user switches an audio device of a screen projection transmit end.

Correspondingly, after the user taps the sound setting control 20, the PC device 100 displays a sound setting window 20-1 in response to operation behavior of the user, as shown in FIG. 11.

Referring to FIG. 11, for example, an audio device selection control 20-2, the currently used audio device such as a speaker, an audio status switching control 20-3 corresponding to the speaker, and a volume bar control 20-4 for adjusting volume are displayed in the sound setting window 20-1.

Figure 12:
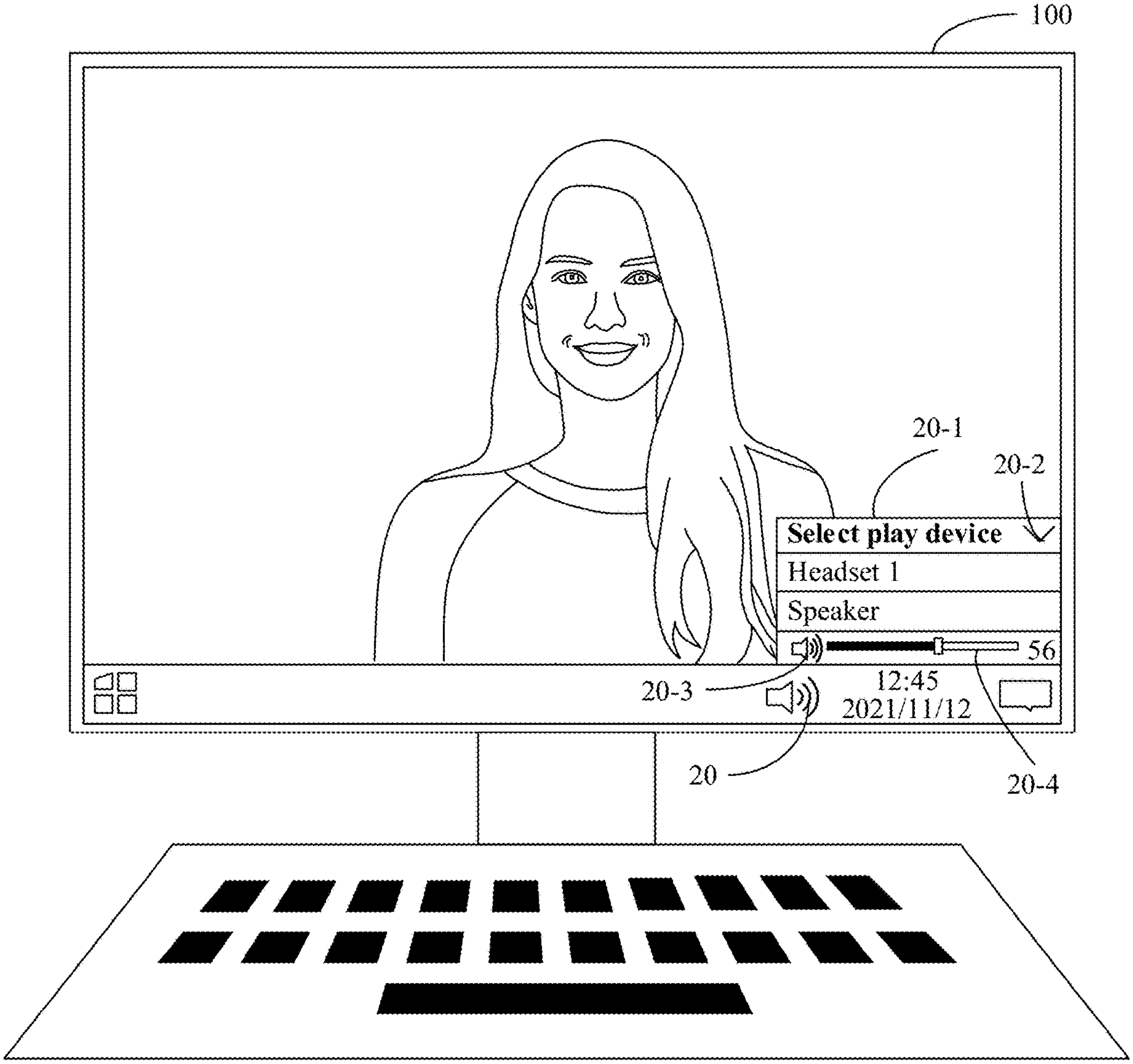
FIG. 12 is a schematic diagram 3 in which a user switches an audio device of a screen projection transmit end.

Referring to FIG. 11, after the user taps the audio device selection control 20-2, the PC device 100 displays, in response to operation behavior of the user, a list for selecting a play device, as shown in FIG. 12.

Referring to FIG. 12, for example, all audio devices, such as a headset 1 and a speaker in FIG. 12, that can be selected by the PC device 100 are displayed in the list for selecting a play device.

Figure 13:
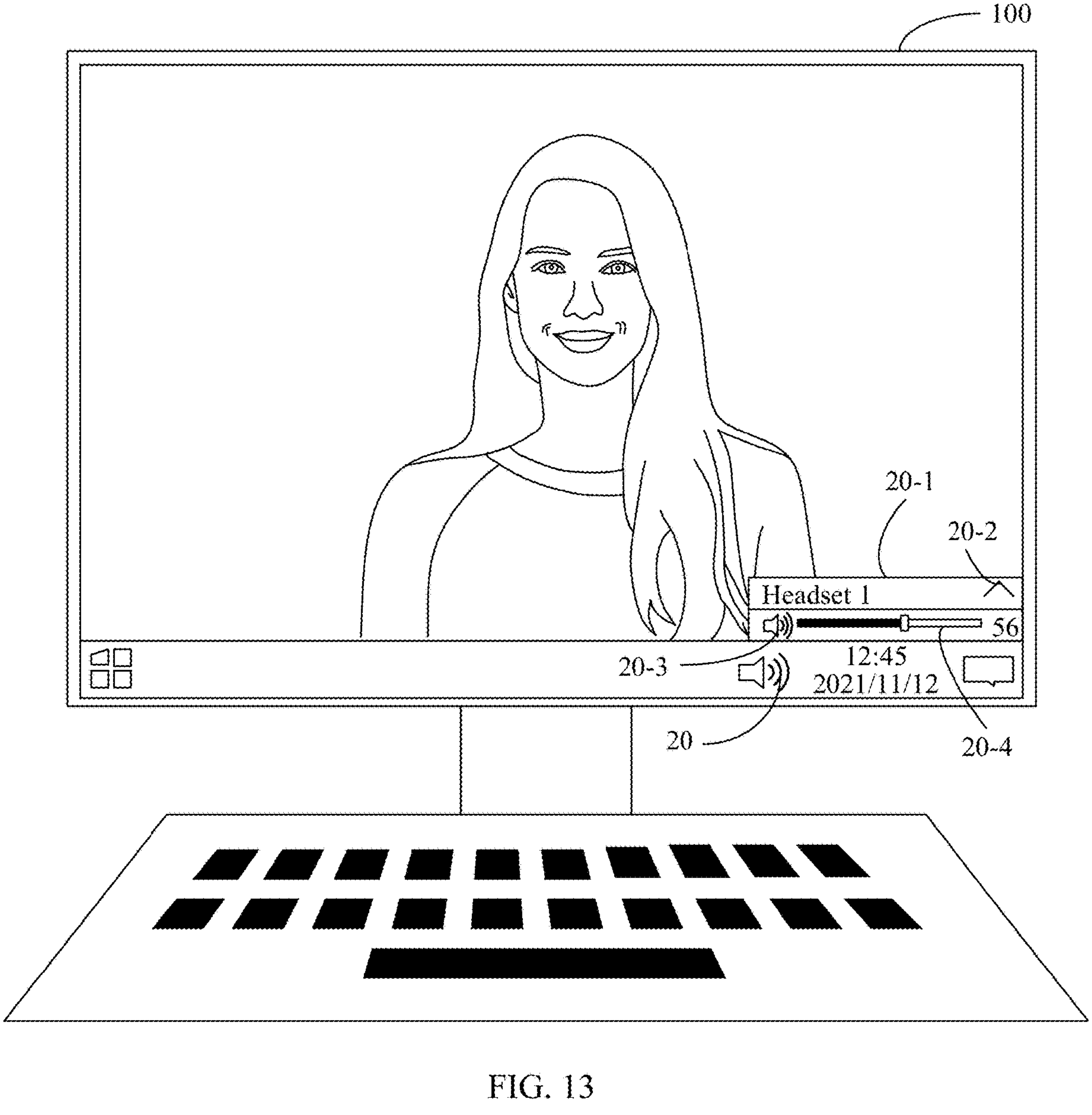
FIG. 13 is a schematic diagram 4 in which a user switches an audio device of a screen projection transmit end.

Referring to FIG. 12, after the user taps an option of the headset 1, the PC device 100 responds to operation behavior of the user, and the PC device 100 switches the currently used audio device from the speaker to the headset 1. Content displayed in the sound setting window 20-1 after switching is shown in FIG. 13.

It may be understood that, in the implementation shown in FIG. 10 to FIG. 13, the speaker and the headset 1 share one audio status switching control 20-3 and one volume bar control 20-4 for adjusting volume.

Specifically, in this case, when the audio device currently used by the PC device 100 is the speaker, an operation on the audio status switching control 20-3 and the volume bar control 20-4 for adjusting volume is essentially adjusting an audio status and volume of the speaker.

Correspondingly, when the audio device currently used by the PC device 100 is the headset 1, an operation on the audio status switching control 20-3 and the volume bar control 20-4 for adjusting volume is essentially adjusting an audio status and volume of the headset 1.

It may be understood that, for this implementation, in some examples, a mapping relationship among a current audio status of the audio status switching control 20-3, a current volume value of the volume bar control 20-4, and a currently used audio device may be maintained, so that when it is detected that the audio device changes, the audio status corresponding to the audio status switching control 20-3 and the volume value corresponding to the volume bar control 20-4 are adjusted according to the change.

In addition, it may be understood that, in some other implementation scenarios, the audio status switching control 20-3 and the volume bar control 20-4 for adjusting volume may be set based on a quantity of audio devices that can be selected by the PC device 100. In this way, when the audio device changes, the audio status switching control 20-3 and the volume bar control 20-4 for adjusting volume may be used to set an audio status and a volume value.

It should be understood that the foregoing description is merely an example enumerated for a better understanding of the technical solution of this embodiment, but is not used as the only limitation of this embodiment.

In addition, it should be noted that, in an actual application scenario, after the PC device 100 establishes a screen projection connection to the large-screen device, that is, in a screen projection process, the user may further manually modify the audio status of the audio device currently used by the PC device 100. Therefore, to ensure that the state value of the target audio status recorded in the audio status table can be dynamically updated according to an actual modification of the user, the audio status switching control needs to be monitored.

Specifically, in this embodiment, to monitor whether the user taps the audio status switching control corresponding to the audio device currently used by the PC device 100, the audio status monitoring module provided by the system used by the PC device 100 is used.

Specifically, after step 202 is completed, the PC device 100 may invoke the audio status monitoring module, and the audio status monitoring module monitors a tap operation of the user on the audio status switching control corresponding to the audio device currently used by the PC device 100.

It should be noted that when the audio status corresponding to the audio status switching control is the foregoing mute state, after the audio status switching control is tapped, the audio status is switched from the mute state to the foregoing non-mute state.

Correspondingly, when the audio status corresponding to the audio status switching control is the non-mute state, after the audio status switching control is tapped, the audio status is switched from the non-mute state to the mute state.

Therefore, the tap operation on the audio status switching control is monitored by using the audio status monitoring module, and after the tap operation performed by the user on the audio status switching control corresponding to the audio device identified by the target identification number is monitored, the target audio status recorded in the audio status table is updated based on the switched audio status.

For example, when the audio device currently used by the PC device 100 before the screen projection connection is the speaker, and a state value corresponding to the target audio status of the speaker is "0", after the screen projection connection, if the audio device does not change, the audio status of the speaker changes to the non-mute state after it is monitored that the user taps the audio status switching control. In this case, for example, an update for the audio status table may be changing the recorded state value corresponding to the speaker from "O" to "1".

Correspondingly, when the audio device currently used by the PC device 100 before the screen projection connection is the speaker, and a state value corresponding to the target audio status of the speaker is "0", after the screen projection connection, if the audio device changes to the headset, and a state value corresponding to the target audio status of the headset is "1", the audio status of the headset changes to the mute state after it is monitored that the user taps the audio status switching control. In this case, for example, an update for the audio status table may be changing the recorded state value corresponding to the headset from "1" to "0".

To better understand modification of the audio status of the audio device currently used by the PC device 100, the following provides descriptions by using an example in which the audio device used by the PC device in a screen projection process is the headset 1.

Referring to FIG. 13, for example, in a screen projection process, if the user wants to modify the audio status of the headset 1 (the headset is in the non-mute state before modification), the user may tap the audio status switching control 20-3.

Figure 14:
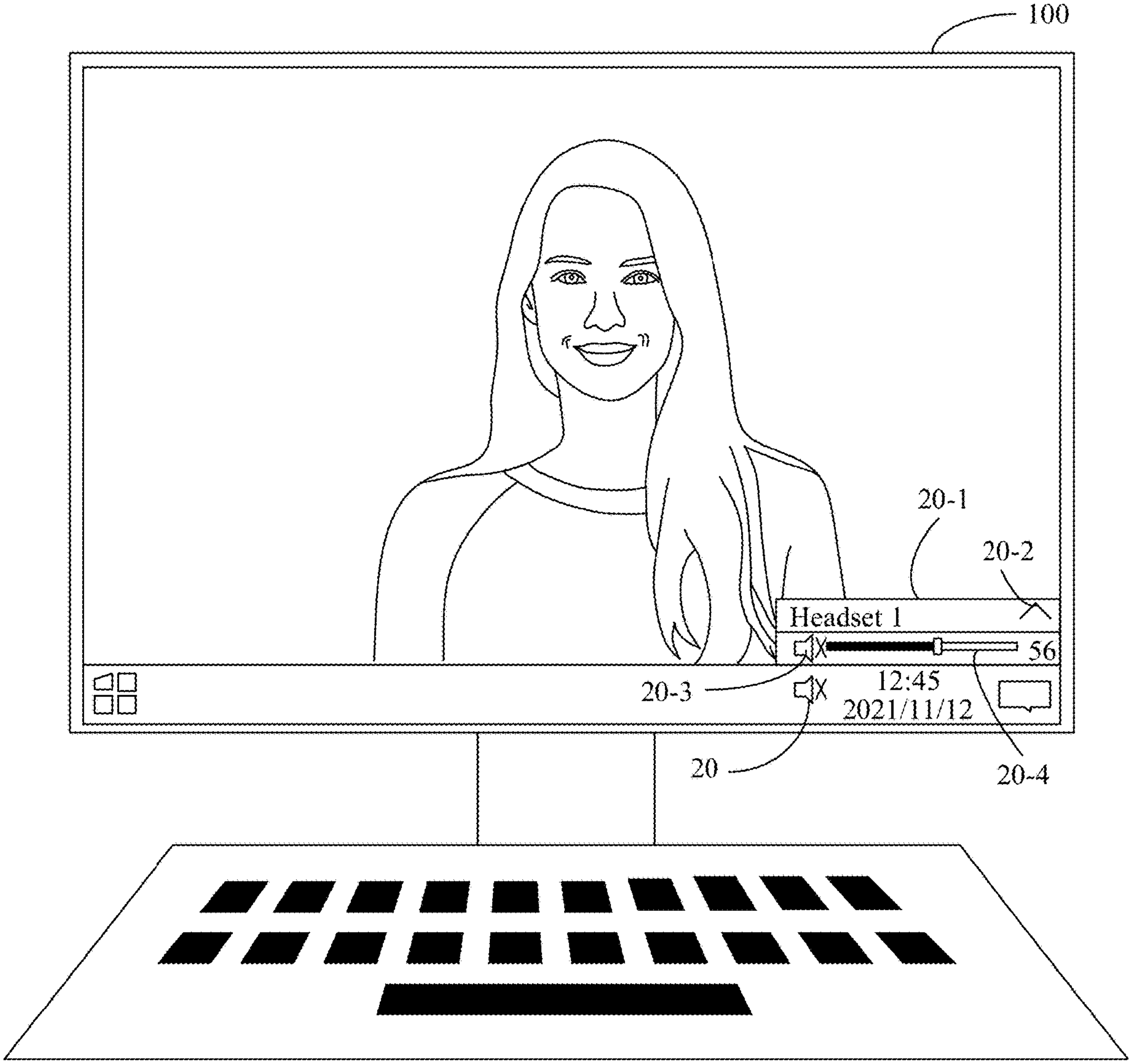
FIG. 14 is a schematic diagram in which a user adjusts a headset 1 of a screen projection transmit end to mute.

Correspondingly, when the audio status monitoring module monitors the tap operation, the PC device 100 responds to operation behavior of the user, an icon style of the audio status switching control 20-3 changes from a style shown in FIG. 13 to an icon style of the audio status switching control 20-3 in FIG. 14, and an icon style of the sound setting control 20 also changes from a style shown in FIG. 13 to an icon style of the sound setting control 20 in FIG. 14. That is, it indicates that the target audio status of the headset 1 changes from the non-mute state to the mute state. In this case, a state value corresponding to the headset 1 that is recorded in the audio status table is changed from "1" indicating the non-mute state to "0" indicating the mute state.

In this way, the target audio status that is of the audio device currently used by the screen projection transmit end and that is recorded in the audio status table can be changed according to an actual operation of the user, thereby ensuring that when the screen projection connection is disconnected or the sound output device is changed to the screen projection transmit end, an audio status that is set based on the target audio status of the currently used audio device recorded in the audio status table is consistent with an audio status actually desired by the user.

Specifically, in actual application, setting, based on the target audio status corresponding to the currently used audio device recorded in the audio status table, the audio status of the audio device currently used by the PC device 100 may include, for example, a scenario in which the sound output device is switched to the PC device 100 and a scenario in which the screen projection connection is disconnected.

For example, for the scenario in which the sound output device is switched to the PC device 100, an implementation procedure is shown in step 207 and step 208.

Step 207: After the user changes the sound output device from the screen projection receive end to the screen projection transmit end, read the target audio status recorded in the audio status table.

Step 208: Set the audio status of the audio device identified by the target identification number in the screen projection transmit end to the target audio status.

Figure 15:
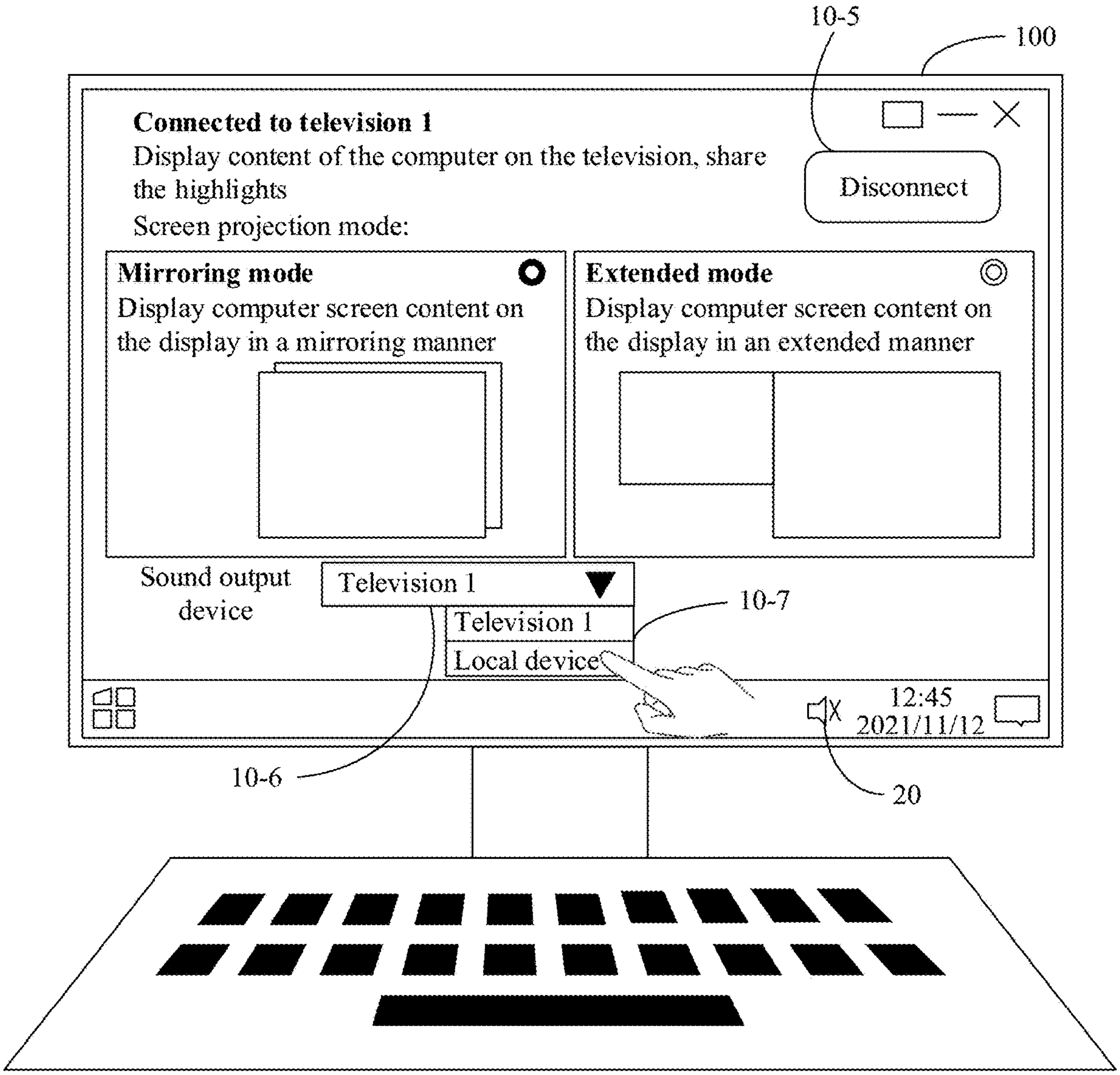
FIG. 15 is a schematic diagram obtained when a sound output device is switched to a local device.

Referring to FIG. 15, for example, after the user taps the sound output device selection option 10-6, the PC device 100 displays a sound output device selection control 10-7 in response to operation behavior of the user.

For example, in some examples, in a scenario in which audio data is either played by the screen projection transmit end or played by the screen projection receive end, the sound output device selection control 10-7 may include a screen projection receive end such as a television 1 in FIG. 15 and a screen projection transmit end such as a local device in FIG. 15 that are currently connected.

For example, in some other examples, the audio data may alternatively be played by another third-party audio device. For example, in a scenario of sound box-based play, the sound output device selection control 10-7 may include an available third-party audio device in addition to the television 1 and the local device shown in FIG. 15.

Referring to FIG. 15, if the user selects the local device option displayed in the sound output device selection control 10-7, the sound output device is switched from the television 1 to the PC device 100. The PC device 100 responds to operation behavior of the user, and content displayed in the sound output device option 10-6 changes from the television 1 in FIG. 15 to the local device in FIG. 16.

In an existing solution, that is, a solution in which the screen projection method provided in this embodiment is not used, after the user switches the sound output device from the television 200 to the PC device 100, regardless of whether the user modifies the audio status of the audio device currently used by the PC device in the screen projection process, the PC device 100 outputs a sound in the screen projection process, but the television 200 does not output a sound.

Figure 17:
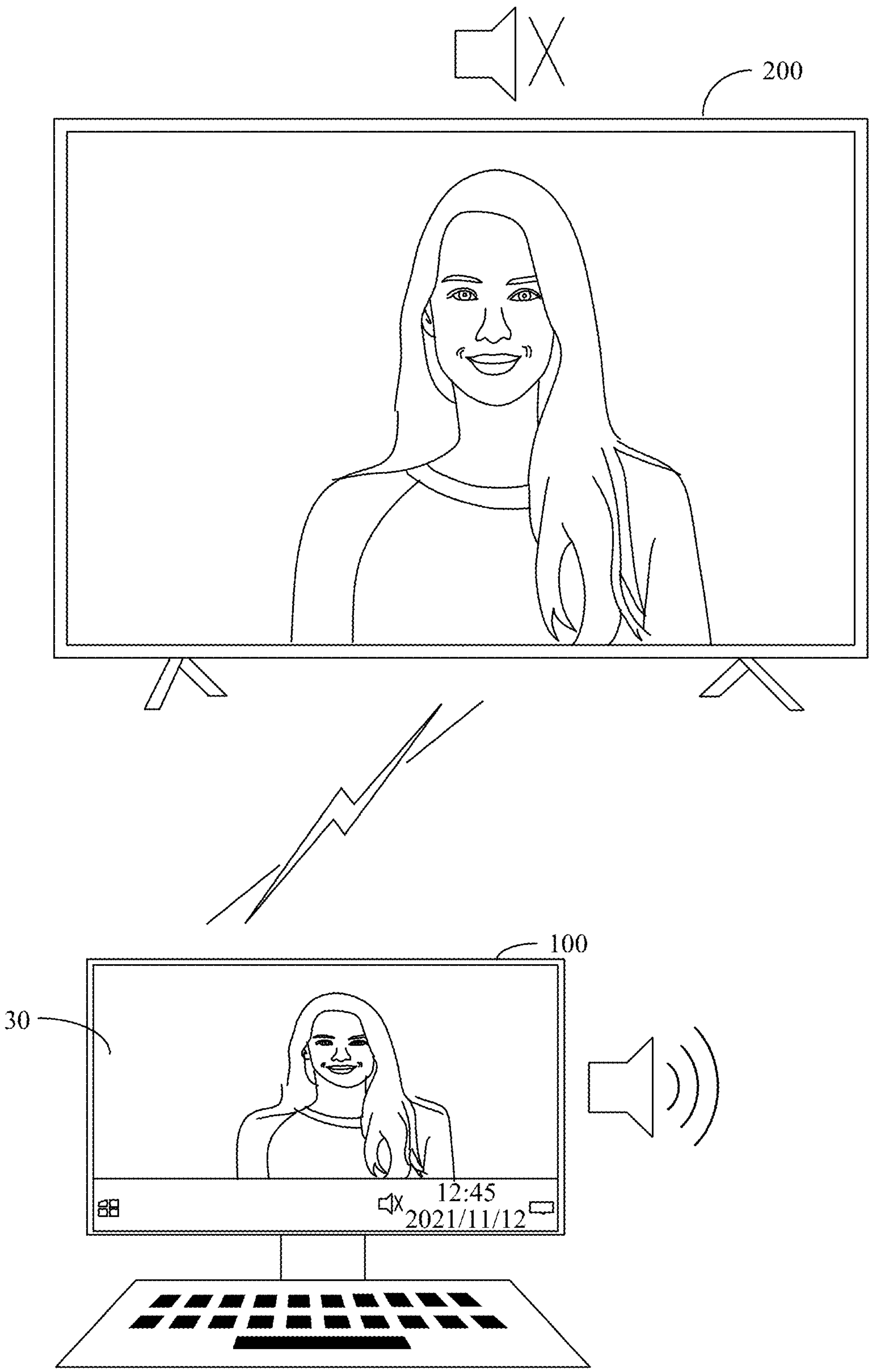
FIG. 17 is a schematic diagram 1 of sound changes of a screen projection transmit end and a screen projection received end after a sound output device is switched to a local device.

For example, as shown in FIG. 17, the sound setting option 20 displays the audio device currently used by the PC device 100. For example, an audio status of the headset 1 is the mute state. However, in a scenario in which the PC device 100 is a sound output device, in an existing implementation solution, the PC device 100 may play audio data by using a default speaker, that is, still output a sound.

It can be learned that in the existing solution, in a screen projection process, after the sound output device is switched from the television 200 to the PC device 100, the audio device used by the PC device 100 to play the audio data is inconsistent with an expectation of the user, and the audio status is inconsistent with an expectation of the user.

Specifically, in the technical solution provided in this embodiment, the target identification number recorded in the audio device table and the target audio status in the audio status table are updated in real time according to an operation of the user. In a screen projection process, after the sound output device is switched from the television 200 to the PC device 100, the audio data is played by the audio device corresponding to the target identification number recorded in the audio device table, and the audio status of the audio device that plays the audio data is consistent with the target audio status recorded in the audio status table. In this way, after the sound output device is switched from the television 200 to the PC device 100, the audio device used by the PC device 100 to play the audio data and the audio status of the audio device that plays the audio data can be consistent with those expected by the user, thereby resolving a problem of audio device inconsistency and audio status inconsistency in the existing solution.

Figure 18:
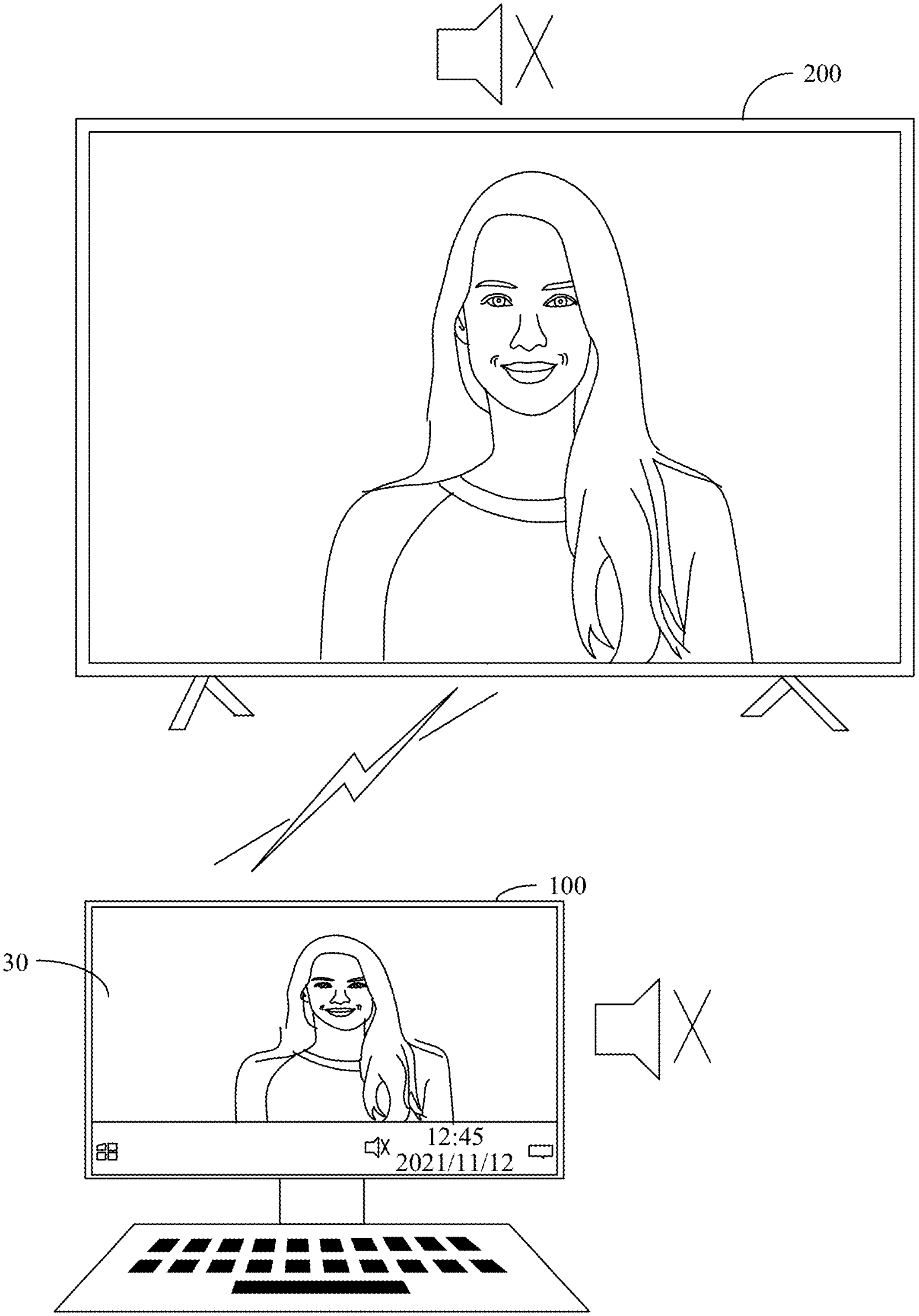
FIG. 18 is a schematic diagram 2 of sound changes of a screen projection transmit end and a screen projection received end after a sound output device is switched to a local device.

For example, it is assumed that the target identification number recorded in the audio device table is an identification number of the headset 1. Referring to FIG. 18, the audio status of the PC device 100 displayed in the sound setting option 20 is an audio status of the headset 1.

Referring to FIG. 18, for example, the audio status of the headset 1 is the mute state. In the technical solution provided in this embodiment, in a scenario in which the PC device 100 is a sound output device, the PC device 100 serving as the sound output device does not output a sound, but is in the mute state. That is, in this scenario, each of the PC device 100 and the television 200 displays only a picture, but does not output a sound.

Therefore, based on the technical solution provided in this embodiment, after the sound output device is switched from the television 200 to the PC device 100, the audio device used by the PC device 100 to play the audio data and the audio status of the audio device that plays the audio data can be consistent with those expected by the user, thereby resolving a problem of audio device inconsistency and audio status inconsistency in the existing solution.

For the foregoing scenario in which the screen projection connection is disconnected, an implementation procedure may be as follows: After receiving a screen projection disconnection request, the screen projection management module notifies the audio management module to read the target identification number recorded in the audio device table and the target audio status that corresponds to the audio device corresponding to the target identification number and that is recorded in the audio status table. Then, an audio status of the audio device identified by the target identification number in the screen projection transmit end is set to the target audio status.

Figure 16:
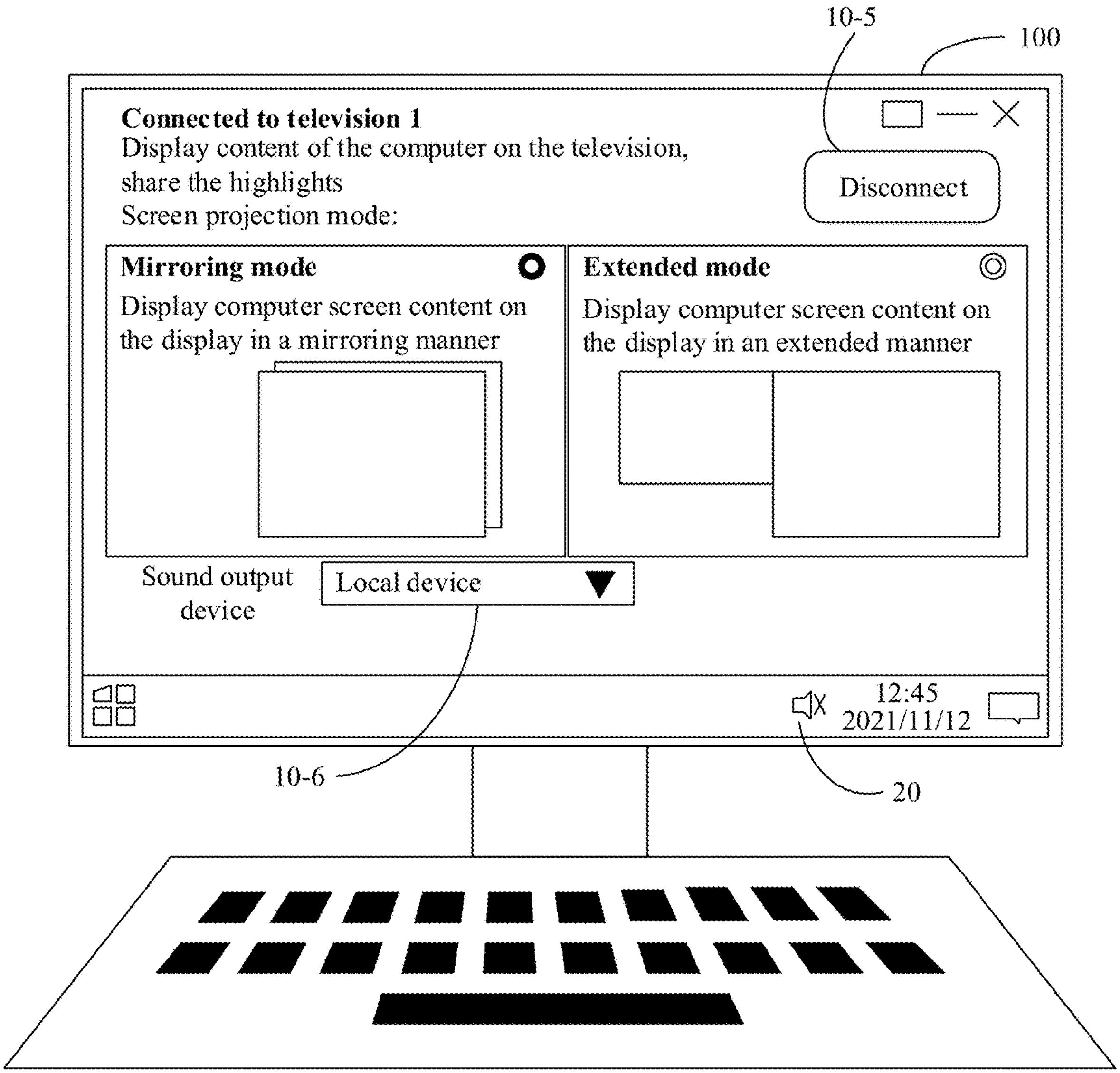
FIG. 16 is a schematic diagram obtained after a sound output device is switched to a local device.

Referring to FIG. 16, for example, after the user taps the disconnection option 10-5, the PC device 100 responds to the operation behavior of the user, and the PC device 100 disconnects the screen projection connection to the television 200.

It may be understood that, after the screen projection connection is disconnected, screen projection information provided by the PC device 100 is no longer sent to the television 200 by using the transmission module. Therefore, the screen of the television 200 no longer displays content displayed on the screen of the PC device 100, and the television 200 no longer plays the audio data provided by the PC device 100.

In an existing solution, that is, a solution in which the screen projection method provided in this embodiment is not used, after the user taps the disconnection option 10-5, regardless of whether the user modifies the audio status of the audio device currently used by the PC device 100 in the screen projection process, after the screen projection connection is disconnected, the system directly sets a default audio device of the PC device 100, for example, the speaker, to output a sound, and the television 200 does not output a sound.

Figure 19:
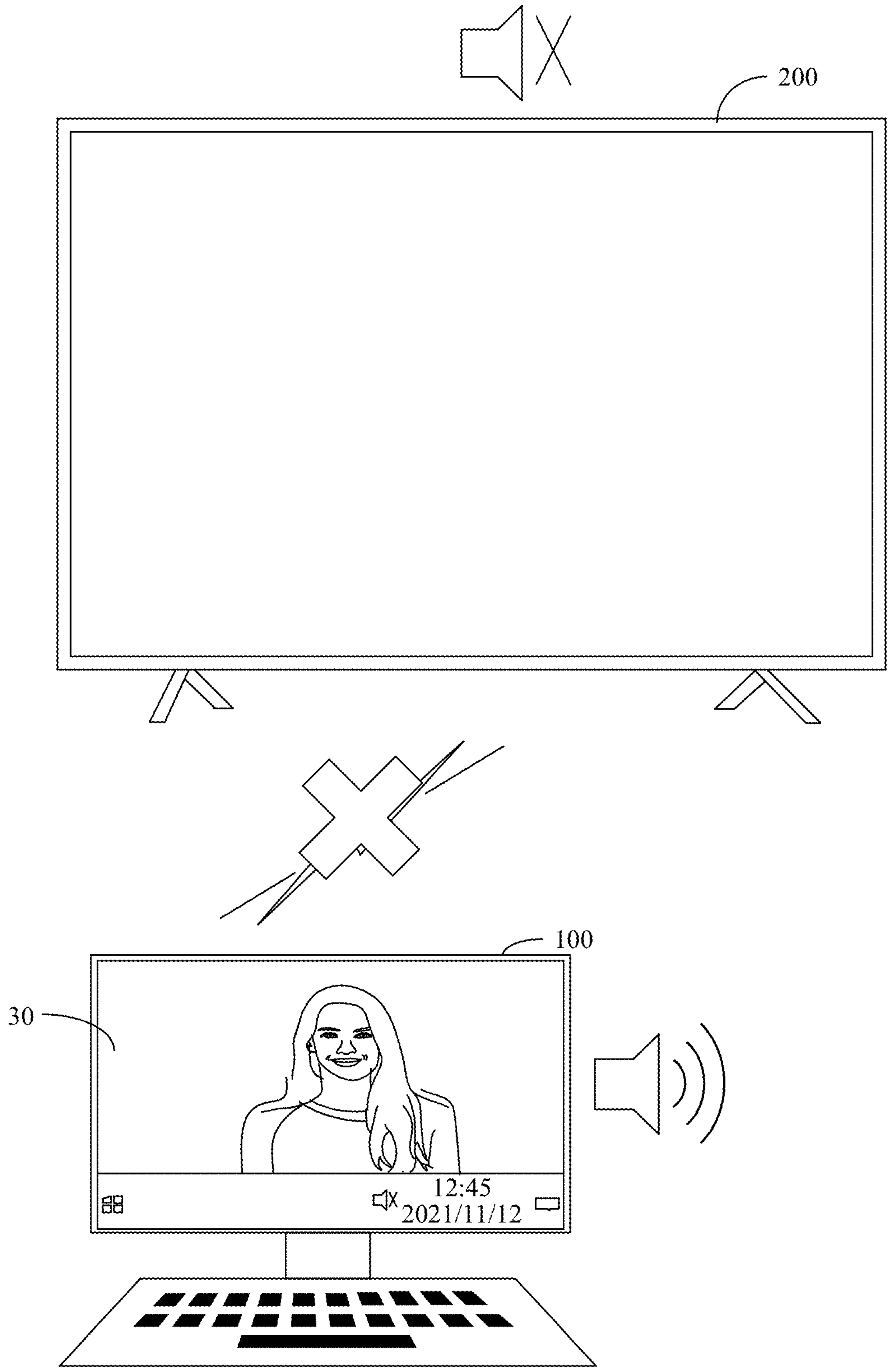
FIG. 19 is a schematic diagram 1 of sound changes of a screen projection transmit end and a screen projection received end after a screen projection connection is disconnected.

For example, as shown in FIG. 19, the sound setting option 20 displays that the audio device currently used by the PC device 100 is in an audio status of the headset 1, and the audio status is the mute state. After the screen projection connection to the television 200 is disconnected, because the system does not know that the user changes the currently used audio device from the speaker to the headset 1 and modifies the audio status of the headset 1 in the screen projection process, the PC device 100 controls the speaker to play the audio data, and still outputs a sound. It is clear that, the existing solution causes that the audio device and the audio status used by the PC device 100 to play the audio data are inconsistent with those expected by the user.

Specifically, in the technical solution provided in this embodiment, the target identification number recorded in the audio device table and the target audio status that corresponds to the target identification number and that is recorded in the audio status table are updated in real time according to an operation of the user. After the screen projection connection is disconnected, the audio data is played by the audio device corresponding to the target identification number recorded in the audio device table, and the audio status of the audio device that plays the audio data is consistent with the target audio status recorded in the audio status table. In this way, after the sound output device is switched from the television 200 to the PC device 100, the audio device used by the PC device 100 to play the audio data and the audio status of the audio device that plays the audio data can be consistent with those expected by the user, thereby resolving a problem of audio device inconsistency and audio status inconsistency in the existing solution.

Figure 20:
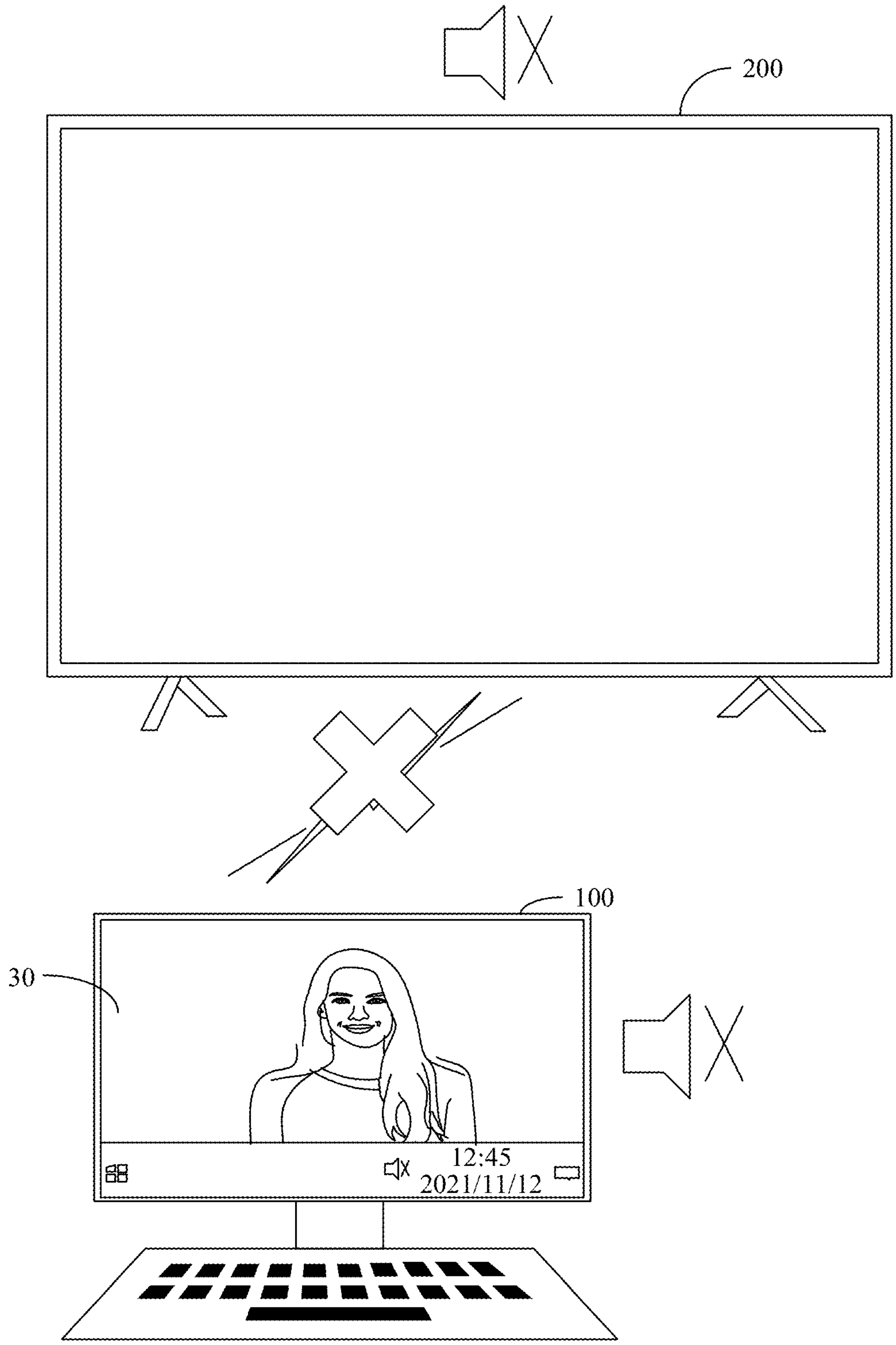
FIG. 20 is a schematic diagram 2 of sound changes of a screen projection transmit end and a screen projection received end after a screen projection connection is disconnected.

For example, it is assumed that the target identification number recorded in the audio device table is an identification number of the headset 1. Referring to FIG. 20, the audio status of the PC device 100 displayed in the sound setting option 20 is an audio status of the headset 1.

Referring to FIG. 20, for example, the audio status of the headset 1 is the mute state. According to the technical solution provided in this embodiment, after the PC device 100 disconnects the screen projection connection from the television 200, the audio status of the headset 1 is set to the target audio status recorded in the audio status table, that is, the mute state. In this scenario, the PC device 100 displays only a picture but does not output a sound, and the television 200 does not display the picture displayed on the screen of the PC device 100 and does not output a sound.

In addition, it should be noted that, in a screen projection process, the audio device monitoring module always monitors whether the audio device changes, and the audio status monitoring module always monitors a tap operation performed by the user on the audio status switching control corresponding to the currently used audio device. Therefore, after the screen projection ends, that is, after the screen projection connection is disconnected, the audio device monitoring module and the audio status monitoring module need to be disabled, that is, monitoring about whether the audio device changes is stopped, and monitoring on a change of the audio status is stopped, to avoid occupation and waste on a resource of the PC device 100.

In this way, before the screen projection connection is established, the audio device currently used by the PC device 100 is first obtained, the identification number of the currently used audio device is recorded in the audio device table as the target identification number, the current audio status is obtained, the current audio status is used as the target audio status, and a state value corresponding to the target audio status is recorded into the audio status table. Therefore, it can be learned that the user expects a specific audio device of the PC device 100 is in a specific audio status in a screen projection process, so that when the screen projection connection is disconnected or the PC device 100 is used as a sound output device subsequently, the PC device 100 can play the audio data by using the audio device expected by the user, and the audio status of the audio device playing the audio data can be consistent with that expected by the user.

In addition, the identification number of the audio device currently used by the PC device 100 is recorded in the audio device table as the target identification number, so that in a screen projection process, when the sound output device is the screen projection receive end, that is, the television 200, the PC device 100 can obtain audio data from a sound channel corresponding to the audio device identified the target identification number recorded in the audio device table, and send the audio data to the television 200. Therefore, it is ensured that, in a screen projection process, regardless of how the user switches the audio device used by the screen projection transmit end, the television 200 used as the sound output device can obtain the audio data that can be played, and then output a sound.

In addition, it should be noted that, in actual application, if the user taps the volume bar control 20-4 for adjusting volume, the PC device changes the volume of the output audio data in response to the operation behavior of the user. In this way, when the sound output device is a large-screen device, because audio data received from the PC device is obtained through encoding based on adjusted volume, the audio data played by the large-screen device is synchronized with the volume adjusted by using the volume bar control 20-4. For example, when the user increases the volume by using the volume bar control 20-4, the volume of the audio data played by the large-screen device also increases, or when the user decreases the volume by using the volume bar control 20-4, the volume of the audio data played by the large-screen device also decreases.

In addition, specifically, in actual application, the technical solution provided in this embodiment may be implemented in two implementations.

Manner 1.1: In a screen projection process, an audio management module sets an audio status of a screen projection transmit end.

Figure 21:
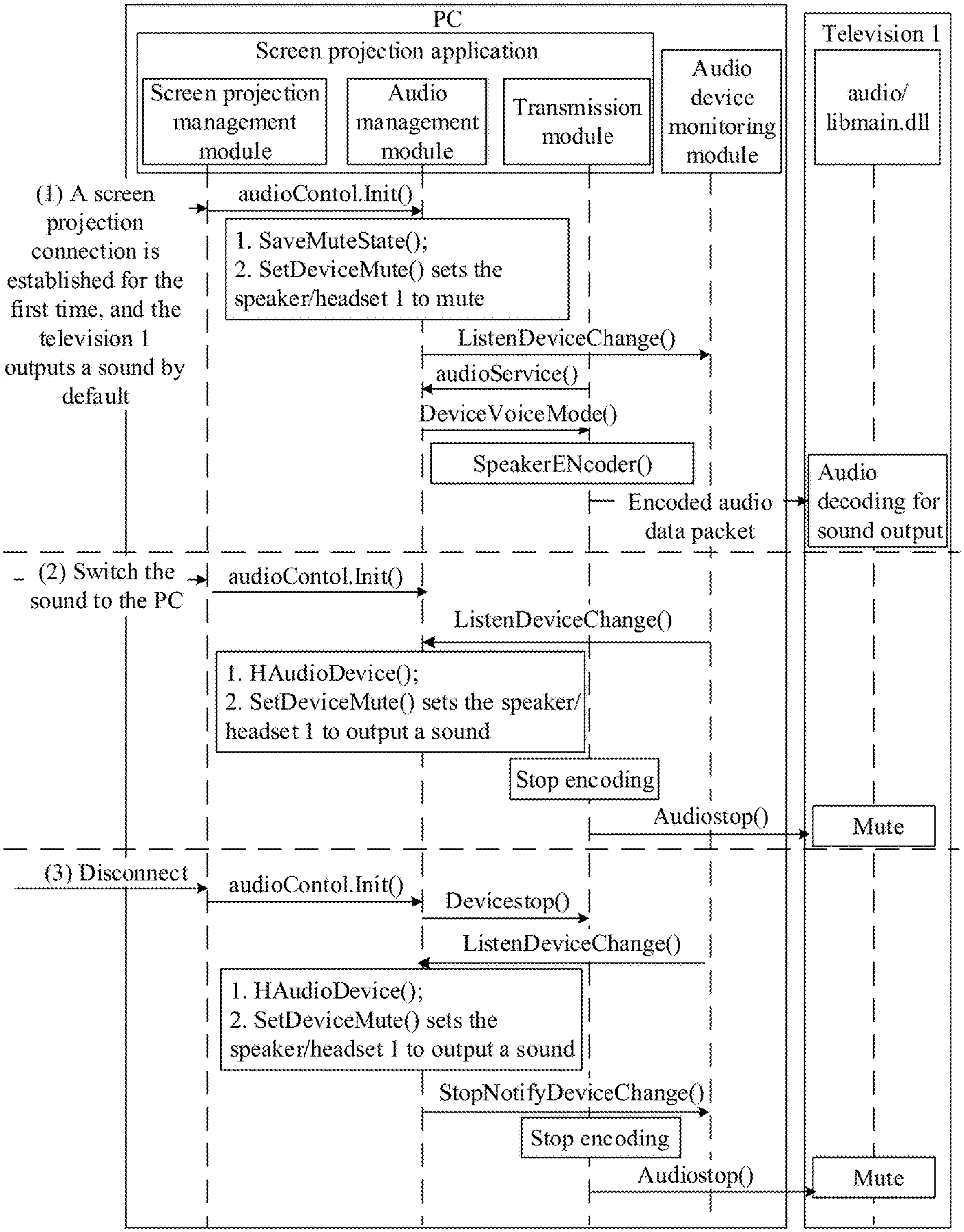
FIG. 21 is a schematic diagram 1 of a method invoked when an upper-layer audio management module sets an audio status of a screen projection transmit end.

Referring to FIG. 21, for example, to better understand the technical solutions provided in the embodiments, descriptions are provided by using a scenario in which a PC is first muted before screen projection, then audio is played for screen projection (when a screen projection connection is established for the first time, a large-screen device such as a television 1 in FIG. 21 outputs a sound), the sound is switched to a local device, that is, switched to the PC, and then switched back to the television 1, and finally the screen projection connection is disconnected.

Referring to FIG. 21, for example, when a user taps to perform screen projection, an upper-layer screen projection management module (for example, may be referred to as MultiCastMgr) notifies an audio management module (for example, may be referred to as AudioControl) by using an initial interface/method provided by a volume control application, for example, a method audioContol.Init( ) Then, the audio management module obtains an identification number of a currently used audio device and stores the identification number as an initial value by using a method for obtaining the identification number of the currently used audio device and storing the identification number as the initial value, for example, SaveMuteState( ) In addition, the audio management module sets the currently used audio device to mute by invoking a method for setting the currently used audio device to mute, for example, SetDeviceMute( ) For example, when the currently used audio device is a speaker, the speaker is set to mute. When the currently used audio device is a headset 1, the headset 1 is set to mute. Then, the audio management module invokes a method for monitoring whether the audio device changes, for example, ListenDeviceChange( ).

It should be noted that in actual application, an operation that the audio module invokes SetDeviceMute( ) to set the currently used audio device to mute and an operation that the audio module invokes ListenDeviceChange( ) to monitor whether the audio device used by the PC changes are not limited to a specific execution sequence.

Referring to FIG. 21, for example, in a process of performing the foregoing operation, an upper layer of a product notifies a corresponding protocol layer, that is, a transmission module, that a sound output device is a large screen (television 1). In this case, after receiving the notification from the upper layer, the transmission module learns of the currently used audio device by using a method for learning of the currently used audio device, for example, audioService( ) Correspondingly, in response to a request of audioService( ) the audio management module sends, to the transmission module by using a device audio mode transmission method such as Device VoiceMode( ), sound channel information corresponding to an audio device identified by a target identification number recorded in an audio device table.

Correspondingly, after receiving the sound channel information sent by the audio management module, the transmission module obtains audio data from a sound channel to which the sound channel information points, performs audio encoding on the obtained audio data by using a method for performing audio encoding on audio data, such as SpeakerENcoder( ), then packages the data, and sends the packaged data to the television 1, so that the television 1 outputs a sound after audio decoding.

Referring to FIG. 21, for example, when the sound is switched to a local device, the upper-layer screen projection management module notifies the audio management module by using the method audioContol.Init( ). The upper layer of the product notifies the transmission module not to encode and package audio and send the audio to the television 1, that is, stop encoding, and invokes a method for stopping play, for example, Audiostop( ). In this case, the television 1 receives no audio data packet, and cannot obtain the audio data through decoding for play. Therefore, the television 1 is mute.

In addition, the audio management module queries, by using a method for querying the audio device currently used by the PC, for example, HAudioDevice( ), the audio device currently used by the PC, that is, determines the audio device by querying the target identification number recorded in the audio device table.

Correspondingly, when the audio device is the speaker, the speaker is set, through SetDeviceMute( ), to output a sound. When the audio device is the headset 1, the headset 1 is set, through SetDeviceMute( ), to output a sound.

Then, when sound output is switched from the local device to the large screen, an implementation process is similar to that performed when the screen projection connection is established for the first time and the large screen outputs a sound by default, but ListenDeviceChange( ) does not need to be invoked again.

Referring to FIG. 21, for example, when the screen projection connection is disconnected, the audio management module notifies, by using a disconnection method such as Devicestop( ), the transmission module to disconnect the screen projection connection to the television 1, and disables, by using a method for disabling an audio device monitoring module for monitoring whether the audio device of the PC changes, such as StopNotifyDeviceChange( ), the audio device monitoring module for monitoring whether the audio device of the PC changes. In addition, the audio management module queries, by using HAudioDevice( ), the audio device currently used by the PC.

Correspondingly, when the audio device is the speaker, the speaker is set, through SetDeviceMute( ), to output a sound. When the audio device is the headset 1, the headset 1 is set, through SetDeviceMute( ), to output a sound.

In addition, the audio management module further notifies the transmission module not to encode and package audio and send the audio to the television 1, that is, stop encoding, and invokes Audiostop( ). In this case, the television 1 receives no audio data packet, and cannot obtain the audio data through decoding for play. Therefore, the television 1 is mute.

In addition, it may be understood that, in a screen projection process, ListenDeviceChange( ) is always running, and when it is monitored that the audio device changes, an identification number of a changed audio device is sent to the audio management module to update the target identification number in the audio device table.

Manner 1.2: In a screen projection process, an audio management module sets an audio status of a screen projection transmit end based on an audio status monitored by an audio status monitoring module.

Figure 22:
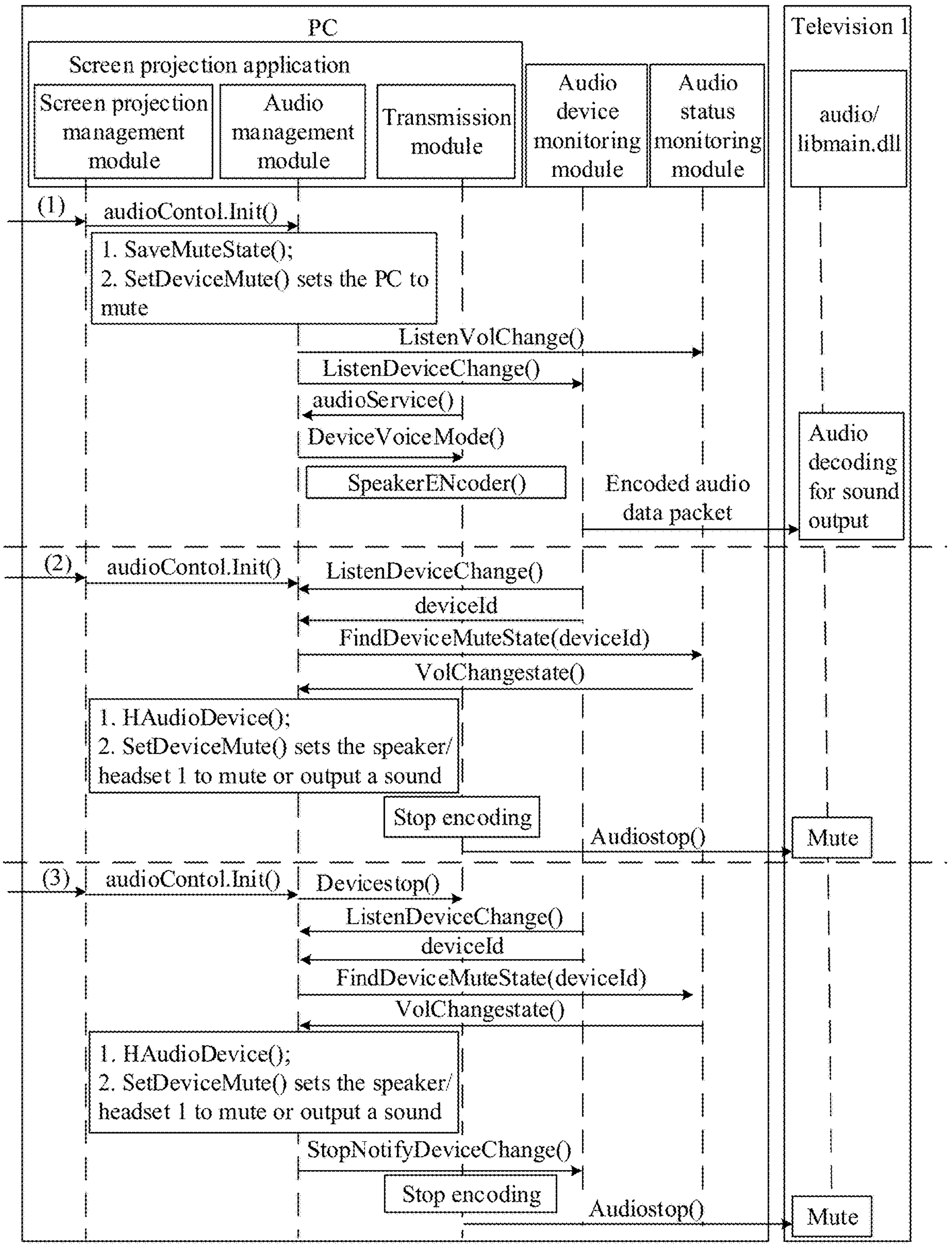
FIG. 22 is a schematic diagram 2 of a method invoked when an upper-layer audio management module sets an audio status of a screen projection transmit end.

Referring to FIG. 22, for example, when a user taps to perform screen projection, an upper-layer screen projection management module notifies the audio management module by using a method audioContol.Init( ). Then, the audio management module obtains an identification number of a currently used audio device and an audio status of the currently used audio device by using SaveMuteState( ), stores the identification number and the audio status of the currently used audio device as an initial value, and sets the currently used audio device to mute by invoking SetDeviceMute( ). For example, when the currently used audio device is a speaker, the speaker is set to mute. When the currently used audio device is a headset 1, the headset 1 is set to mute. Then, ListenDeviceChange( ) for monitoring whether the audio device changes is enabled, and a method for monitoring whether the audio status of the currently used audio device changes, such as ListenVolChange( ), is enabled.

It should be noted that in actual application, an operation that the audio module invokes SetDeviceMute( ) to set the currently used audio device to mute, an operation that the audio module invokes ListenDeviceChange( ) to monitor whether the audio device used by the PC changes, and an operation that the audio module invokes ListenVolChange( ) to monitor whether the audio status of the currently used audio device changes are not limited to a specific execution sequence.

Referring to FIG. 22, for example, in a process of performing the foregoing operation, an upper layer of a product notifies a corresponding protocol layer, that is, a transmission module, that a sound output device is a large screen (television 1). In this case, after receiving the notification from the upper layer, the transmission module learns of the currently used audio device by using audioService( ).

Correspondingly, in response to a request of audioService( ), the audio management module sends, to the transmission module by using DeviceVoiceMode( ), sound channel information corresponding to an audio device identified by a target identification number recorded in an audio device table.

Correspondingly, after receiving the sound channel information sent by the audio management module, the transmission module obtains audio data from a sound channel to which the sound channel information points, performs audio encoding on the obtained audio data by using SpeakerENcoder( ), then packages the data, and sends the packaged data to the television 1, so that the television 1 outputs a sound after audio decoding.

Referring to FIG. 22, for example, when the sound is switched to a local device, the upper-layer screen projection management module notifies the audio management module by using the method audioContol.Init( ). The upper layer of the product notifies the transmission module not to encode and package audio and send the audio to the television 1, that is, stop encoding, and invokes Audiostop( ). In this case, the television 1 receives no audio data packet, and cannot obtain the audio data through decoding for play. Therefore, the television 1 is mute.

In addition, the audio management module queries the audio device currently used by the PC and the audio status of the audio device by using a method HAudioDevice( ), that is, by querying the target identification number recorded in the audio device table and querying an audio status that is corresponding to the audio device and that is recorded in an audio status table.

Correspondingly, when the audio device is the speaker and the audio status is a non-mute state, the speaker is set, through SetDeviceMute( ), to output a sound. When the audio device is the speaker and the audio status is a mute state, the speaker is set to mute through SetDeviceMute( ).

Correspondingly, when the audio device is the headset 1 and the audio status is a non-mute state, the headset 1 is set, through SetDeviceMute( ), to output a sound. When the audio device is the headset 1 and the audio status is a mute state, the headset 1 is set to mute through SetDeviceMute( ).

Then, when sound output is switched from the local device to the large screen, an implementation process is similar to that performed when the screen projection connection is established for the first time and the large screen outputs a sound by default, but neither ListenDeviceChange( ) nor ListenVolChange( ) needs to be invoked again.

Referring to FIG. 22, for example, when the screen projection connection is disconnected, the audio management module notifies, by using Devicestop( ), the transmission module to disconnect the screen projection connection to the television 1, disables, by using StopNotifyDeviceChange( ), an audio device monitoring module for monitoring whether the audio device of the PC changes, and disables, by using StopNotifyVolChange( ), an audio status monitoring module for monitoring whether the audio status changes. In addition, the audio management module queries, by using HAudioDevice( ), the audio device currently used by the PC and the audio status corresponding to the audio device.

Correspondingly, when the audio device is the speaker and the audio status is a non-mute state, the speaker is set, through SetDeviceMute( ), to output a sound. When the audio device is the speaker and the audio status is a mute state, the speaker is set to mute through SetDeviceMute( ).

Correspondingly, when the audio device is the headset 1 and the audio status is a non-mute state, the headset 1 is set, through SetDeviceMute( ), to output a sound. When the audio device is the headset 1 and the audio status is a mute state, the headset 1 is set to mute through SetDeviceMute( ).

In addition, the audio management module further notifies the transmission module not to encode and package audio and send the audio to the television 1, that is, stop encoding, and invokes Audiostop( ). In this case, the television 1 receives no audio data packet, and cannot obtain the audio data through decoding for play. Therefore, the television 1 is mute.

In addition, it may be understood that, in a screen projection process, ListenDeviceChange( ) and ListenVolChange( ) are always running, and when it is monitored that the audio device changes, an identification number of a changed audio device is sent to the audio management module to update the target identification number in the audio device table.

Referring to FIG. 22, for example, in a screen projection process, if ListenDeviceChange( ) monitors that the audio device currently used by the PC changes, an identification number of a switched audio device, such as deviceId, is sent to the audio management module, and the audio management module modifies, by using SaveMuteState( ), the target identification number recorded in the audio device table. In addition, the identification number deviceId of the switched audio device is used as a query parameter, an audio status that is of an audio device corresponding to the identification number deviceId and that is monitored by the audio status monitoring module is queried by using FindDeviceMuteState( ), and after the audio status is queried, the audio status is sent to the audio management module by using VolChagestate( ).

To better understand the screen projection implemented based on the technical solutions provided in the embodiments in the three scenarios shown in FIG. 21 and FIG. 22, the following provides detailed description with reference to FIG. 23A and FIG. 23B to FIG. 25 by using an example in which both the audio device monitoring module and the audio status monitoring module are enabled in the screen projection scenario shown in FIG. 22.

Figure 23A:
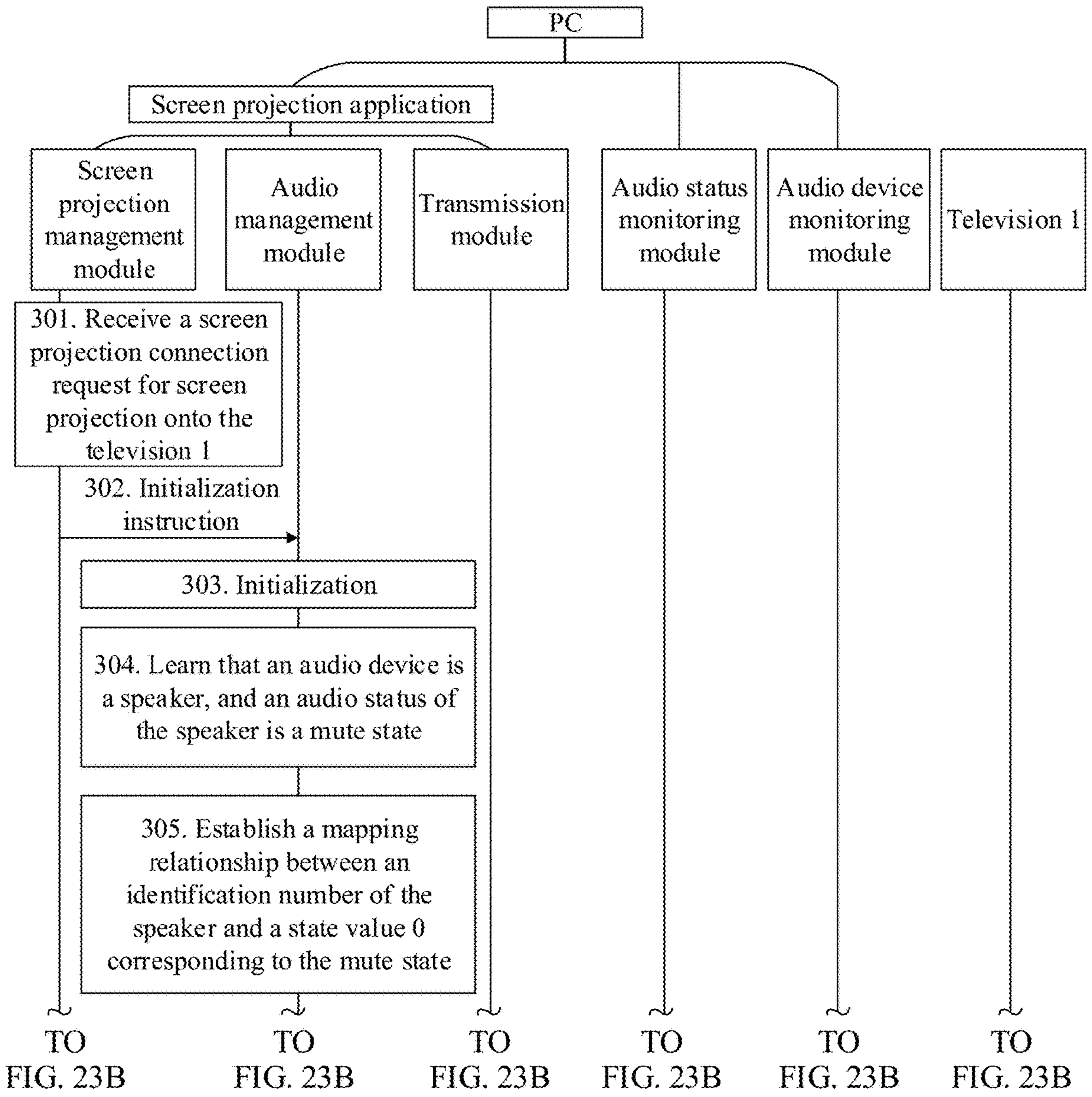
FIG. 23A and FIG. 23B are a schematic diagram 1 in which an upper-layer audio management module sets an audio status of a screen projection transmit end.
Figure 23B:
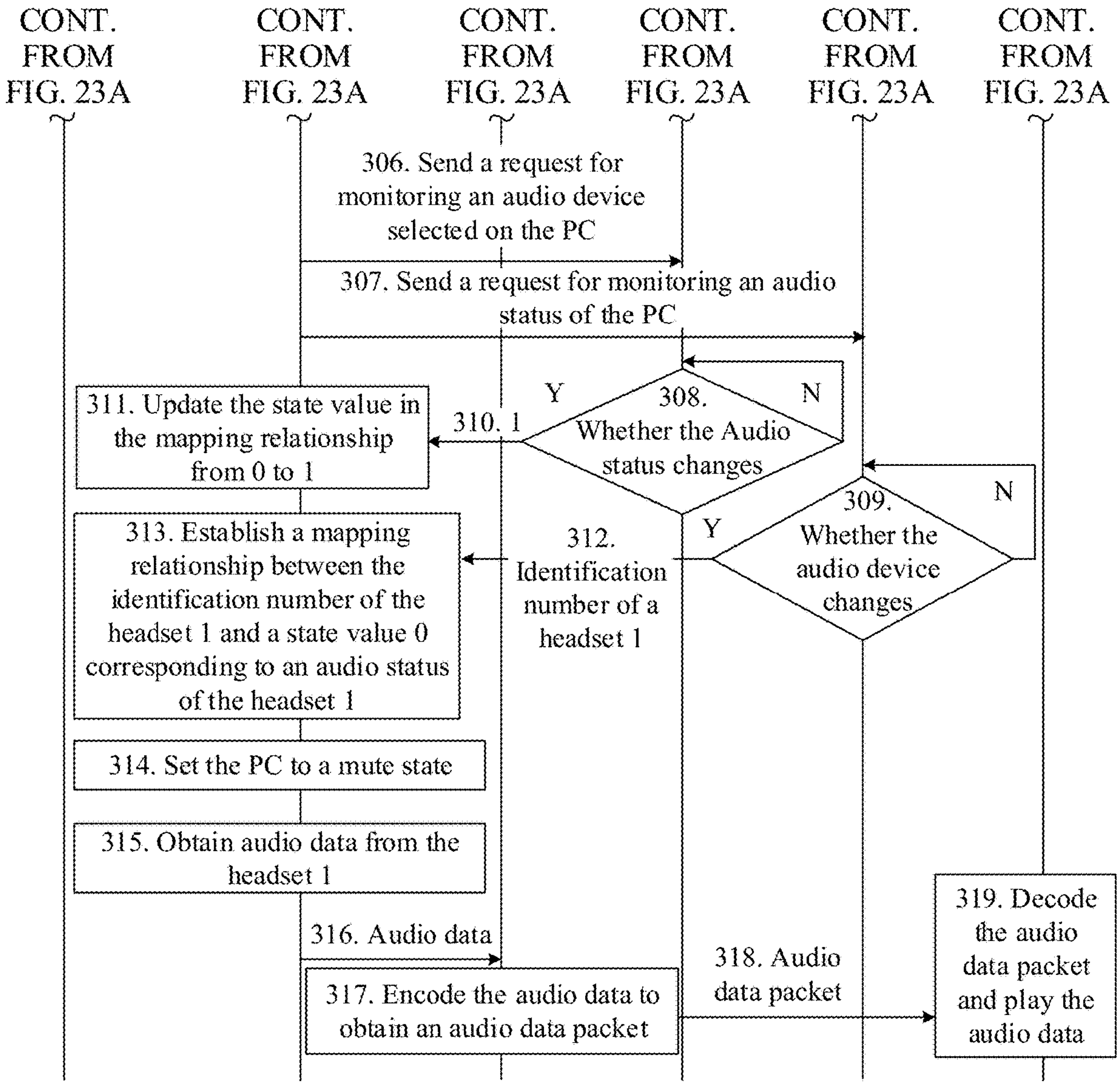

Referring to FIG. 23A and FIG. 23B, for example, a screen projection transmit end is referred to as a PC, and a screen projection receive end is referred to as a television 1.

A screen projection application is installed on the PC, and the screen projection application includes a screen projection management module, an audio management module, and a transmission module.

In addition, a system used by the PC provides an audio status monitoring module.

It is assumed that when the PC and the television 1 establish a screen projection connection for the first time, a sound output device is the television 1 by default, that is, the television 1 outputs a sound.

Referring to FIG. 23A and FIG. 23B, for example, when a user taps the "Connect" option 10-1 in FIG. 4 or FIG. 5, the screen projection management module receives a screen projection connection request for screen projection onto the television 1, this is, performs step 301.

Then, the screen projection management module performs step 302 to send an initialization instruction to the audio management module.

Correspondingly, after receiving the initialization instruction sent by the screen projection management module, the audio management module performs an initialization operation in step 303, for example, implements initialization by invoking an audioContol.Init( ) interface.

Then, after initialization, the audio management module learns of an audio device currently used by the local device and an audio status of the audio device.

Specifically, in actual application, an operation that the audio management module learns of the audio device currently used by the local device and the audio status of the audio device may be implemented by using a pre-compiled program interface.

For example, in this embodiment, the program interface is referred to as SaveMuteState( ).

The audio management module may learn of the audio device currently used by the PC and the audio status of the audio device by invoking SaveMuteState( ).

Correspondingly, if the currently used audio device learned of by the audio management module in step 304 is a speaker, and an audio status of the speaker is a mute state, step 305 is subsequently performed, which is specifically to establish a mapping relationship among an identification number of the speaker and the audio status of the speaker that are obtained in step 304 and a state value such as "0" corresponding to the mute state, for subsequent use.

In addition, it may be understood that, in actual application, the obtained identification number of the speaker further needs to be recorded in an audio device table, and the state value of the audio status corresponding to the speaker needs to be recorded in an audio status table.

Then, the audio management module sends a request for monitoring the audio device selected on the local device to the audio device monitoring module, that is, performs step 306: and sends a request for monitoring the audio status of the local device to the audio status monitoring module, that is, performs step 307.

Specifically, in this embodiment, the audio device monitoring module is invoked to enable an operation of monitoring whether the audio device changes, for example, a pre-compiled ListenDeviceChange( ) interface is invoked. The audio status monitoring module is invoked to enable an operation of monitoring the audio status of the PC, for example, a pre-compiled ListenVolChange( ) interface is invoked.

For example, after the audio status monitoring module is enabled, in an entire screen projection process, that is, before the screen projection connection is disconnected, an operation in step 308 is always performed to monitor whether the audio status changes. After the audio device monitoring module is enabled, in the entire screen projection process, that is, before the screen projection connection is disconnected, an operation in step 309 is always performed to monitor whether the audio device changes.

Correspondingly, if it is monitored that the audio status changes, step 310 is performed; or if it is not monitored that the audio status changes, step 308 is continued. If it is monitored that the audio device changes, step 311 is performed: or if it is not monitored that the audio device changes, step 309 is continued.

For example, in the scenario shown in FIG. 23A and FIG. 23B, before the audio device changes, the audio device used by the PC is a speaker, and a target audio status of the speaker is a mute state. Therefore, when the audio status monitoring module monitors that the audio status changes, it indicates that the user taps an audio status switching control, so that the audio status of the speaker changes to a non-mute state. Therefore, step 310 is specifically to send a state value such as "1" corresponding to the non-mute state to the audio management module.

Then, the audio management module updates, based on the received state value "1" corresponding to the non-mute state, a state value of the target audio status recorded in the audio status table, and updates a state value in the mapping relationship with the target identification number. Specifically, the state value is updated from 0 to 1, that is, step 311 is performed.

Referring to FIG. 23A and FIG. 23B, if a change of the audio device is monitored in a screen projection process, for example, the audio device changes from the speaker to the headset 1, an identification number of the headset 1 is sent to the audio management module, that is, step 312 is performed.

Then, the audio management module establishes a mapping relationship between the identification number of the headset 1 and a state value such as 0 corresponding to an audio status of the headset 1, that is, performs step 313.

In addition, the audio management module further notifies the transmission module that a sound output device is the television 1, and sets, by using an interface for setting an audio status, for example, SetDeviceMute( ), the audio device such as the headset 1 currently used by the local device to mute, that is, performs step 314 to set the local device to a mute state.

It should be noted that in actual application, an operation in step 314 may be performed in synchronization with step 304 after the audio management module completes step 303. This is not limited in this embodiment.

Then, after completing the operation in step 314, the audio management module obtains audio data from a sound channel corresponding to the headset 1, that is, performs step 315, and sends the audio data to the transmission module, that is, performs step 316.

Correspondingly, after receiving the audio data, the transmission module encodes the audio data in the manner described in the step in the foregoing embodiment, to obtain an audio data packet, that is, performs step 317.

Then, the transmission module sends the obtained audio data packet to the television 1 through an established screen projection link, that is, performs step 318.

Correspondingly, after receiving the audio data packet sent by the transmission module, the television 1 performs step 319 to perform a decoding operation on the audio data packet, to restore the audio data and play the audio data. In this way, the television 1 outputs a sound.

In this way, the PC is first muted, then screen projection is performed after a video is played, and the television 1 outputs a sounds. In addition, in a screen projection process, the audio management module dynamically updates, by monitoring the audio device and the corresponding audio status, the target identification number recorded in the audio device table and the state value that is of the audio status of the audio device corresponding to the target identification number and that is recorded in the audio status table. In this way, use of the screen projection function by the user is not affected, and modification performed by the user on the audio device used by the PC and the audio status of the audio device in a screen projection process can be monitored in real time, so that audio data can be obtained from a sound channel corresponding to the currently used audio device and sent to the television 1. In this way, when the sound output device is the television 1, the television 1 can always obtain audio data that can be played.

Figure 24:
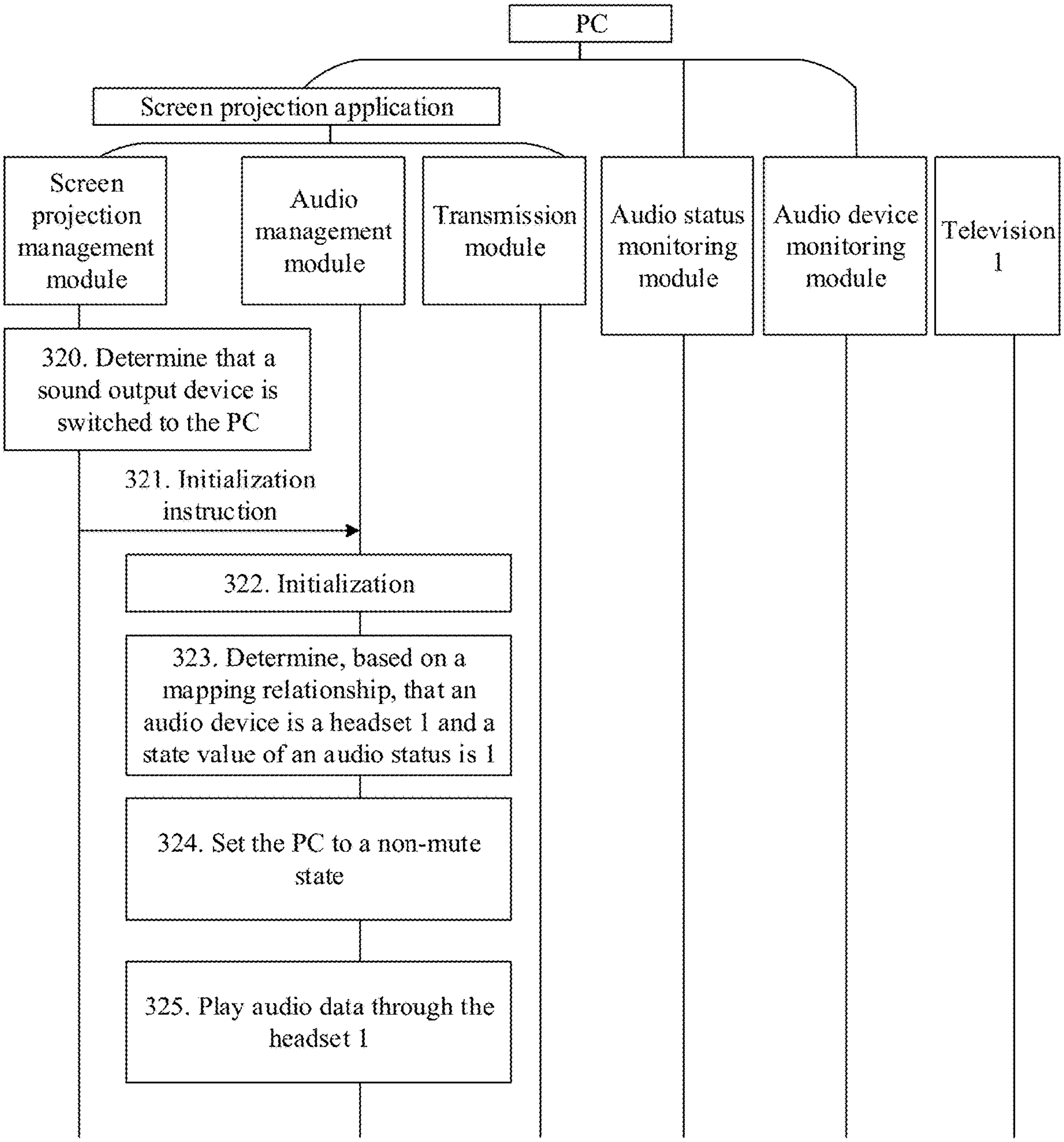
FIG. 24 is a schematic diagram 2 in which an upper-layer audio management module sets an audio status of a screen projection transmit end.

Further, after screen projection information of the PC is sent to the television 1, and the television 1 starts to play a picture and play audio data, if the user switches the sound output device from the television 1 to the PC, for a process of setting the audio status of the PC, refer to FIG. 24.

For example, if the screen projection management module monitors an operation of switching the sound output device by the user, and determines that the sound output device is switched to the local device, that is, after the operation in step 320 is performed, the screen projection management module resends an initialization instruction to the audio management module, that is, performs step 321.

Correspondingly, after receiving the initialization instruction sent by the screen projection management module, the audio management module performs an initialization operation in step 322, for example, implements initialization by invoking an audioContol.Init( ) interface.

Then, after initialization, the audio management module reads the recorded target identification number from the audio device table, and reads, from the audio status table, the recorded state value of the target audio status corresponding to the target identification number.

Specifically, in actual application, the target identification number and the state value may be obtained from a table of a mapping relationship between an audio device and a state value.

For example, if the audio device corresponding to the target identification number recorded in the audio device table is the headset 1, and a state value that is corresponding to the headset 1 and that is recorded in the audio status table is "1", after initialization, the audio management module determines, based on the mapping relationship, that the audio device is the headset 1, and the state value of the audio status is "1". This is content in step 323.

Then, the audio management module sets the local device to a non-mute state based on the read state value "1", that is, performs an operation in step 324, and then performs an operation in step 325 to play the audio data.

Specifically, because the determined audio device currently used by the PC is the headset 1, in step 324, the audio status of the headset 1 is set to a non-mute state, and in step 325, the headset 1 plays the audio data.

For example, if the state value that is of the audio status of the headset 1 and that is recorded in the audio status table is "0", that is, the user modifies the audio status of the headset 1 of the PC to a mute state before or during screen projection, after initialization, when the currently used audio device is still the headset 1, the audio management module reads the recorded state value "O" of the audio status from the audio status table.

Correspondingly, after reading the state value "0" from the audio status table, the audio management module sets the headset 1 to a mute state based on the read state value "0", and then plays the audio data.

It may be understood that, the audio status of the headset 1 is set to the mute state. Therefore, even if the audio data is played by the headset 1, because the audio status of the headset 1 is the mute state, no sound is output in a process of playing the audio data.

In addition, it should be noted that, although the operation performed by the audio status monitoring module and the operation performed by the audio device monitoring module are not shown in FIG. 24, after the audio status monitoring module and the audio device monitoring module are enabled, the audio status monitoring module and the audio device monitoring module are always in a working state in the entire screen projection process. In other words, in a process of performing step 320 to step 325, the operations in step 308 to step 313 are performed, provided that the user modifies the audio status and the audio device.

In addition, because the user switches the sound output device from the television 1 to the PC in the screen projection scenario shown in FIG. 24, the transmission module does not send an audio data packet to the television 1, and the television 1 receives no audio data packet, and does not output a sound.

In addition, it may be understood that, because the technical solution provided in this embodiment is for audio data in a screen projection scenario, sending of video data is not shown in the figure.

In this way, a process in which the sound output device is switched from the television 1 to the PC in a screen projection process and then the audio management module sets the audio status of the PC based on the target identification number recorded in the audio device table and the state value that is corresponding to the target identification number and that is recorded in the audio status table is implemented. Therefore, after the sound output device is modified to the PC, the audio device that plays the audio data on the PC and the audio status of the audio device that plays the audio data can be consistent with those expected by the user.

Figure 25:
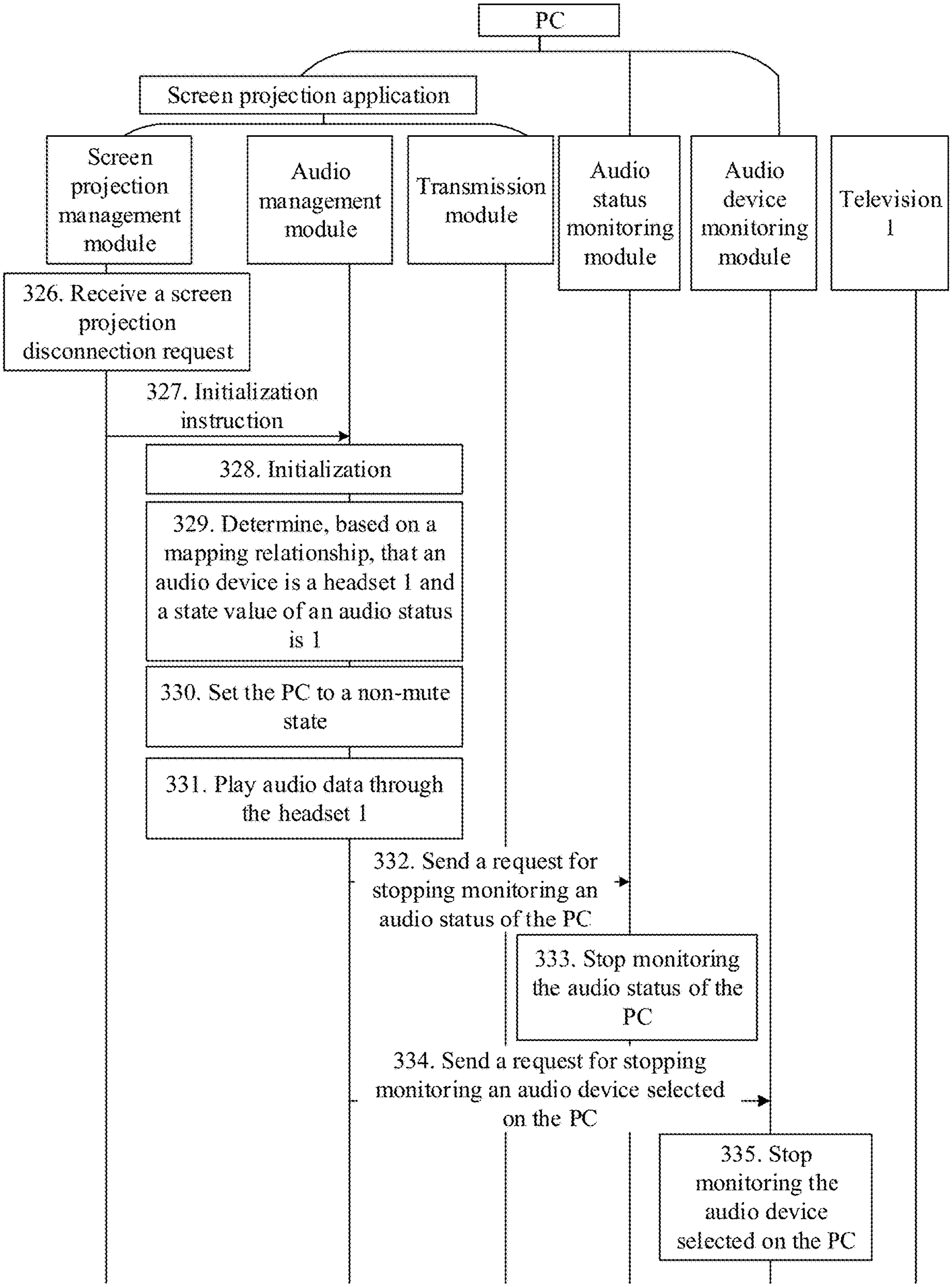
FIG. 25 is a schematic diagram 3 in which an upper-layer audio management module sets an audio status of a screen projection transmit end.

Further, after completing the operation in FIG. 24, the PC starts to play the audio data, and after the television 1 continues to play the picture/video data, if the user taps the disconnection option 10-5 in FIG. 8, for a process of setting the audio status of the PC, refer to FIG. 25.

For example, if the screen projection management module receives a screen projection disconnection request, that is, an operation in step 326, the screen projection management module resends an initialization instruction to the audio management module, that is, performs step 327.

Correspondingly, after receiving the initialization instruction sent by the screen projection management module, the audio management module performs an initialization operation in step 328, for example, implements initialization by invoking an audioContol.Init( ) interface.

Then, after initialization, the audio management module reads the recorded target identification number from the audio device table, and reads, from the audio status table, the recorded state value of the target audio status corresponding to the target identification number.

Specifically, in actual application, the target identification number and the state value may be obtained from a table of a mapping relationship between an audio device and a state value.

For example, if the audio device corresponding to the target identification number recorded in the audio device table is the headset 1, and a state value that is corresponding to the headset 1 and that is recorded in the audio status table is "1", after initialization, the audio management module determines, based on the mapping relationship, that the audio device is the headset 1, and the state value of the audio status is "1". This is content in step 329.

Then, the audio management module sets the local device to a non-mute state based on the read state value "1", that is, performs an operation in step 330, and then performs an operation in step 331 to play the audio data.

Specifically, because the determined audio device currently used by the PC is the headset 1, in step 330, the audio status of the headset 1 is set to a non-mute state, and in step 331, the headset 1 plays the audio data.

For example, if the state value that is of the audio status of the headset 1 and that is recorded in the audio status table is "0", that is, the user modifies the audio status of the headset 1 of the PC to a mute state before or during screen projection, after initialization, when the currently used audio device is still the headset 1, the audio management module reads the recorded state value "O" of the audio status from the audio status table.

Correspondingly, after reading the state value "0" from the audio status table, the audio management module sets the headset 1 to a mute state based on the read state value "0", and then plays the audio data.

It may be understood that, the audio status of the headset 1 is set to the mute state. Therefore, even if the audio data is played by the headset 1, because the audio status of the headset 1 is the mute state, no sound is output in a process of playing the audio data.

In addition, after the screen projection connection is disconnected, the audio management module further sends a request for stopping monitoring the audio status of the local device to the audio status monitoring module, that is, performs step 332: and sends a request for stopping monitoring the audio device selected on the local device to the audio device monitoring module, that is, performs step 334.

Correspondingly, after receiving the request sent by the audio management module for stopping monitoring the audio status of the local device, the audio status monitoring module performs an operation in step 333 to stop monitoring the audio status of the local device.

Similarly, after receiving the request sent by the audio management module for stopping monitoring the audio device selected on the local device, the audio device monitoring module performs an operation in step 335 to stop monitoring the audio device selected on the local device.

For example, the audio status monitoring module may invoke a pre-packaged StopNotifyVolChange( ) interface to stop monitoring the audio status of the local device, and the audio device monitoring module may invoke a pre-packaged StopNotifyDeviceChange( ) interface.

Therefore, in the screen projection solution provided in this application, in a screen projection process, the audio management module sets the audio status of the screen projection transmit end based on content recorded in the audio status table and the audio device table. In this way, regardless of a protocol used by the screen projection application, the audio management module needs only to set the audio status in a unified manner. This greatly reduces development workload and maintenance difficulty.

Manner 2.1: In a screen projection process, a transmission module sets an audio status of a screen projection transmit end.

Figure 26:
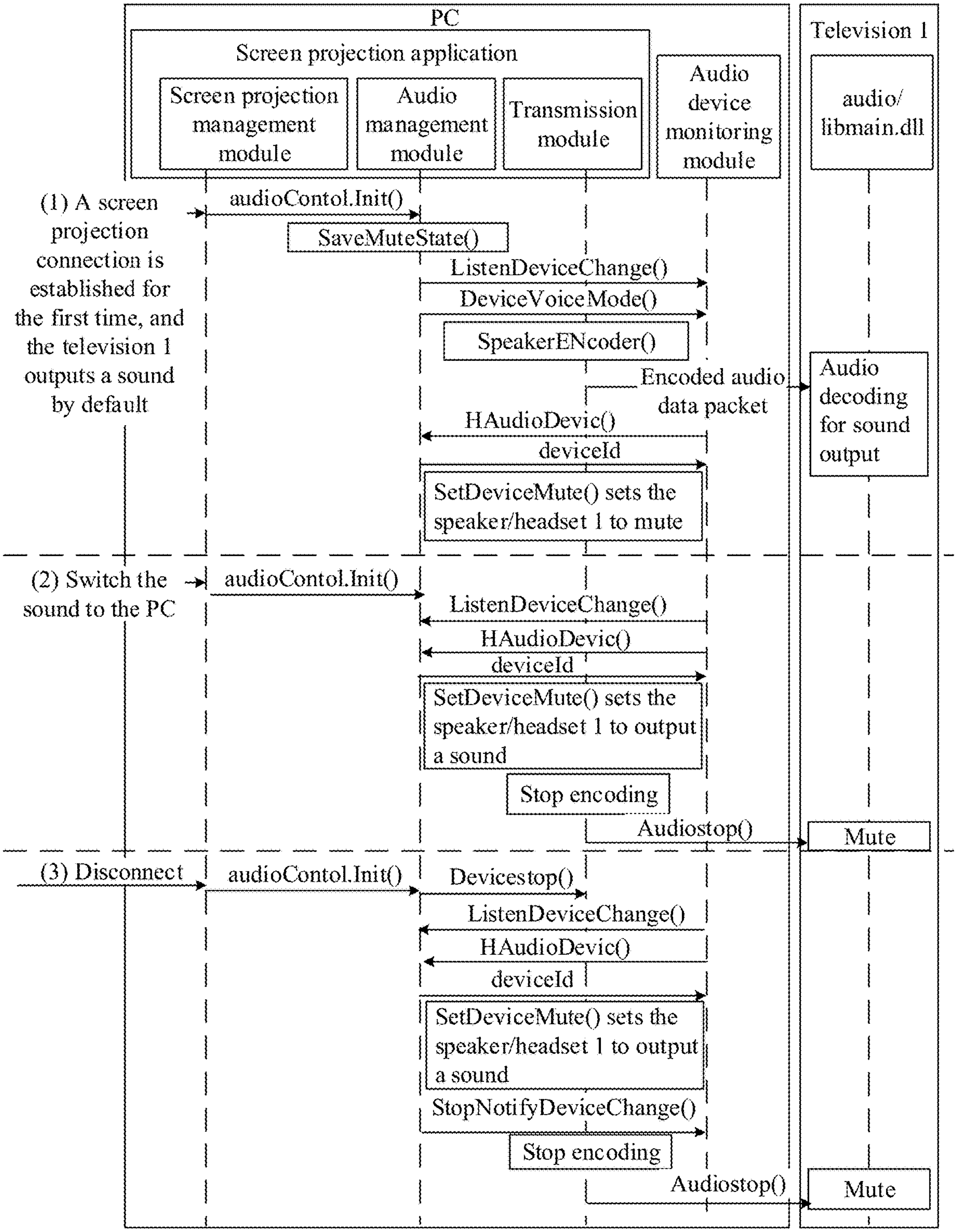
FIG. 26 is a schematic diagram 1 of a method invoked when a lower-layer transmission module sets an audio status of a screen projection transmit end.

Referring to FIG. 26, for example, to better understand the technical solutions provided in the embodiments, descriptions are provided by using a scenario in which a PC is first muted before screen projection, then audio is played for screen projection (when a screen projection connection is established for the first time, a large-screen device such as a television 1 in FIG. 26 outputs a sound), the sound is switched to a local device, that is, switched to the PC, and then switched back to the television 1, and finally the screen projection connection is disconnected.

Referring to FIG. 26, for example, when a user taps to perform screen projection, an upper-layer screen projection management module (for example, may be referred to as MultiCastMgr) notifies an audio management module (for example, may be referred to as AudioControl) by using a method audioContol.Init( ). Then, the audio management module obtains an identification number of a currently used audio device by using SaveMuteState( ), stores the identification number as an initial value, and enables ListenDeviceChange( ) for monitoring whether the audio device changes.

Referring to FIG. 26, after the PC establishes a screen projection connection to the television 1, the audio management module invokes DeviceVoiceMode( ) to send, to a corresponding protocol layer, that is, the transmission module, sound channel information corresponding to the currently used audio device that is obtained by using SaveMuteState( ), and a sound output device is a large screen (television 1).

Correspondingly, after receiving the sound channel information sent by the audio management module, the transmission module obtains audio data from a sound channel to which the sound channel information points, performs audio encoding on the obtained audio data by using SpeakerENcoder( ), then packages the data, and sends the packaged data to the television 1, so that the television 1 outputs a sound after audio decoding. In addition, the transmission module invokes HAudioDevice( ) to query the currently used audio device recorded in the audio management module.

Correspondingly, the audio management module sends a queried identification number of the audio device, that is, deviceId, to the transmission module. The transmission module invokes SetDeviceMute( ) to set the audio device identified by deviceId to mute. For example, when the currently used audio device is a speaker, the speaker is set to mute. When the audio device identified by deviceId is a headset 1, the headset 1 is set to mute.

Referring to FIG. 26, for example, when the sound is switched to a local device, the upper-layer screen projection management module notifies the audio management module by using the method audioContol.Init( ). The upper layer of the product notifies the transmission module not to encode and package audio and send the audio to the television 1, that is, stop encoding, and invokes Audiostop( ). In this case, the television 1 receives no audio data packet, and cannot obtain the audio data through decoding for play. Therefore, the television 1 is mute.

Correspondingly, after receiving the notification from the upper layer, the transmission module invokes HAudioDevice( ) to query the currently used audio device recorded in the audio management module.

Correspondingly, the audio management module sends a queried identification number of the audio device, that is, deviceId, to the transmission module. The transmission module invokes SetDeviceMute( ) to set the audio device identified by deviceId to mute. For example, when the currently used audio device is a speaker, the speaker is set to mute. When the audio device identified by deviceId is a headset 1, the headset 1 is set to mute.

Then, when sound output is switched from the local device to the large screen, an implementation process is similar to that performed when the screen projection connection is established for the first time and the large screen outputs a sound by default, but ListenDeviceChange( ) does not need to be invoked again.

Referring to FIG. 26, for example, when the screen projection connection is disconnected, the audio management module notifies, by using Devicestop( ), the transmission module to disconnect the screen projection connection to the television 1, and disables, by using StopNotifyDeviceChange( ), an audio status monitoring module for monitoring the audio status of the PC.

Correspondingly, after receiving the notification from the upper layer, the transmission module invokes HAudioDevice( ) to query the currently used audio device recorded in the audio management module.

Correspondingly, the audio management module sends a queried identification number of the audio device, that is, deviceId, to the transmission module. The transmission module invokes SetDeviceMute( ) to set the audio device identified by deviceId to mute. For example, when the currently used audio device is a speaker, the speaker is set to mute. When the audio device identified by deviceId is a headset 1, the headset 1 is set to mute.

In addition, the audio management module further notifies the transmission module not to encode and package audio and send the audio to the television 1, that is, stop encoding, and invokes Audiostop( ). In this case, the television 1 receives no audio data packet, and cannot obtain the audio data through decoding for play. Therefore, the television 1 is mute.

In addition, it may be understood that, in a screen projection process, ListenDeviceChange( ) is always running, and when it is monitored that the audio device changes, an identification number of a changed audio device is sent to the audio management module to update the target identification number in the audio device table.

Manner 2.2: In a screen projection process, a transmission module sets an audio status of a screen projection transmit end based on an audio status monitored by an audio status monitoring module.

Figure 27:
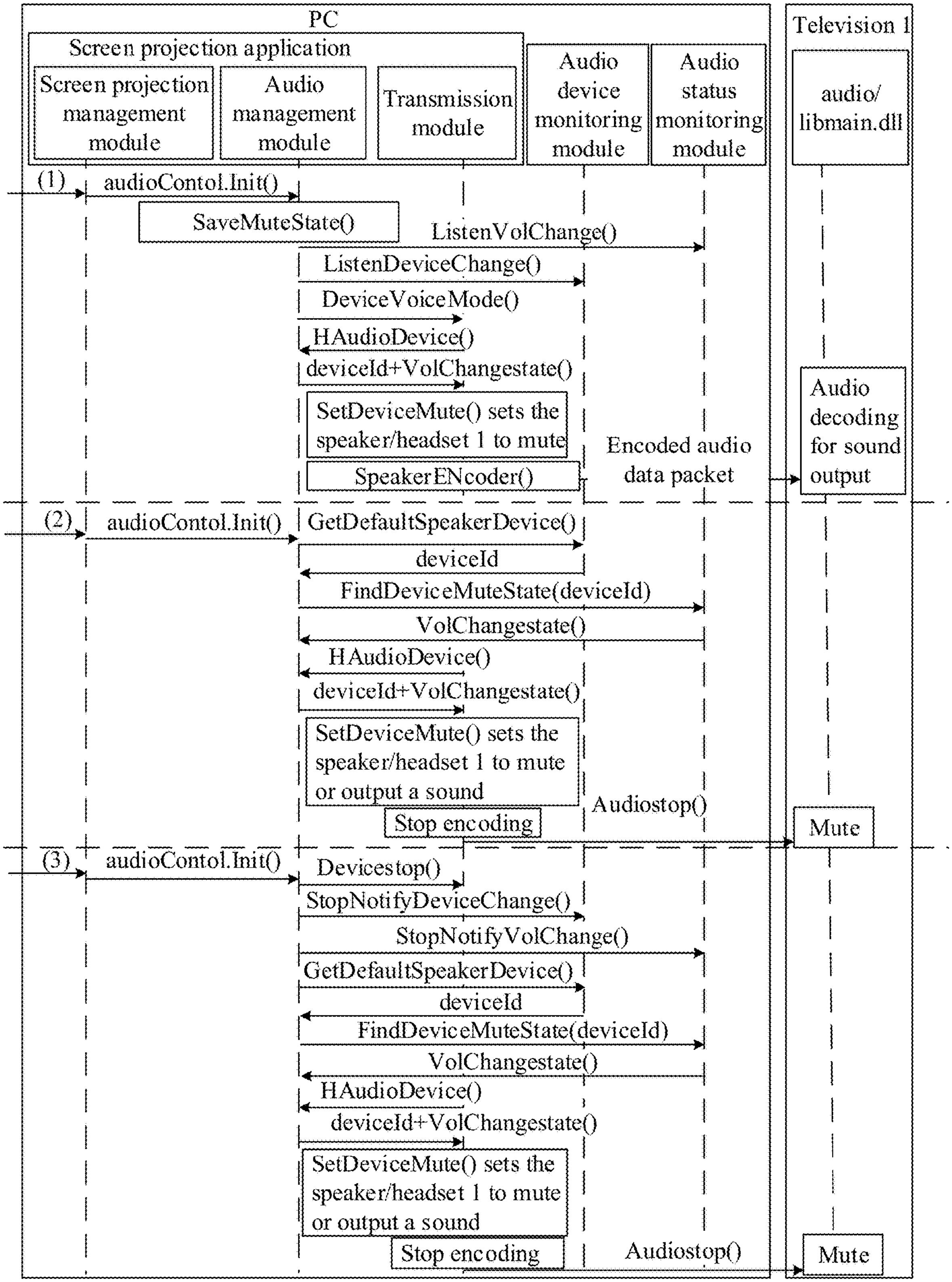
FIG. 27 is a schematic diagram 2 of a method invoked when a lower-layer transmission module sets an audio status of a screen projection transmit end.

Referring to FIG. 27, for example, when a user taps to perform screen projection, an upper-layer screen projection management module notifies an audio management module by using a method audioContol.Init( ). Then, the audio management module obtains an identification number of a currently used audio device and an audio status of the currently used audio device by using SaveMuteState( ), stores the identification number and the audio status of the currently used audio device as an initial value, and enables ListenDeviceChange( ) for monitoring whether the audio device changes and ListenVolChange( ) for monitoring whether the audio status of the currently used audio device changes.

Referring to FIG. 27, after the PC establishes a screen projection connection to the television 1, the audio management module invokes DeviceVoiceMode( ) to send, to a corresponding protocol layer, that is, the transmission module, sound channel information corresponding to the currently used audio device that is obtained by using SaveMuteState( ), and a sound output device is a large screen (television 1).

Correspondingly, after receiving the sound channel information sent by the audio management module, the transmission module obtains audio data from a sound channel to which the sound channel information points, performs audio encoding on the obtained audio data by using SpeakerENcoder( ), then packages the data, and sends the packaged data to the television 1, so that the television 1 outputs a sound after audio decoding. In addition, the transmission module invokes HAudioDevice( ) to query the currently used audio device and the audio status of the audio device that are recorded in the audio management module.

Correspondingly; the audio management module sends a queried identification number (deviceId) of the audio device and an audio status of the audio device identified by the identification number to the transmission module. The transmission module invokes SetDeviceMute( ) to set the audio device identified by deviceId to mute. For example, when the currently used audio device is a speaker, the speaker is set to mute. When the audio device identified by deviceId is a headset 1, the headset 1 is set to mute.

Referring to FIG. 27, for example, when the sound is switched to a local device, the upper-layer screen projection management module notifies the audio management module by using the method audioContol.Init( ). The upper layer of the product notifies the transmission module not to encode and package audio and send the audio to the television 1, that is, stop encoding, and invokes Audiostop( ). In this case, the television 1 receives no audio data packet, and cannot obtain the audio data through decoding for play. Therefore, the television 1 is mute.

Correspondingly, the audio management module sends the queried identification number (deviceId) of the audio device and the audio status of the audio device identified by the identification number to the transmission module, and the transmission module invokes SetDeviceMute( ) to set the audio status corresponding to the audio device identified by deviceId.

For example, when the currently used audio device is a speaker, and an obtained audio status corresponding to the speaker is a mute state, the speaker is set to mute. When the currently used audio device is a speaker, and an obtained audio status corresponding to the speaker is a non-mute state, the speaker is set to non-mute.

For another example, when the audio device identified by deviceId is a headset 1, and an obtained audio status corresponding to the headset 1 is a mute state, the headset 1 is set to mute. When the audio device identified by deviceId is a headset 1, and an obtained audio status corresponding to the headset 1 is a non-mute state, the headset 1 is set to non-mute.

Then, when sound output is switched from the local device to the large screen, an implementation process is similar to that performed when the screen projection connection is established for the first time and the large screen outputs a sound by default, but neither ListenDeviceChange( ) nor ListenVolChange( ) needs to be invoked again.

Referring to FIG. 27, for example, when the screen projection connection is disconnected, the audio management module notifies, by using Devicestop( ), the transmission module to disconnect the screen projection connection to the television 1, disables, by using StopNotifyDeviceChange( ), an audio device monitoring module for monitoring whether the audio device of the PC changes, and disables, by using StopNotifyVolChange( ), an audio status monitoring module for monitoring whether the audio status changes. In addition, the transmission module invokes HAudioDevice( ) to query the currently used audio device and the audio status of the audio device that are recorded in the audio management module.

Correspondingly, the audio management module sends the queried identification number (deviceId) of the audio device and the audio status of the audio device identified by the identification number to the transmission module, and the transmission module invokes SetDeviceMute( ) to set the audio status corresponding to the audio device identified by deviceId.

In addition, the audio management module further notifies the transmission module not to encode and package audio and send the audio to the television 1, that is, stop encoding, and invokes Audiostop( ). In this case, the television 1 receives no audio data packet, and cannot obtain the audio data through decoding for play. Therefore, the television 1 is mute.

In addition, it may be understood that, in a screen projection process, ListenDeviceChange( ) and ListenVol- Change( ) are always running, and when it is monitored that the audio device changes, an identification number of a changed audio device is sent to the audio management module to update the target identification number in the audio device table.

Referring to FIG. 27, for example, if ListenDeviceChange( ) monitors, in a screen projection process, that the audio device currently used by the PC changes, the audio management module may obtain an identification number of a changed audio device by using GetDefaultSpeakerDevice( ).

Correspondingly, the audio device monitoring module sends the identification number (deviceId) of the changed audio device to the audio management module for management.

Then, the audio management module uses the received deviceId as a query parameter to obtain an audio status of the audio device corresponding to deviceId from the audio status monitoring module by using FindDevceMuteState( ).

Correspondingly, the audio status management module sends the queried audio status to the audio management module by using VolChangestate( ).

To better understand the screen projection implemented based on the technical solutions provided in the embodiments in the three scenarios shown in FIG. 26 and FIG. 27, the following provides detailed description with reference to FIG. 28A and FIG. 28B to FIG. 30 by using an example in which both the audio device monitoring module and the audio status monitoring module are enabled in the screen projection scenario shown in FIG. 27.

Figure 28A:
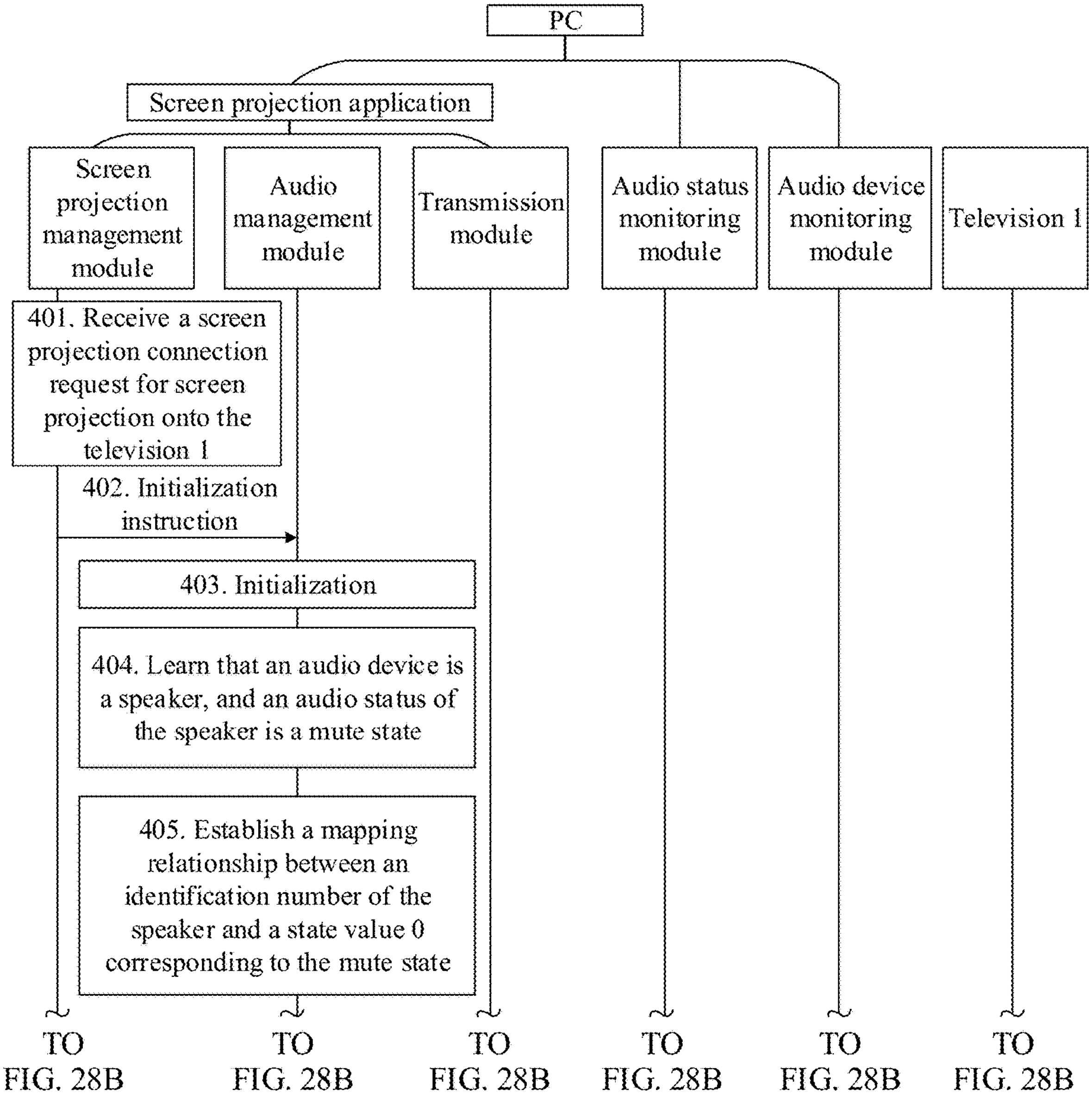
FIG. 28A and FIG. 28B are a schematic diagram 1 in which a lower-layer transmission module sets an audio status of a screen projection transmit end.
Figure 28B:
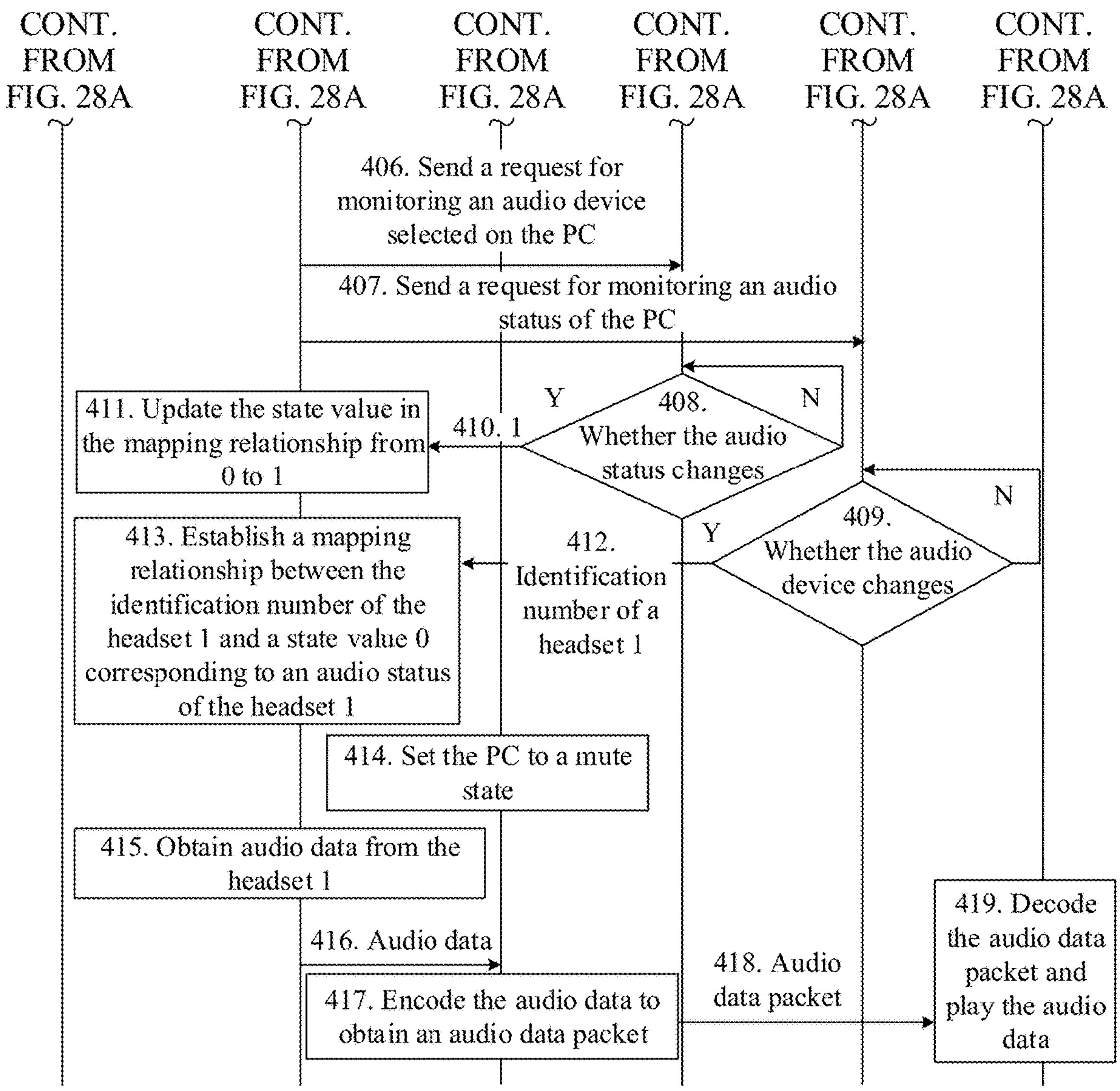

Referring to FIG. 28A and FIG. 28B, for example, a screen projection transmit end is referred to as a PC, and a screen projection receive end is referred to as a television 1.

A screen projection application is installed on the PC, and the screen projection application includes a screen projection management module, an audio management module, and a transmission module.

In addition, a system used by the PC provides an audio status monitoring module.

It is assumed that when the PC and the television 1 establish a screen projection connection for the first time, a sound output device is the television 1 by default, that is, the television 1 outputs a sound.

For example, when a user taps the "Connect" option 10-1 in FIG. 4 or FIG. 5, the screen projection management module receives a screen projection connection request for screen projection onto the television 1.

Referring to FIG. 28A and FIG. 28B, for example, the technical solution provided in this embodiment includes step 401 to step 419. It can be learned that, in this embodiment, step 401 to step 413 and step 415 to step 419 are basically the same as step 301 to step 311 and step 315 to step 319 in the embodiment shown in FIG. 23A and FIG. 23B. Details are not described herein again. The following describes only different parts.

Referring to FIG. 28A and FIG. 28B, the transmission module performs step 414 to set the local device to a mute state.

It should be noted that, because an operation of setting the audio status of the local device in this embodiment is implemented by the transmission module, the transmission module sets the audio status of the local device by using an interface for setting an audio status, for example, SetDeviceMute( ).

For example, when setting the audio status of the local device by using SetDeviceMute( ), the transmission module sets the audio device identified by the identification number to a mute state based on the obtained identification number.

For example, when the audio device identified by the queried identification number is the headset 1, the headset 1 is set, by using SetDeviceMute( ), to a mute state.

For another example, when the audio device identified by the queried identification number is the speaker, the speaker is set, by using SetDeviceMute( ), to a mute state.

It may be understood that, when the sound output device is the television 1, regardless of whether the audio status of the audio device currently used by the PC is the mute state or the non-mute state in a screen projection process, the audio device currently used by the PC, such as the speaker, does not output a sound. Therefore, in this scenario, the transmission module invokes an audio status setting interface to set the audio device of the local device, for example, the speaker, to mute.

In this way, the PC is first muted, then screen projection is performed after a video is played, and the television 1 outputs a sounds. In addition, in a screen projection process, the audio management module dynamically updates, by monitoring the audio device and the corresponding audio status, the target identification number recorded in the audio device table and the state value that is of the audio status of the audio device corresponding to the target identification number and that is recorded in the audio status table. In this way, use of the screen projection function by the user is not affected, and modification performed by the user on the audio device used by the PC and the audio status of the audio device in a screen projection process can be monitored in real time, so that audio data can be obtained from a sound channel corresponding to the currently used audio device and sent to the television 1. In this way, when the sound output device is the television 1, the television 1 can always obtain audio data that can be played.

Figure 29:
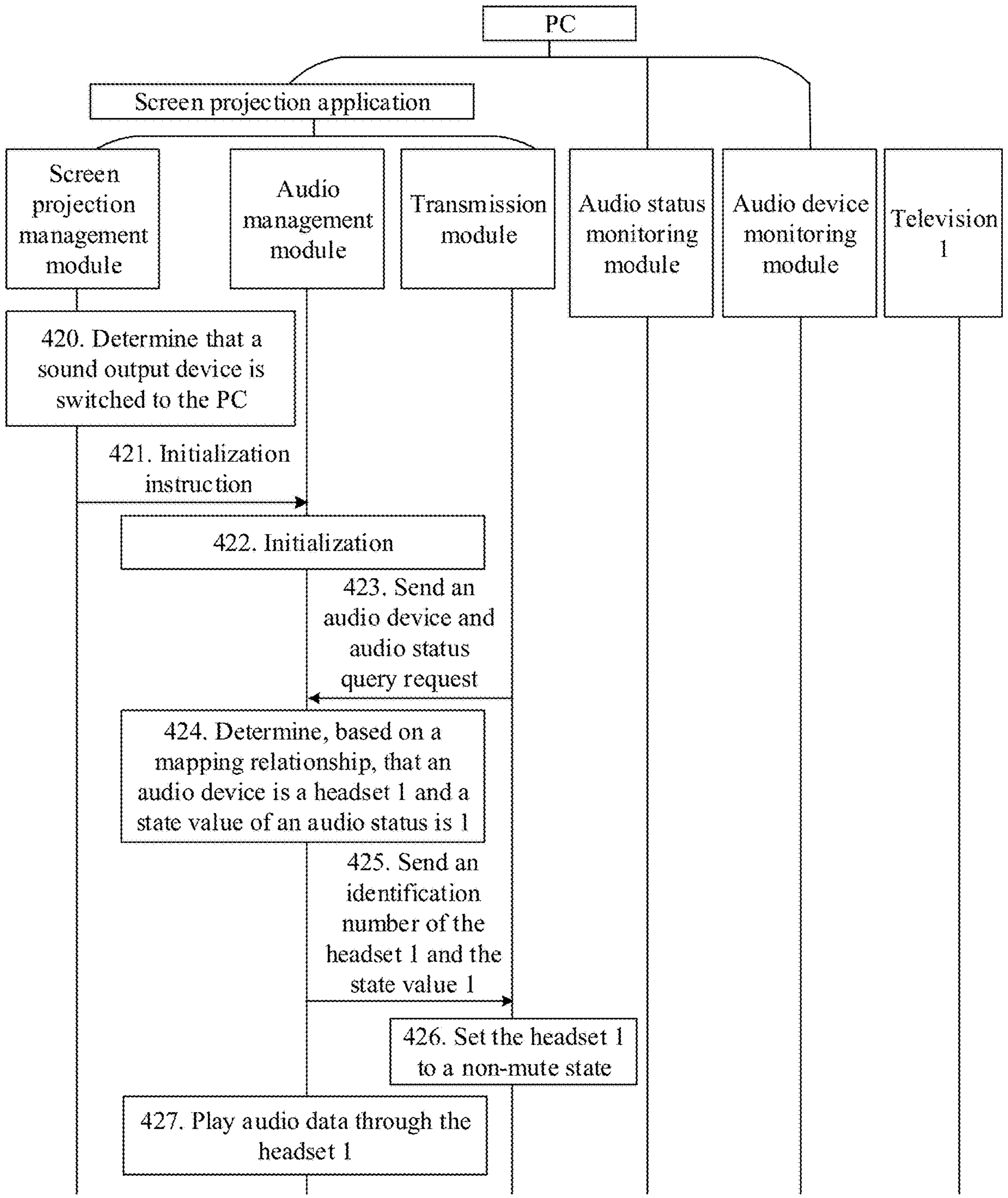
FIG. 29 is a schematic diagram 2 in which a lower-layer transmission module sets an audio status of a screen projection transmit end.

Further, after screen projection information of the PC is sent to the television 1, and the television 1 starts to play a picture and play audio data, if the user switches the sound output device from the television 1 to the PC, for a process of setting the audio status of the PC, refer to FIG. 29.

Referring to FIG. 29, for example, the technical solution provided in this embodiment includes step 420 to step 427. It can be learned that, in this embodiment, step 420 to step 422, step 424, and step 427 are basically the same as step 320 to step 323 and step 325 in the embodiment shown in FIG. 24. Details are not described herein again. The following describes only different parts.

Referring to FIG. 29, in step 423, the transmission module sends an audio device and audio status query request to the audio management module.

For example, the transmission module may send the audio device and audio status query request to the audio management module by using pre-compiled HAudioDevice( ).

Correspondingly, the audio management module sends queried deviceId and an audio status queried by using pre-compiled VolChangestate( ) to the transmission module.

In step 425, the audio management module sends an identification number and a state value 1 of the headset 1 to the transmission module, that is, sends the queried identification number deviceId of the currently used audio device and the queried audio status of the audio device to the transmission module.

In step 426, the transmission module sets the headset 1 to a non-mute state.

For example, after receiving the identification number and the audio status of the audio device that are fed back by the audio module, the transmission module sets the audio status of the local device by using SetDeviceMute( ).

Specifically, the audio device identified by the identification number is set to the queried audio status based on the obtained identification number.

For example, when the audio device identified by the queried identification number is the headset 1, and a corresponding audio status is a mute state, the headset 1 is set to the mute state by using SetDeviceMute( ). When the audio device identified by the queried identification number is the headset 1, and a corresponding audio status is a non-mute state, the headset 1 is set to the non-mute state by using SetDeviceMute( ).

For another example, when the audio device identified by the queried identification number is the speaker, and a corresponding audio status is a mute state, the speaker is set to the mute state by using SetDeviceMute( ). When the audio device identified by the queried identification number is the speaker, and a corresponding audio status is a non-mute state, the speaker is set to the non-mute state by using SetDeviceMute( ).

In this way, a process in which the sound output device is switched from the television 1 to the PC in a screen projection process and then the audio management module sets the audio status of the PC based on the target identification number recorded in the audio device table and the state value that is corresponding to the target identification number and that is recorded in the audio status table is implemented. Therefore, after the sound output device is modified to the PC, the audio device that plays the audio data on the PC and the audio status of the audio device that plays the audio data can be consistent with those expected by the user.

Figure 30:
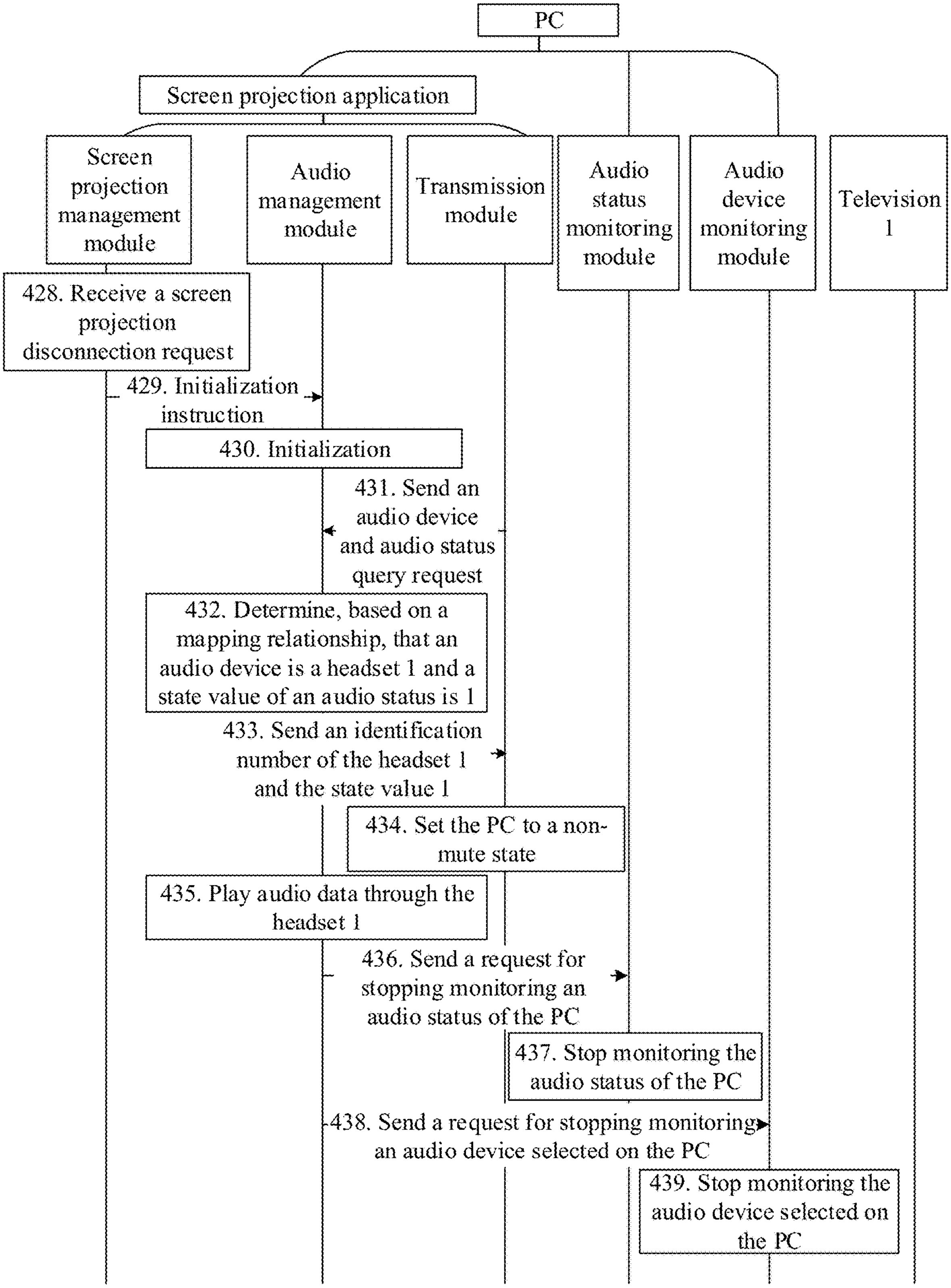
FIG. 30 is a schematic diagram 3 in which a lower-layer transmission module sets an audio status of a screen projection transmit end.

Further, after completing the operation in FIG. 29, the PC starts to play the audio data, and after the television 1 continues to play the picture/video data, if the user taps the disconnection option 10-5 in FIG. 8, for a process of setting the audio status of the PC, refer to FIG. 30.

Referring to FIG. 30, for example, the technical solution provided in this embodiment includes step 428 to step 439. It can be learned that step 428 to step 435 in this embodiment are approximately the same as step 420 to step 427 in the embodiment shown in FIG. 29, and step 436 to step 439 are approximately the same as step 323 to step 325 in the embodiment shown in FIG. 25. Details are not described herein again.

Therefore, in the screen projection solution provided in this application, the audio status of the screen projection transmit end is set by using the transmission module in a screen projection process. In this way, screen projection applications that use different protocols can be personalized according to an actual requirement, so that the screen projection solution provided in this application is more diversified.

In addition, it should be understood that the methods and interfaces used in the foregoing embodiments are merely examples enumerated for better understanding the technical solutions of the embodiments, and are not used as the only limitation of the embodiments.

In addition, it should be noted that, in an actual application scenario, the system screen projection method provided in the foregoing embodiments implemented by the electronic device may be performed by a chip system included in the electronic device, and the chip system may include a processor. The chip system may be coupled to a memory, so that when the chip system runs, a computer program stored in the memory is invoked to implement the steps performed by the electronic device. The processor in the chip system may be an application processor or a processor that is not an application processor.

In addition, an embodiment of this application further provides a computer-readable storage medium. The computer storage medium stores computer instructions. When the computer instructions are run on an electronic device, the electronic device is enabled to perform the foregoing related method steps to implement the system screen projection method in the foregoing embodiment.

In addition, an embodiment of this application further provides a computer program product. When the computer program product runs on an electronic device, the electronic device is enabled to perform the foregoing related steps to implement the system screen projection method in the foregoing embodiment.

In addition, an embodiment of this application further provides a chip (or a component or a module), and the chip may include one or more processing circuits and one or more transceiver pins. The transceiver pin and the processing circuit communicate with each other by using an internal connection path, and the processing circuit performs the foregoing related method steps to implement the system screen projection method in the foregoing embodiments, to control a receiving pin to receive a signal, and control a sending pin to send a signal.

In addition, it can be learned from the foregoing description that the electronic device, the computer-readable storage medium, the computer program product, or the chip provided in embodiments of this application is configured to perform the corresponding method provided above. Therefore, for beneficial effects that can be achieved by the electronic device, the computer storage medium, the computer program product, or the chip, refer to beneficial effects in the corresponding method provided above. Details are not described herein again.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the scope of the technical solutions in embodiments of this application.

What is claimed is:

1. An electronic device, wherein the electronic device is a screen projection transmit end, a screen projection application is installed on the screen projection transmit end, the screen projection transmit end comprises a memory and a processor, the memory is coupled to the processor, the memory stores program instructions, and when the program instructions are executed by the processor, the electronic device performs the following steps:

when the screen projection transmit end plays audio data through a speaker, after receiving a screen projection connection request, establishing, by the screen projection transmit end, a screen projection connection to a screen projection receive end in response to the screen projection connection request;

when determining that a sound output device selected by a user is the screen projection receive end, obtaining the audio data from a sound channel corresponding to the speaker, encoding the audio data according to a protocol type, sending the protocol type to the screen projection receive end, and, after encoding the audio data, sending the audio data to the screen projection receive end, so that the screen projection receive end plays the audio data; and after a headset is connected to the screen projection transmit end, obtaining the audio data from a sound channel corresponding to the headset, encoding the audio data according to the protocol type, sending the protocol type to the screen projection receive end, and, after encoding the audio data, sending the audio data to the screen projection receive end, so that the screen projection receive end plays the audio data.

2. The device according to claim 1, when determining that a sound output device selected by a user is the screen projection receive end, the electronic device further performs the following steps:

setting an audio status of the speaker to a mute state.

3. The device according to claim 1, after a headset is connected to the screen projection transmit end, the electronic device further performs the following steps:

setting an audio status of the headset to a mute state.

4. The device according to claim 1, wherein a first audio status switching control and a first volume bar control that are corresponding to the speaker are displayed in a display interface of the screen projection transmit end; and the electronic device further performs the following steps:

when the screen projection transmit end plays the audio data through the speaker by using a volume value corresponding to the first volume bar control, after receiving a tap operation on the first audio status switching control, controlling, by the screen projection transmit end in response to the tap operation, the speaker to stop outputting a sound, and the icon corresponding to the first audio status switching control is modified from a non-mute icon to a mute icon.

5. The device according to claim 4, wherein after the obtaining the audio data from a sound channel corresponding to the speaker, and sending the audio data to the screen projection receive end, so that the screen projection receive end plays the audio data, the electronic device further performs the following steps:

after receiving a tap operation for switching a sound output device from the screen projection receive end to the screen projection transmit end, in response to the tap operation, stopping, by the screen projection transmit end, obtaining the audio data from the sound channel corresponding to the speaker, and keeping the speaker mute; and the icon corresponding to first audio status switching control remains the mute icon.

6. The device according to claim 5, wherein after the stopping obtaining the audio data from the sound channel corresponding to the speaker, and keeping the speaker mute, the electronic device further performs the following steps:

after receiving a tap operation on the first audio status switching control, controlling, by the screen projection transmit end in response to the tap operation, the speaker to play the audio data by using the volume value corresponding to the first volume bar control, and the icon corresponding to the first audio status switching control is modified from the mute icon to the non-mute icon.

7. The device according to claim 4, wherein after the obtaining the audio data from a sound channel corresponding to the speaker, and sending the audio data to the screen projection receive end, so that the screen projection receive end plays the audio data, the electronic device further performs the following steps:

after receiving a tap operation for disconnecting the screen projection connection between the screen projection transmit end and the screen projection receive end, in response to the tap operation, stopping, by the screen projection transmit end, obtaining the audio data from the sound channel corresponding to the speaker, and keeping the speaker mute, and the icon corresponding to first audio status switching control remains the mute icon.

8. The device according to claim 4, wherein a second audio status switching control and a second volume bar control that are corresponding to the headset are displayed in the display interface of the screen projection transmit end; and after the obtaining the audio data from a sound channel corresponding to the headset, and sending the audio data to the screen projection receive end, so that the screen projection receive end plays the audio data, the electronic device further performs the following steps:

after receiving a tap operation on the second audio status switching control, controlling, by the screen projection transmit end in response to the tap operation, the speaker to stop outputting a sound, and the icon corresponding to the second audio status switching control is modified from a non-mute icon to a mute icon.

9. The device according to claim 8, wherein after controlling, by the screen projection transmit end in response to the tap operation, the speaker to stop outputting a sound, and the icon corresponding to the second audio status switching control is modified from a non-mute icon to a mute icon, the electronic device further performs the following steps:

after receiving a tap operation for switching a sound output device from the screen projection receive end to the screen projection transmit end, in response to the tap operation, stopping, by the screen projection transmit end, obtaining the audio data from the sound channel corresponding to the headset, and keeping the headset mute, and the icon corresponding to second audio status switching control remains the mute icon.

10. The device according to claim 9, wherein after stopping, by the screen projection transmit end, obtaining the audio data from the sound channel corresponding to the headset, and keeping the headset mute, the electronic device further performs the following steps:

after receiving a tap operation on the second audio status switching control, controlling, by the screen projection transmit end in response to the tap operation, the headset to play the audio data at the volume value corresponding to the second audio status switching control, and the icon corresponding to the second audio status switching control is modified from a mute icon to a non-mute icon.

11. The device according to claim 8, wherein after controlling, by the screen projection transmit end in response to the tap operation, the speaker to stop outputting a sound, and the icon corresponding to the second audio status switching control is modified from a non-mute icon to a mute icon, the electronic device further performs the following steps:

after receiving a tap operation for disconnecting the screen projection connection between the screen projection transmit end and the screen projection receive end, in response to the tap operation, stopping, by the screen projection transmit end, obtaining the audio data from the sound channel corresponding to the speaker, and keeping the speaker mute, and the icon corresponding to second audio status switching control remains the mute icon.

12. The device according to claim 1, wherein an audio device selection list is further displayed in the display interface of the screen projection transmit end, the audio device selection list comprises a first audio device option and a second audio device option, the first audio device option corresponds to the speaker, and the second audio device option corresponds to the headset; and wherein obtaining the audio data from a sound channel corresponding to the headset, and sending the audio data to the screen projection receive end, so that the screen projection receive end plays the audio data is in response to receiving a tap operation on the first audio device option.

13. A screen projection method, applied to a screen projection transmit end, wherein a screen projection application is installed on the screen projection transmit end, and the method comprises:

when the screen projection transmit end plays audio data through a speaker, after receiving a screen projection connection request, establishing, by the screen projection transmit end, a screen projection connection to a screen projection receive end in response to the screen projection connection request;

when determining that a sound output device selected by a user is the screen projection receive end, obtaining the audio data from a sound channel corresponding to the speaker, encoding the audio data according to a protocol type, sending the protocol type to the screen projection receive end, and, after encoding the audio data, sending the audio data to the screen projection receive end, so that the screen projection receive end plays the audio data; and after a headset is connected to the screen projection transmit end, obtaining the audio data from a sound channel corresponding to the headset, encoding the audio data according to a protocol type, sending the protocol type to the screen projection receive end, and, after encoding the audio data, sending the audio data to the screen projection receive end, so that the screen projection receive end plays the audio data.

14. The method according to claim 13, when determining that a sound output device selected by a user is the screen projection receive end, the method further comprises:

setting an audio status of the speaker to a mute state.

15. The method according to claim 13, after a headset is connected to the screen projection transmit end, the method further comprises:

setting an audio status of the headset to a mute state.

16. The method according to claim 13, wherein a first audio status switching control and a first volume bar control that are corresponding to the speaker are displayed in a display interface of the screen projection transmit end; and the method further comprises:

when the screen projection transmit end plays the audio data through the speaker by using a volume value corresponding to the first volume bar control, after receiving a tap operation on the first audio status switching control, controlling, by the screen projection transmit end in response to the tap operation, the speaker to stop outputting a sound, and the icon corresponding to the first audio status switching control is modified from a non-mute icon to a mute icon.

17. The method according to claim 16, wherein after the obtaining the audio data from a sound channel corresponding to the speaker, and sending the audio data to the screen projection receive end, so that the screen projection receive end plays the audio data, the method further comprises:

after receiving a tap operation for switching a sound output device from the screen projection receive end to the screen projection transmit end, in response to the tap operation, stopping, by the screen projection transmit end, obtaining the audio data from the sound channel corresponding to the speaker, and keeping the speaker mute; and the icon corresponding to first audio status switching control remains the mute icon.

18. The method according to claim 17, wherein after the stopping obtaining the audio data from the sound channel corresponding to the speaker, and keeping the speaker mute, the method further comprises:

after receiving a tap operation on the first audio status switching control, controlling, by the screen projection transmit end in response to the tap operation, the speaker to play the audio data by using the volume value corresponding to the first volume bar control, and the icon corresponding to the first audio status switching control is modified from the mute icon to the non-mute icon.

19. The method according to claim 16, wherein after the obtaining the audio data from a sound channel corresponding to the speaker, and sending the audio data to the screen projection receive end, so that the screen projection receive end plays the audio data, the method further comprises:

after receiving a tap operation for disconnecting the screen projection connection between the screen projection transmit end and the screen projection receive end, in response to the tap operation, stopping, by the screen projection transmit end, obtaining the audio data from the sound channel corresponding to the speaker, and keeping the speaker mute, and the icon corresponding to first audio status switching control remains the mute icon.

20. A non-transitory computer-readable storage medium, comprising a computer program, wherein when the computer program is run on an electronic device, the electronic device is enabled to perform a screen projection method, the method comprising:

when the screen projection transmit end plays audio data through a speaker, after receiving a screen projection connection request, establishing, by the screen projection transmit end, a screen projection connection to a screen projection receive end in response to the screen projection connection request;

when determining that a sound output device selected by a user is the screen projection receive end, obtaining the audio data from a sound channel corresponding to the speaker, encoding the audio data according to a protocol type, sending the protocol type to the screen projection receive end, and, after encoding the audio data, sending the audio data to the screen projection receive end, so that the screen projection receive end plays the audio data; and after a headset is connected to the screen projection transmit end, obtaining the audio data from a sound channel corresponding to the headset, encoding the audio data according to a protocol type, sending the protocol type to the screen projection receive end, and, after encoding the audio data, sending the audio data to the screen projection receive end, so that the screen projection receive end plays the audio data.

* * * * *